US008082301B2

(12) United States Patent
Ahlgren et al.

(10) Patent No.: US 8,082,301 B2
(45) Date of Patent: Dec. 20, 2011

(54) SYSTEM FOR SUPPORTING COLLABORATIVE ACTIVITY

(75) Inventors: Janet Ahlgren, Winchester, MA (US); Stuart Rudolph, Winchester, MA (US); Andy Chang, Winchester, MA (US); Kevin Kelley, Wakefield, MA (US); Gideon Moran, Westford, MA (US); Gorham Palmer, Cambridge, MA (US); Hung Phan, Dorchester, MA (US); Nhat Phan, Canton, MA (US); Robert Torchon, Moorpark, CA (US)

(73) Assignee: Virtual Agility, Inc., Winchester, MA (US)

( * ) Notice: Subject to any disclaimer, the term of this patent is extended or adjusted under 35 U.S.C. 154(b) by 246 days.

(21) Appl. No.: 11/939,250

(22) Filed: Nov. 13, 2007
(Under 37 CFR 1.47)

(65) Prior Publication Data
US 2009/0320035 A1 Dec. 24, 2009

Related U.S. Application Data

(60) Provisional application No. 60/858,241, filed on Nov. 10, 2006.

(51) Int. Cl.
*G06F 15/16* (2006.01)

(52) U.S. Cl. .......................... 709/204; 709/205; 709/217

(58) Field of Classification Search ................ 709/204, 709/205, 217, 218; 705/9; 715/753; 370/260
See application file for complete search history.

(56) References Cited

U.S. PATENT DOCUMENTS

| | | | |
|---|---|---|---|
| 6,334,146 B1 * | 12/2001 | Parasnis et al. | 709/217 |
| 6,397,191 B1 * | 5/2002 | Notani et al. | 705/9 |
| 6,564,246 B1 * | 5/2003 | Varma et al. | 709/205 |
| 7,519,683 B2 * | 4/2009 | Bodin et al. | 709/218 |
| 7,756,820 B2 * | 7/2010 | Moore et al. | 707/600 |
| 2004/0133639 A1 * | 7/2004 | Shuang et al. | 709/204 |
| 2006/0010125 A1 * | 1/2006 | Beartusk et al. | 707/4 |

* cited by examiner

*Primary Examiner* — Frantz B Jean
(74) *Attorney, Agent, or Firm* — Gordon E. Nelson

(57) ABSTRACT

A system includes a processor which has access to a representation of model of activity, which includes workspaces. Each workspace includes domain hierarchies for representing an organizational structure of the collaborating users using the system, and initiatives hierarchies representing process structures for accomplishing goals. An interface permits users to view and modify the workspaces for which the user has access. Each user can have different access permissions in different workspaces. The domain and initiative hierarchies provide two views of the workspace objects without duplicating resources. A resource is a collection of shared elements defined by the users that give users associated with the workspace access to information sources. Users can define knowledge boards for creating reports based on information fields of the resources. The knowledge board is associated with a resource template from which the resource is created.

17 Claims, 93 Drawing Sheets

338
T_RES_TMPLT_FIELD_OPTION

| | | |
|---|---|---|
| ☐ | ID | VARCHAR2(32) |
| | NAME | VARCHAR2(1000) |
| ☐ | FIELD_ID | VARCHAR2(32) |
| | SEQUENCE_NUM | NUMBER(4) |
| | ARCHIVED_DATE | DATE(7) |
| | ARCHIVED_BY | VARCHAR2(32) |
| | LOCKED_DATE | DATE(7) |
| | LOCKED_BY | VARCHAR2(64) |
| | CREATED_DATE | DATE(7) |
| | UPDATED_DATE | DATE(7) |
| | OBJ_VERSION | NUMBER(22) |

ID=FIELD_ID

337
T_RES_TMPLT_FIELD

| | | |
|---|---|---|
| ☐ | ID | VARCHAR2(32) |
| | NAME | VARCHAR2(128) |
| | DESCRIPTION | VARCHAR2(2000) |
| ☐ | RES_TMPLT_ID | VARCHAR2(32) |
| ☐ | FIELD_TYPE_ID | VARCHAR2(32) |
| | MAX_LENGTH | NUMBER(10) |
| | REQUIRED_FLAG | CHAR(1) |
| | SEQUENCE_NUM | NUMBER(4) |
| | ARCHIVED_DATE | DATE(7) |
| | ARCHIVED_BY | VARCHAR2(32) |
| | LOCKED_DATE | DATE(7) |
| | LOCKED_BY | VARCHAR2(32) |
| | CREATED_DATE | DATE(7) |
| | UPDATED_DATE | DATE(7) |
| | OBJ_VERSION | NUMBER(22) |

──ID=RES_TMPLT_ID──

ID=FIELD_TYPE_ID

336
T_RES_TMPLT_FIELD_TYPE

| | | |
|---|---|---|
| ☐ | ID | VARCHAR2(32) |
| | NAME | VARCHAR2(128) |
| | DESCRIPTION | VARCHAR2(2000) |
| | HTML_CLASS | VARCHAR2(255) |
| | MAX_DEFAULT_OPTIONS | NUMBER(4) |
| | CATEGORY | VARCHAR2(16) |

Fig. 4G-1

342
T_USER_LOGIN

| | |
|---|---|
| USER_ID | VARCHAR2(32) |
| PASS_WORD | VARCHAR2(64) |
| PASS_WORD_DATE | DATE(7) |
| AUTO_LOCKED_DATE | DATE(7) |
| ARCHIVED_DATE | DATE(7) |
| ARCHIVED_BY | VARCHAR2(32) |
| LOCKED_DATE | DATE(7) |
| LOCKED_BY | VARCHAR2(32) |
| CONNECTED_DATE | DATE(7) |
| CREATED_DATE | DATE(7) |
| UPDATED_DATE | DATE(7) |
| OBJ_VERSION | NUMBER(22) |

ID=USER_ID

343
T_USER_LOGIN_HISTORY

| | |
|---|---|
| HISTORY_ID | VARCHAR2(32) |
| USER_ID | VARCHAR2(32) |
| LOGIN_DATE | DATE(7) |
| LOGOUT_DATE | DATE(7) |
| OBJ_VERSION | NUMBER(22) |

ID=USER_ID

344
T_USER_PREFERENCES

| | |
|---|---|
| USER_ID | VARCHAR2(32) |
| DEFAULT_WORKSPACE_ID | VARCHAR2(32) |
| DEFAULT_NAVIGATOR | VARCHAR2(16) |
| DEFAULT_LANGUAGE | VARCHAR2(2) |
| EMAIL_ALERTS | CHAR(1) |
| EMAIL_MESSAGES | CHAR(1) |
| OBJ_VERSION | NUMBER(22) |

ID=USER_ID

| T_MANAGER_PROPERTY | |
|---|---|
| ☐ ID | VARCHAR2(32) |
| MANAGER_CLASS | VARCHAR2(255) |
| NAME | VARCHAR2(128) |
| VALUE | VARCHAR2(2000) |
| CREATED_DATE | DATE(7) |
| UPDATED_DATE | DATE(7) |
| OBJ_VERSION | NUMBER(22) |

302

| T_APPLICATION_LICENSE | |
|---|---|
| ☐ LICENSE_ID | VARCHAR2(32) |
| LICENSE_KEY | VARCHAR2(4000) |
| PASS_WORD | VARCHAR2(32) |
| OBJ_VERSION | NUMBER(22) |

313

| T_MD_COUNTRY | |
|---|---|
| ☐ ID | VARCHAR2(3) |
| NAME | VARCHAR2(128) |

303

| T_APPLICATION_LOGO | |
|---|---|
| ☐ ID | VARCHAR2(32) |
| LOGO_DATA | LONG RAW(0) |
| MIMETYPE | VARCHAR2(255) |
| OBJ_VERSION | NUMBER(22) |

| WORKCENTER, ADMINISTRATION | #↑ | FULL NAME | LOGIN DATE | LOGOUT DATE |
|---|---|---|---|---|
| ☐ APPLICATION PROPERTIES | 0 | PHAN, NHAT | APRIL 14, 2006 5:29:42 PM EDT | APRIL 14, 2006 5:29:42 PM EDT |
| ☐ GLOBAL OBJECTS | 1 | RUDOLPH, STUART | APRIL 14, 2006 5:29:42 PM EDT | APRIL 14, 2006 5:29:42 PM EDT |
| ☐ SYSTEM MANAGERS | 2 | PHAN, NHAT | APRIL 14, 2006 5:29:42 PM EDT | APRIL 14, 2006 5:29:42 PM EDT |
| ☐ USERS | 3 | CHANG, ANDY | APRIL 14, 2006 5:29:42 PM EDT | APRIL 14, 2006 5:29:42 PM EDT |
| ☐ IMPORT/EXPORT | 4 | PHAN, NHAT | APRIL 14, 2006 5:29:42 PM EDT | APRIL 14, 2006 5:29:42 PM EDT |
| ☐ HISTORY | 5 | RUDOLPH, STUART | APRIL 14, 2006 5:29:42 PM EDT | APRIL 14, 2006 5:29:42 PM EDT |
| 1023 | 6 | CHANG, ANDY | APRIL 14, 2006 5:29:42 PM EDT | APRIL 14, 2006 5:29:42 PM EDT |
|  | 7 | CHANG, ANDY | APRIL 14, 2006 5:29:42 PM EDT | APRIL 14, 2006 5:29:42 PM EDT |
|  | 8 | RUDOLPH, STUART | APRIL 14, 2006 5:29:42 PM EDT | APRIL 14, 2006 5:29:42 PM EDT |
|  | 9 | CHANG, ANDY | APRIL 14, 2006 5:29:42 PM EDT | APRIL 14, 2006 5:29:42 PM EDT |

| NAME |
|---|
| ■ ADMINISTRATOR, WORKCENTER |
| ■ BILLUP, STEVE |
| ■ CHANG, ANDY |

| Information | | | | |
|---|---|---|---|---|
| Name (1970) | Type (1971) | Ver. (1972) | Updated (1973) | Actions (1974) |
| FBI Press Release Feed | rss | -- | 8/14/07 - 10:53 AM | Details |
| FBI- Most Wanted List | link | -- | 8/9/07 - 6:31 PM | Details |
| Judy Baker | link | -- | 8/14/07 - 11:20 AM | Details |

FIG. 19G

Resource Link Details

Details

Judy Baker                                              1936

- 1930 — Name         Judy Baker
- 1931 — Description  Judy Baker link
- 1932 — Url          Judy Baker
- 1933 — Created By   Federal User
- 1934 — Created Date August 14, 2007 - 11:20:54 AM EDT
- 1935 — Updated Date --

| Information | | | | |
|---|---|---|---|---|
| Name | Type | Ver. | Updated | Actions |
| FBI Press Release Feed | rss | -- | 8/14/07 - 10:53 AM | Details |
| FBI- Most Wanted List | link | -- | 8/9/07 - 6:31 PM | Details |

2030 — Name
2031 — Type
2032 — Ver.
2033 — Updated
2034 — Actions

FIG. 20B

RSS Viewer | FBI Press Release Feed

FBI in the News

9 Charged in Sex Trafficking (Mon, 13 Aug 2007 11:26:48 -0400)
Six members of a Guatemalan family and three associates were indicted for their roles in a sex trafficking ring that recruited young women in Guatemala with false promises of high-paying jobs, smuggled the victims into the United States, and forced them to work as prostitutes to pay smuggling fees.

MD Teacher Child Porn Sentence (Mon, 13 Aug 2007 11:26:47 -0400)
Patrick Bogan, 41, of Edgewood, Maryland, was sentenced to 78 months in prison followed by 10 years of supervised release on child pornography charges in one of the most significant child pornography cases ever prosecuted in Maryland due to the sheer volume of child pornography possessed by the defendant.

Software Trafficking Sentence (Mon, 13 Aug 2007 11:26:46 -0400)
Justin E. Harrison, 26, of Oxford, Georgia, was sentenced on charges of trafficking in illicit

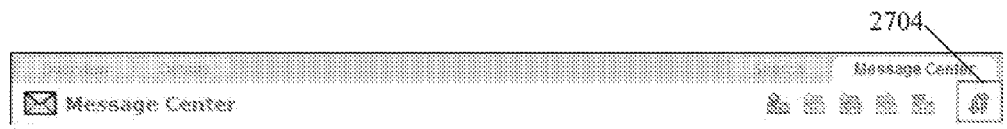
FIG. 27B
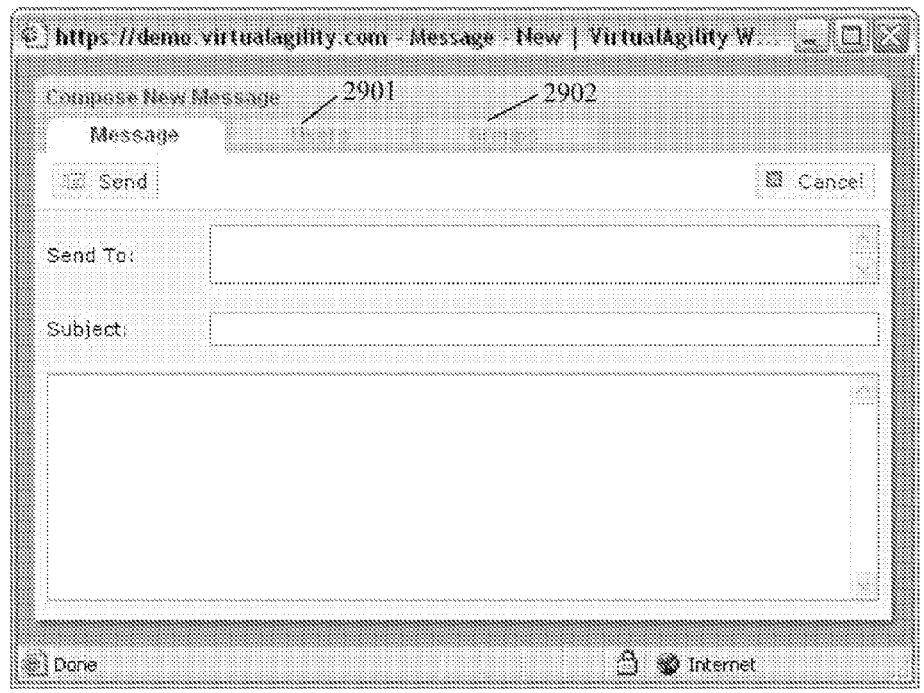
FIG. 28
FIG. 29A

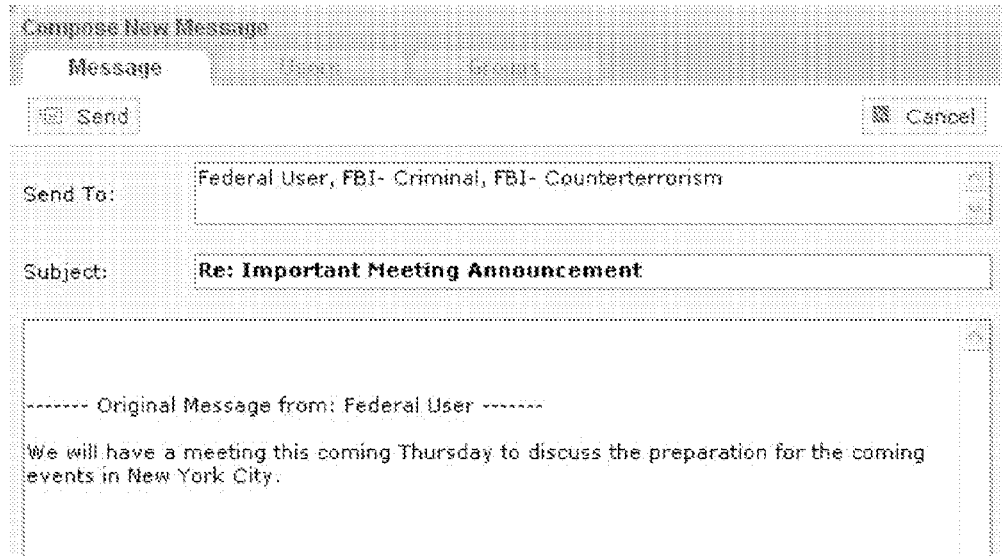
FIG. 29F
FIG. 30
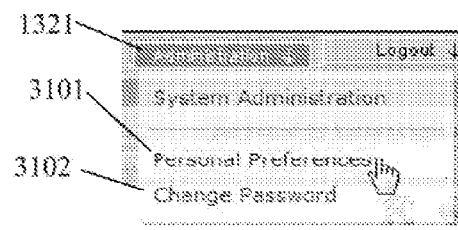
FIG. 31A

SYSTEM FOR SUPPORTING COLLABORATIVE ACTIVITY

CROSS-REFERENCE TO RELATED APPLICATIONS

This application claims priority to U.S. provisional patent application entitled "A System for Supporting Collaborative Activity", Ser. No. 60/858,241, filed on Nov. 10, 2006.

This application is related to U.S. patent application entitled "Processing Management Information", Ser. No. 09/312,740, filed on May 14, 1999, and to U.S. patent application entitled "System for Performing Collaborative Tasks", Ser. No. 10/765,424, filed on Jan. 27, 2004. The present application hereby incorporates both of these patent applications by reference.

STATEMENT REGARDING FEDERALLY SPONSORED RESEARCH OR DEVELOPMENT

Not applicable.

REFERENCE TO A SEQUENCE LISTING

Not applicable.

BACKGROUND OF THE INVENTION

1. Field of the Invention

This invention relates to systems for improving communication among people who are collaborating in the performance of a task.

2. Description of Related Art

Computers coupled to networks have made collaborative work easier than ever before. At the most fundamental level, file sharing and email have eliminated the requirement that collaborators be in physical proximity to each other. The change tracking arrangements that are provided by most document processing systems further support collaborative work, as do computer-implemented scheduling and tracking systems. Integrated systems for collaborative work provide features such as file sharing, email, change tracking, scheduling, and tracking in a single package. A problem with these tools and integrated systems for collaborative work is that they are very general. It is up to the user to adapt them to his or her needs. To be sure, a skilled user of a tool such as a spreadsheet can adapt the tool to almost any purpose, but to do this, extensive programming is required. Such programming requires a specialist, and the result of the programming is often opaque to those who are not masters of the tool and of what is being represented. Indeed, a general problem with tools that require extensive programming to adapt them to a user's needs is that the programming is usually done by a specialist who understand the tools or the system, but not the nature of the collaboration, and as is usual in such situations, communication between the programming specialist and the users is usually difficult and sometimes impossible.

Another approach to collaborative work has been systems that are specialized for collaborative work in a particular special area, such as bookkeeping. For example, the Quickbooks small business accounting software provides a model of a small business as seen from the point of view of an accountant that the user of Quickbooks can customize for his or her own purposes. While the model of the small business that Quickbooks provides is very useful for accounting, it has no relevance whatever to other aspects of the business.

Another approach is described in U.S. patent application Ser. No. 10/765,424 ('424 application). FIG. 34 shows a diagram of a model 4101 as described in the '424 application. A number of collaborators 4005 (1 . . . n) are organized into one or more collaborator groups 4003 (1 . . . m). A collaborator 4005 may belong to more than one group 4003. The context in which the collaborators 4005 work is represented by a domain hierarchies 4009 (1 . . . k), goal-project hierarchies 4011 (1 . . . m), and initiative hierarchies 4109 (1 . . . o).

Each goal-project hierarchy 4011 has at its head a project or a goal. A goal may have other goals and projects 4015 as its children. A project 4015 may have other projects as its children, but may not have a goal as a child. Any goal, project, domain, or initiative may have one or more items of information 4017 associated with it, as indicated by arrows 4105. The information may include documents, messages, discussions, reminders, Web links, and alerts. The ability to relate information 4017 directly to any kind of hierarchy entity is particularly useful when the information is global to the entire domain or initiative.

An initiative 4109 is not a member of any domain hierarchy 4010 or goal-project hierarchy 4011, but is rather the root of an initiative hierarchy 4111 which may include sub-initiatives and a single level of goals and/or projects from any of the goal-project hierarchies. A goal or project may belong to any number of initiatives. Information may be related to an initiative in the same way that it may be related to any hierarchy entity.

Access to domains, goals, and projects is by collaborator groups 4003. A given collaborator group 4003(i) may have access to any combination of domains, goals, projects, and initiatives in model 4101. The kinds of access which a collaborator belonging to a particular group has to a particular domain, goal, project, or initiative depend on the group's group type and the permissions which the group has for the particular domain, goal, project, or initiative.

Collaborators with the proper permissions may modify not only the information 4017 associated with a goal, project, domain, or initiative, but may also modify the form of the respective hierarchy.

A limitation of the model 4101 is that it provides only one view of the hierarchies' structure. This limits the usefulness of the model to more complex processes or organizations, where multiple views of the hierarchies would be helpful.

It is thus an object of the present invention to overcome these limitations and to provide an improved system for collaborative work.

BRIEF SUMMARY OF THE INVENTION

The invention provides a system for supporting arbitrary activities involving collaborating users, in one aspect, the system includes a processor which has access to a representation of model of activity, the model including a plurality of workspaces. Each workspace includes a plurality of workspace objects for representing an organizational structure of the collaborating users using the system and representing one or more process structures for accomplishing goals. The system further includes an interface to the system for the users, the interface being provided by the processor and the interface permitting the users to view and modify the workspaces. Each user has access to one or more of the workspaces, and each user can have different access permissions in different workspaces.

The workspace objects include a domain hierarchy representing the organizational structure of the users using the system and an initiatives hierarchy representing the process structures for accomplishing the goals. The domain hierarchy and the initiatives hierarchy provide the users two views of the workspace objects without a need to duplicate the workspace objects in the initiatives hierarchy.

The workspace objects include a plurality of resources associated with the domain hierarchy and the initiatives hierarchy. Each resource is a collection of shared elements defined by the users that give the users associated with the workspace access to information sources. The information sources can include a document local to a user to be uploaded into the system, a text file created by the user using a text editor of the system, links to access information or tools internally or externally to the system, RSS (Really Simple Syndication) feeds, and discussion topics.

In another aspect, the system includes a processor which has access to a representation of model of activity, the model includes a plurality of resources, each resource including a collection of shared elements defined by the user that give the other users access to information sources, and a knowledge board for creating reports based on data fields of the resources. The system further includes an interface to the system for the users, the interface being provided by the processor and the interface permitting a user to view and modify the knowledge board.

In another aspect, a processor which has access to a representation of model of activity, the model includes a plurality of resource templates, each resource template defining data fields to be created for a resource. The system further includes an interface to the system for the collaborators, the interface being provided by the processor and the interface permitting a user to view one or more resource templates and to create the resource from the resource template, the resource including a collection of shared elements defined by the user that give other users access to information sources.

Other objects and advantages will be apparent to those skilled in the arts to which the invention pertains upon perusal of the following Detailed Description and drawing, wherein:

BRIEF DESCRIPTION OF THE SEVERAL
VIEWS OF THE DRAWINGS

FIG. 1 provides an overview of the system 101 for supporting collaborative activity.

FIGS. 4A-4K show more detailed views of entity-relationship diagrams for select groups of tables.

FIGS. 7-8B illustrate the set up of resources.

FIGS. 9A-9E illustrate the set up of workspaces.

FIGS. 10A-10F illustrate the set up of users.

FIGS. 11A-12 illustrate a login by a user.

FIGS. 17A-17C show the creation of a resource.

FIGS. 19A-19I show the set up of links for a resource.

FIGS. 20A-20E show the set up of RSS feeds for a resource.

Figures 22A, 22B:
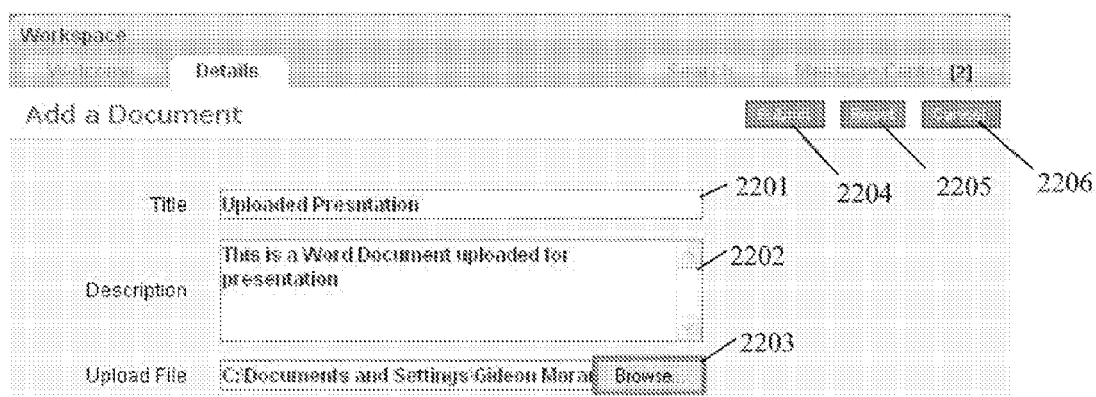

FIGS. 22A 22F show the adding of a document to the workspace.

Figure 22C:
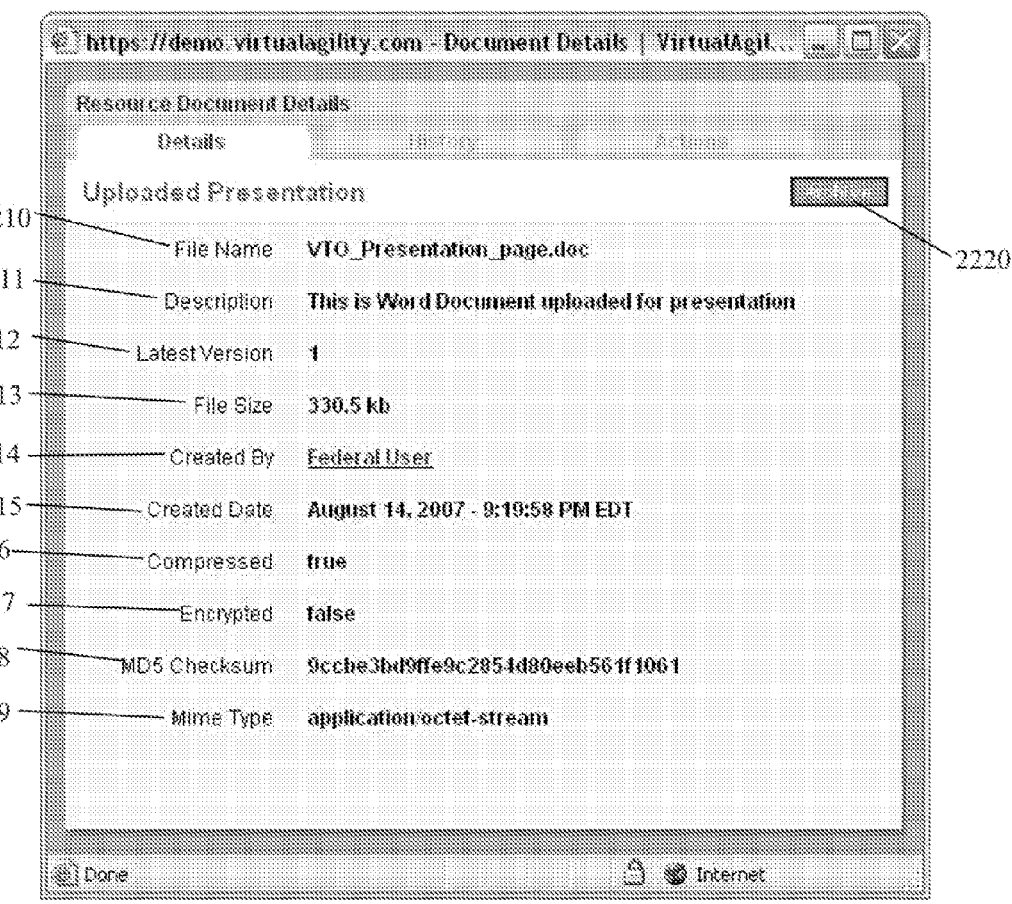
Figure 22D:
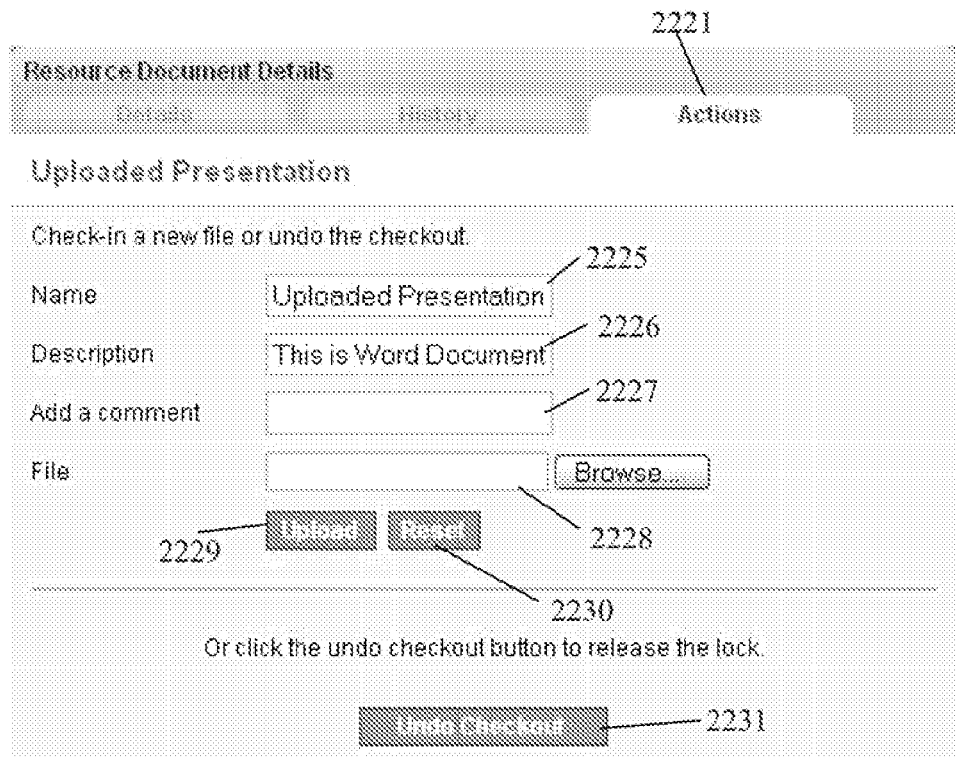
Figure 22E:
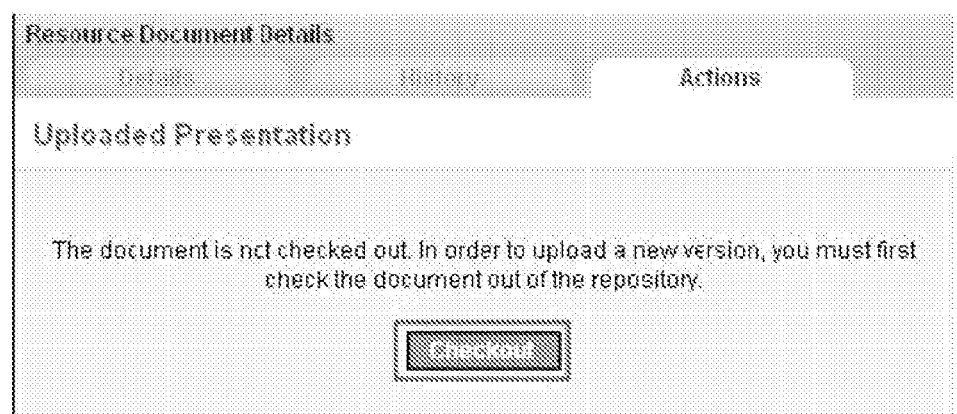
Figures 22F, 22G:
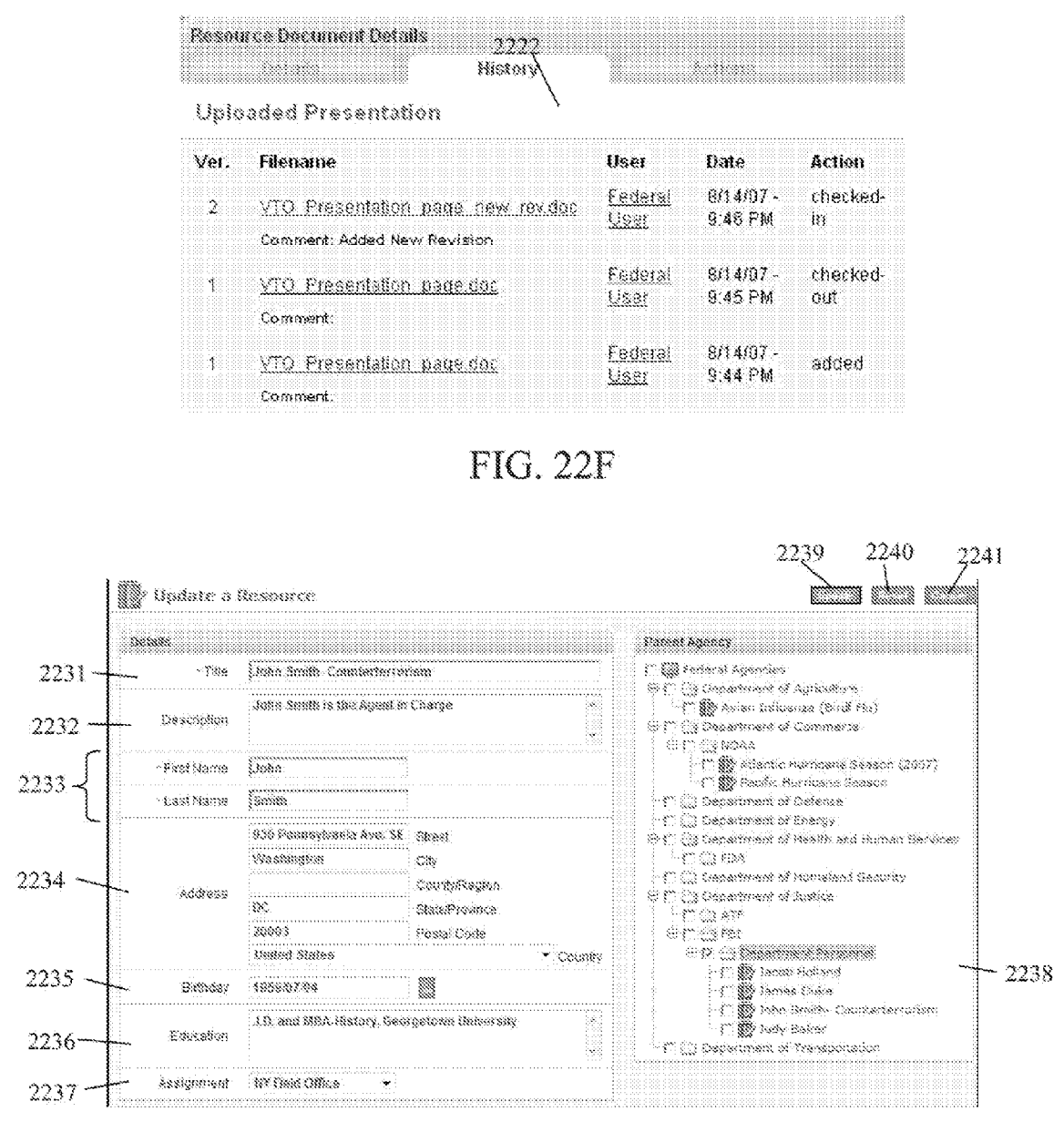
Figure 22H:
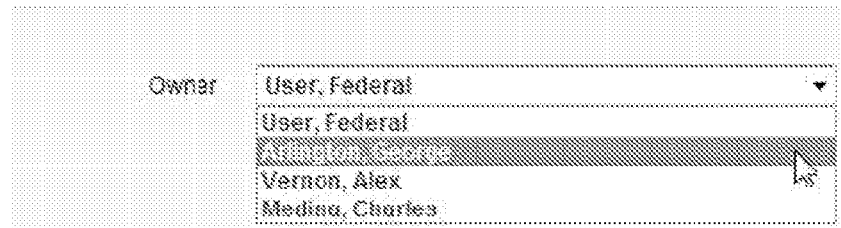
Figure 22I:
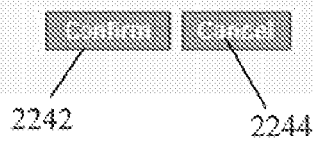

FIGS. 22G-22I show the updating of a resource.

Figure 23A:
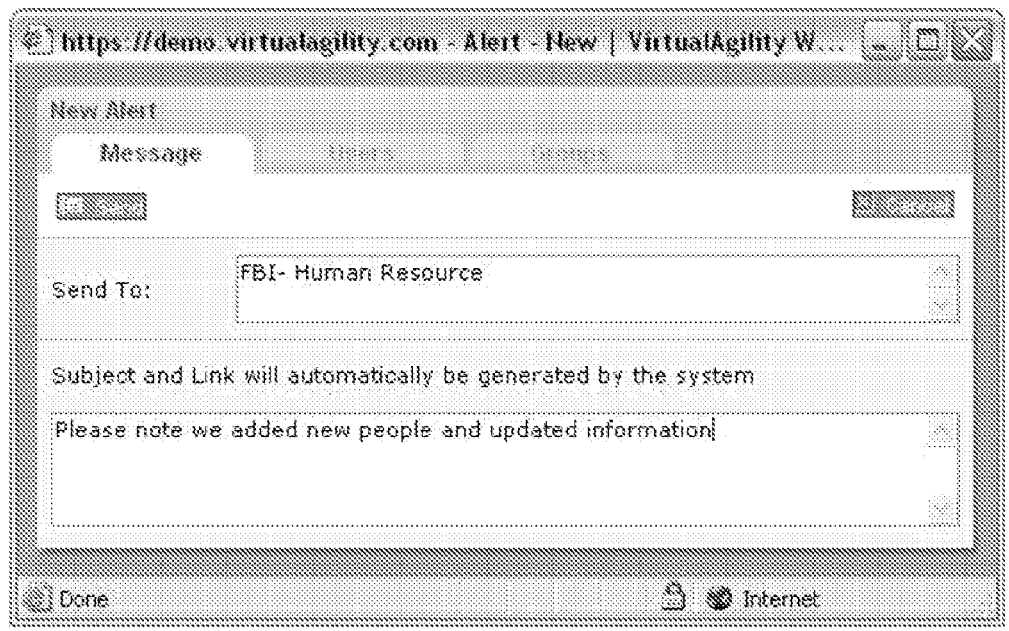

FIG. 23A illustrates a message window.

Figures 23B, 23C:
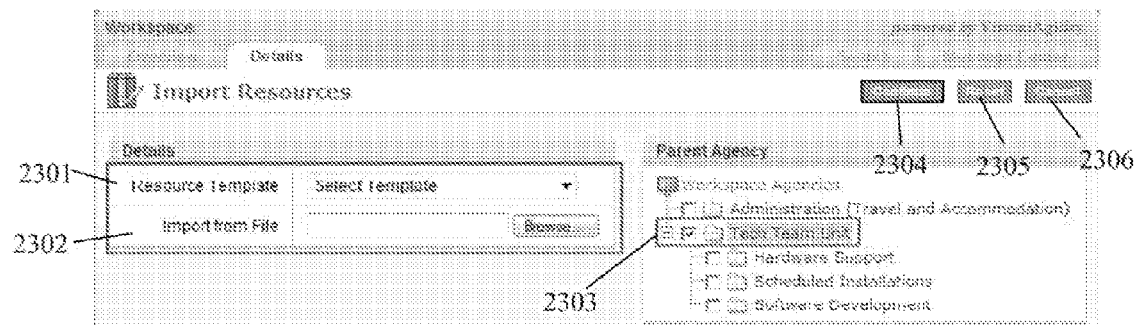
Figures 23D, 24A:
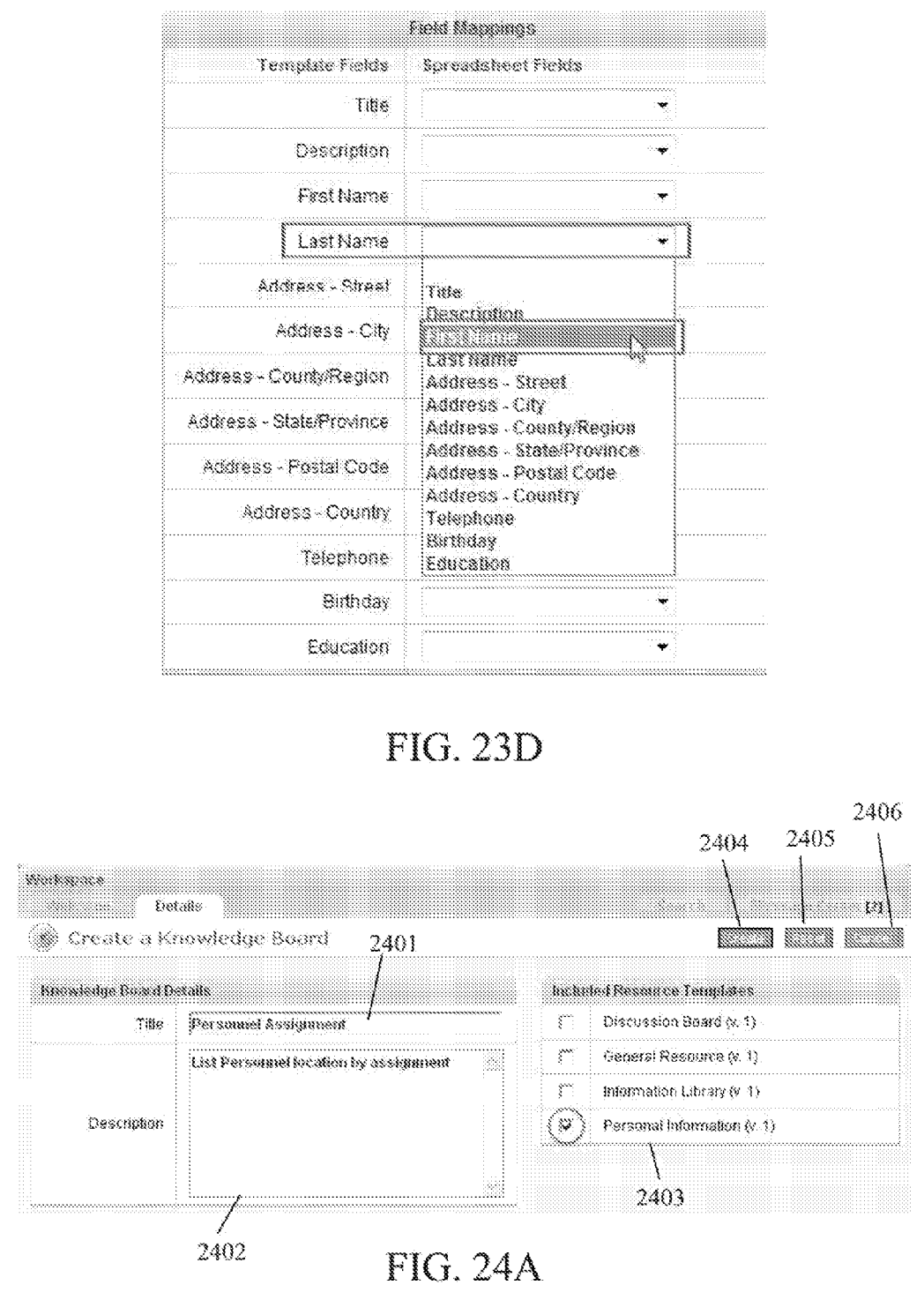

FIGS. 23B-23D show the importing of resources for a workspace.

FIGS. 24A-24E show the set up of knowledge boards.

FIGS. 25A-25F show the set up of an operation.

Figure 26:
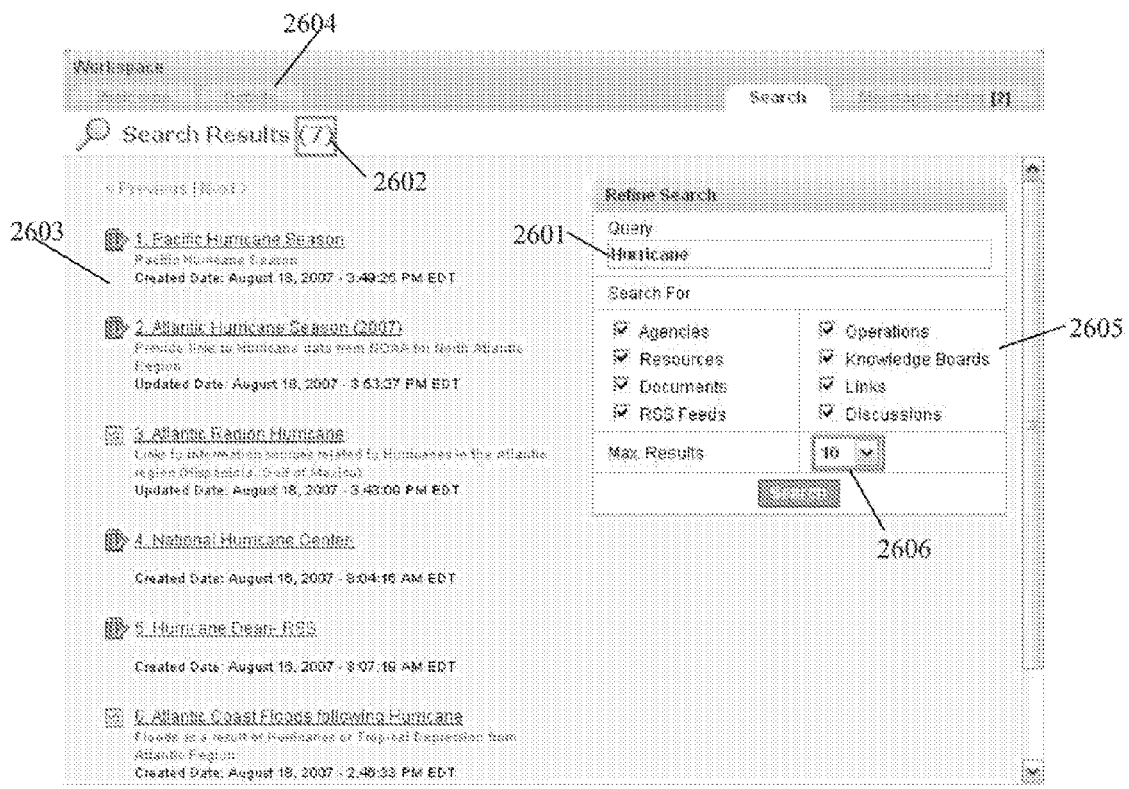

FIG. 26 shows a search results screen.

Figure 27A:
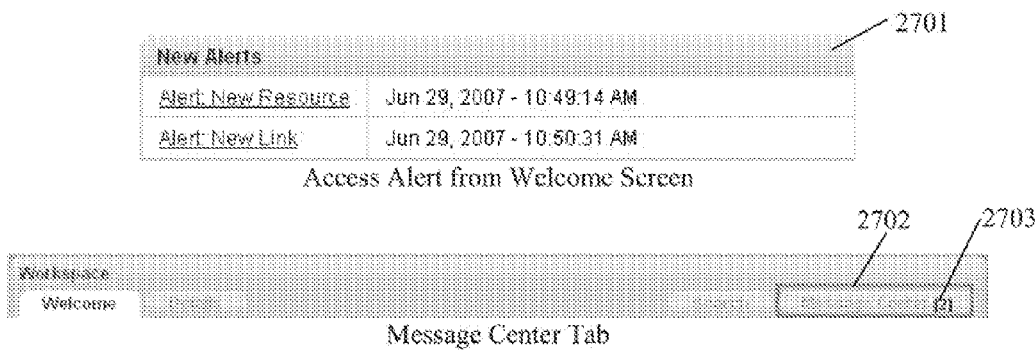

FIG. 27A shows how a user enters the message center.

FIG. 27B shows the refreshing of the message center.

FIG. 28 shows the set up of alerts.

FIGS. 29A-29F show the set up of messages.

FIG. 30 shows the set up of permissions.

Figure 31B:
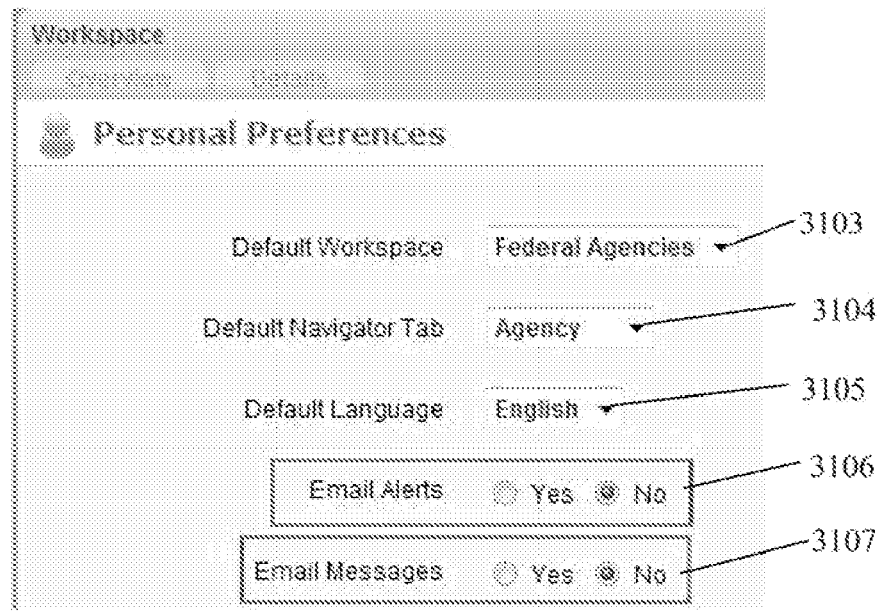
Figure 31C:
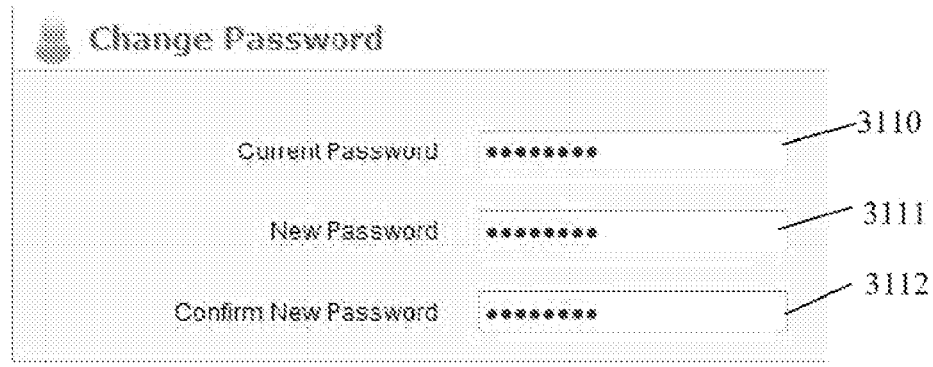

FIGS. 31A-31C illustrate the set up of user's personal preferences and password.

Figure 32:
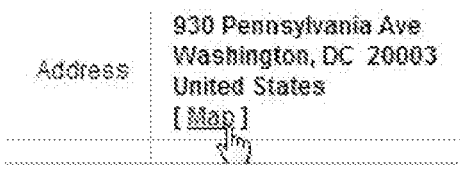

FIG. 32 shows the display a map option.

Figure 33A:
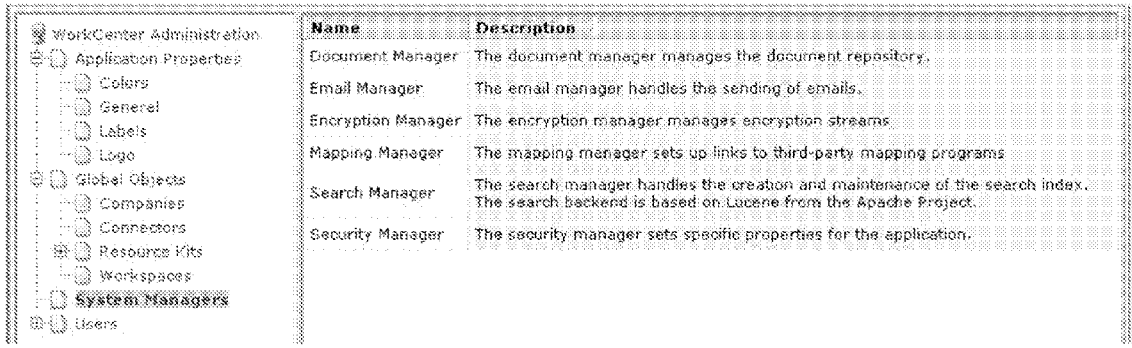

FIG. 33A shows a system managers screen.

Figure 33B:
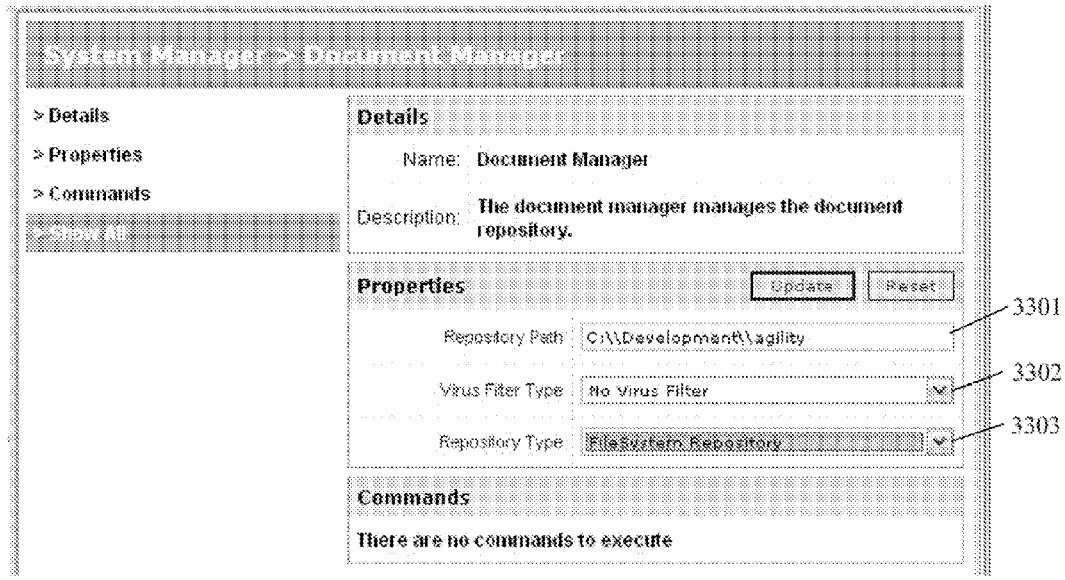

FIG. 33B shows the set up of the document manager.

Figure 33C:
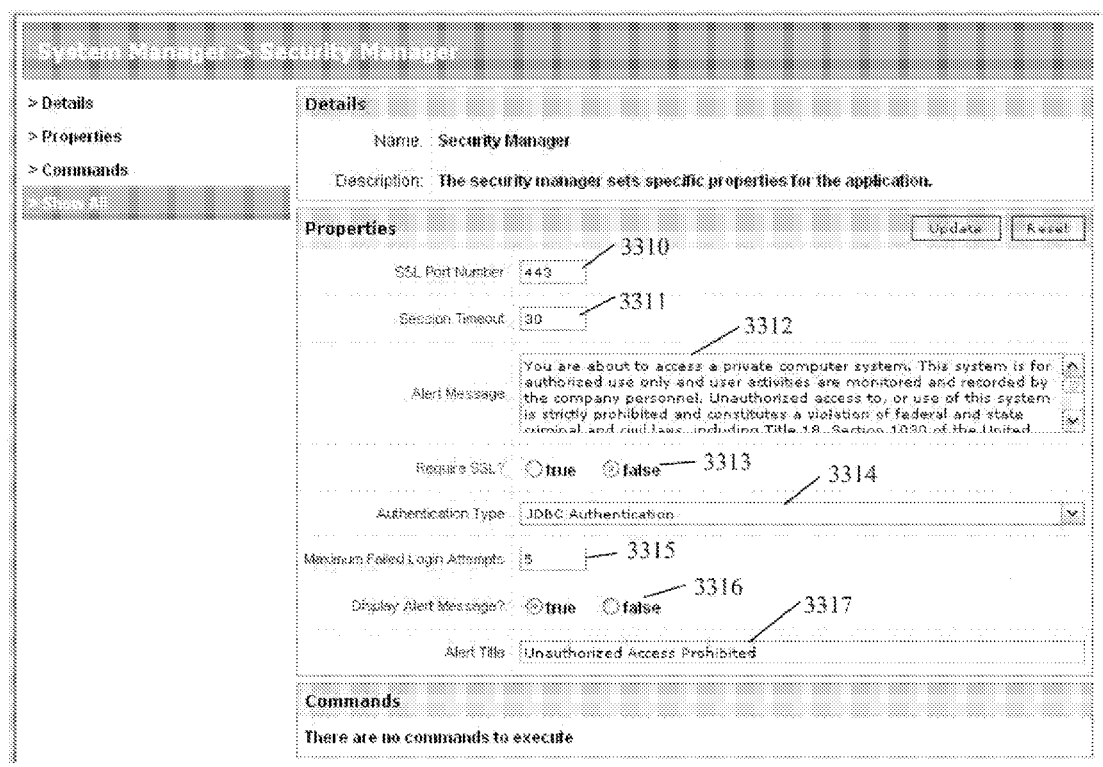

FIG. 33C shows the set up of the security manager.

Figure 33D:
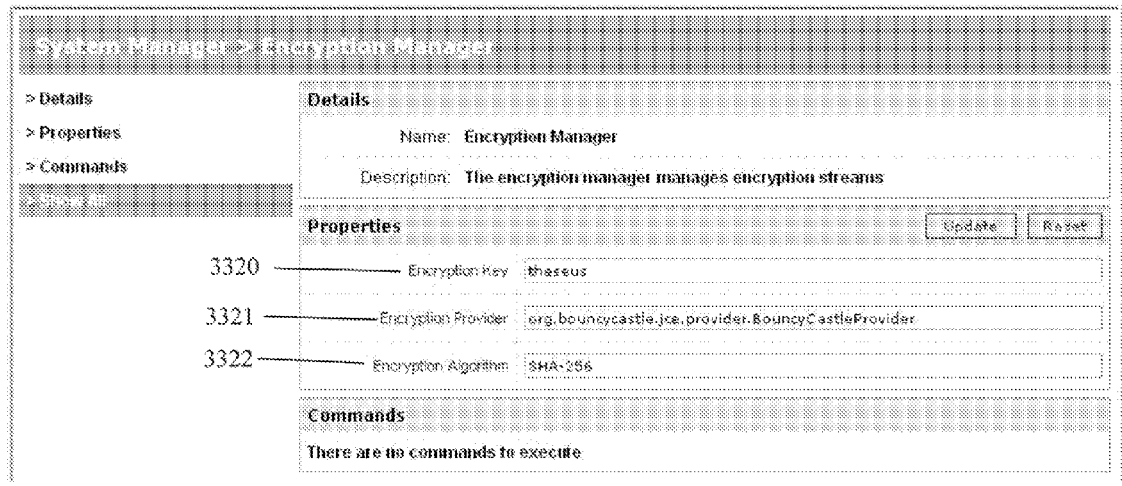

FIG. 33D shows the set up of the encryption manager.

Figure 33E:
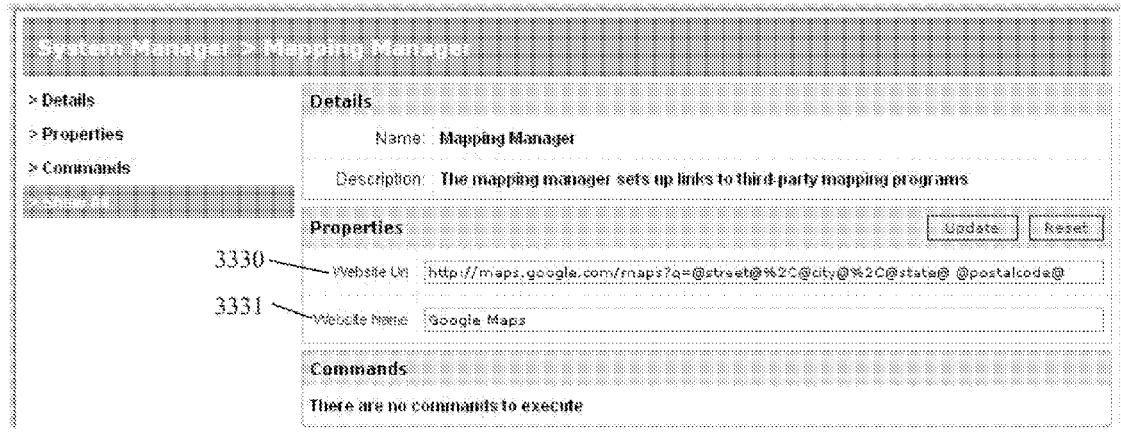

FIG. 33E shows the set up of the mapping manager.

Figures 33F, 33G:
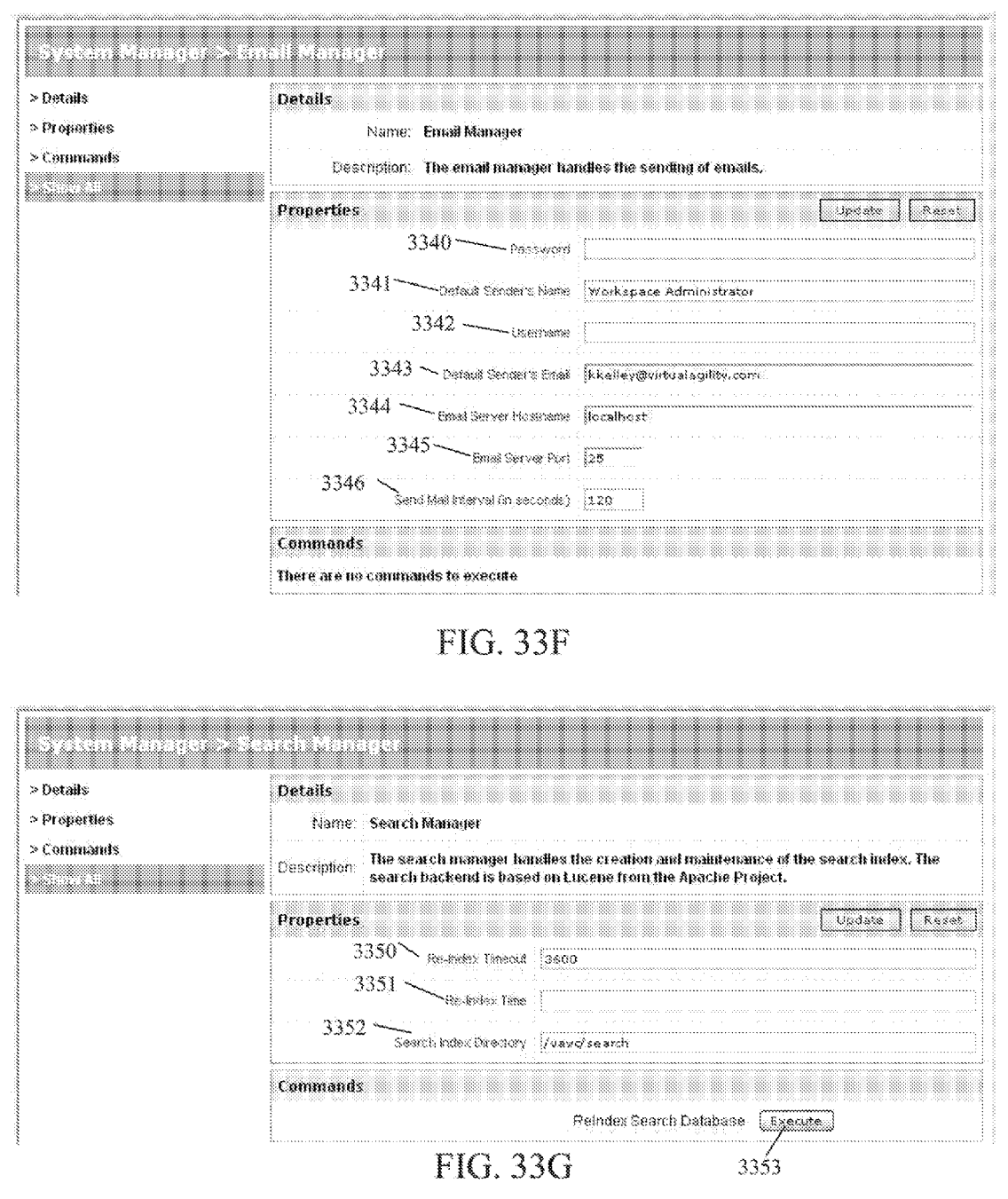

FIG. 33F shows the set up of the email manager.

FIG. 33G shows the set up of the search manager.

Figure 34:
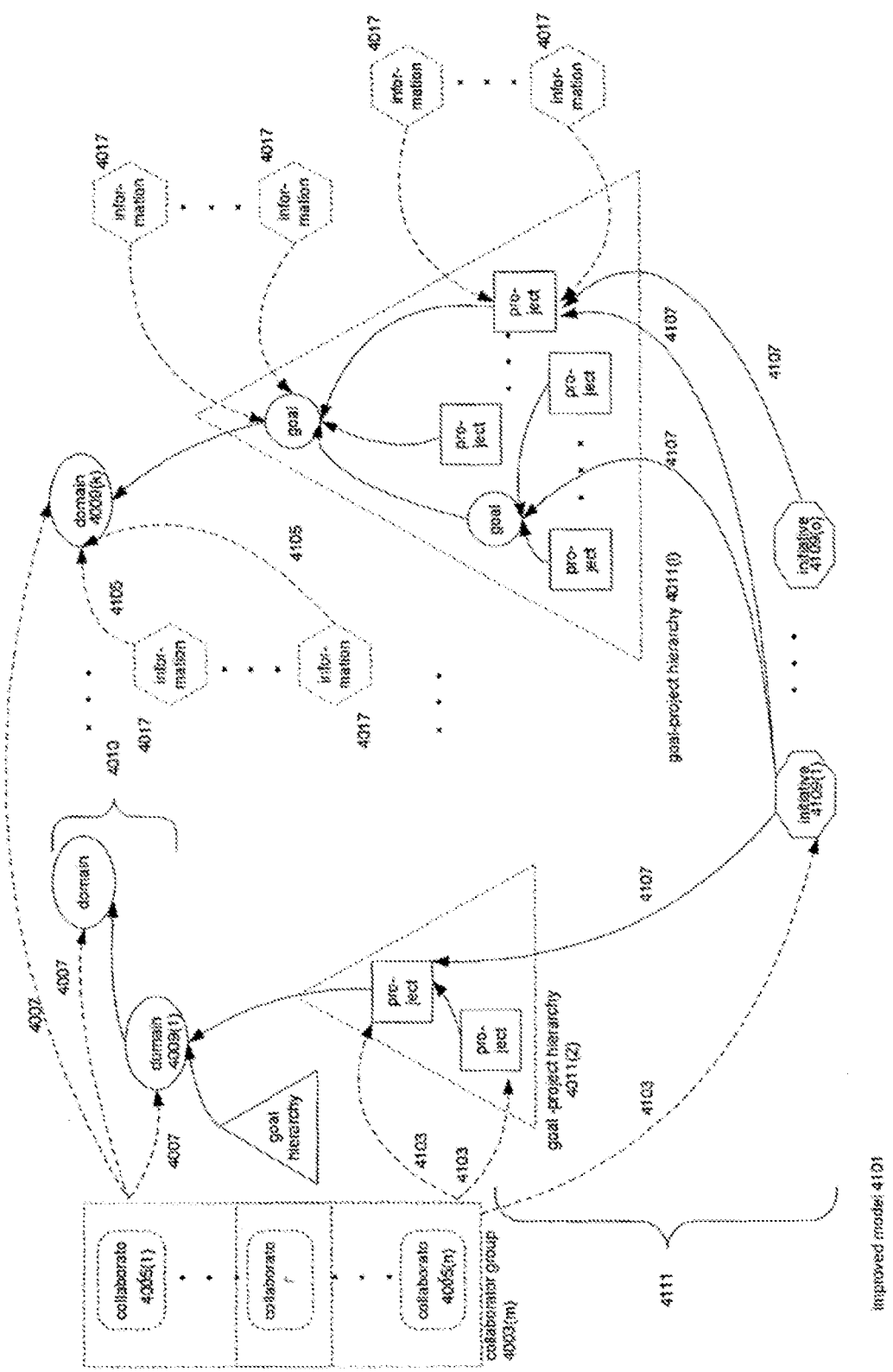

FIG. 34 shows a diagram of a prior art collaboration model.

Reference numbers in the drawing have three or more digits: the two right-hand digits are reference numbers in the drawing indicated by the remaining digits. Thus, an item with the reference number 203 first appears as item 203 in FIG. 2.

DETAILED DESCRIPTION OF THE INVENTION

A system for supporting collaborative activity includes a processor and an interface that is provided to collaborators by the processor. The processor has access to a representation of a model of the activity. The form of the model is defined by the collaborators and the representation of the model provides access to information related to the activity. The interface permits a collaborator to perceive and modify the model's form and to perceive and modify the information to which the representation of the model provides access. The model is implemented using workspaces from which the user may access information and perform activities having to do with the collaboration. The workspaces are provided to users as part of a shared online collaboration software platform that connects people, strategies, technology, and resources in a rapidly developed and deployable on-line workspace.

A. Overview of the system

Figure 1:
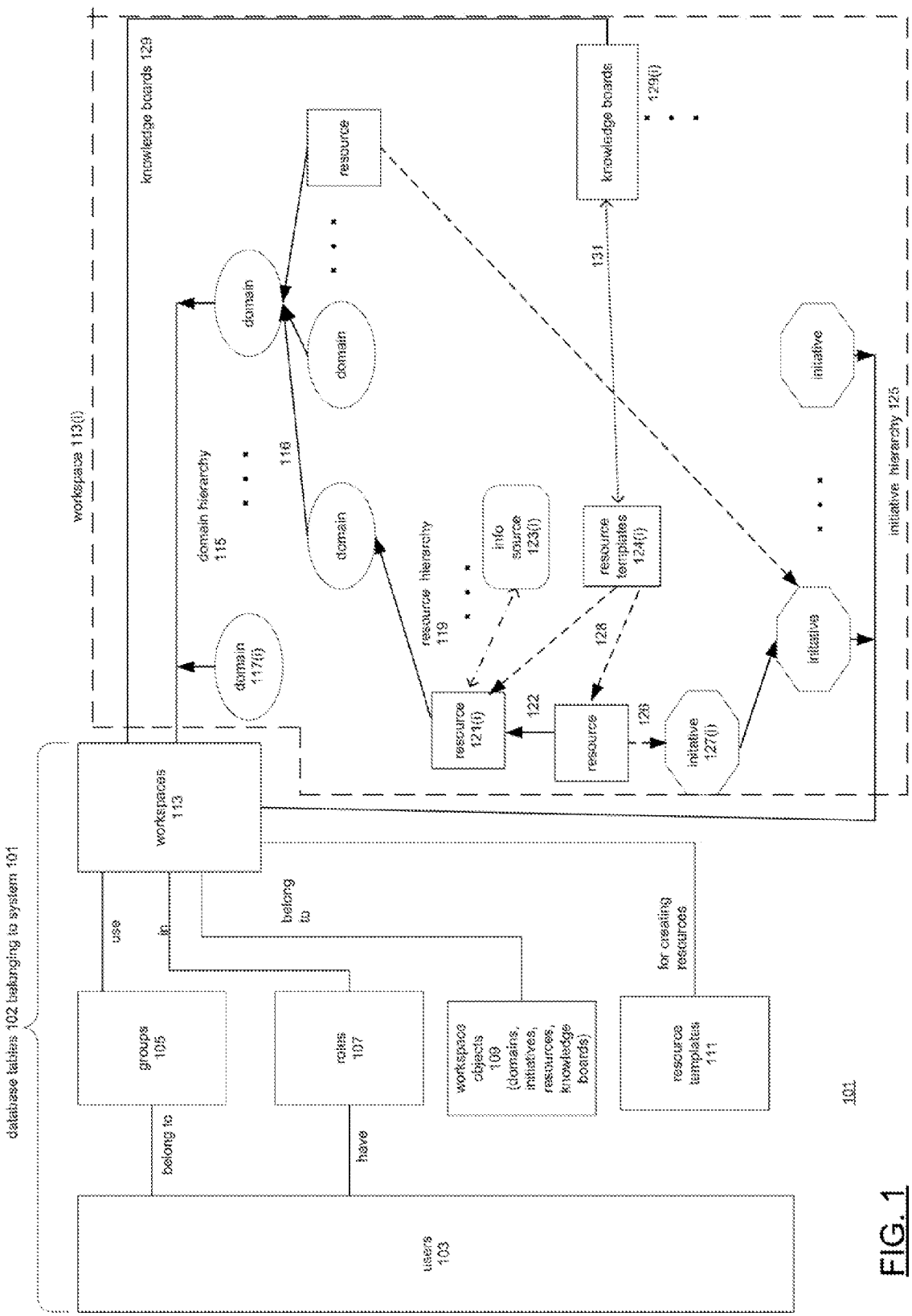

FIG. 1 provides an overview of the system 101 for supporting collaborative activity. Die system is scalable to be usable in very large collaborative enterprises. The system contains two types of elements, those that are structural (domains and initiatives) and those that are shareable (resources). Domains 117 represent the organizational structure of the groups coming together in the system. Initiatives 127 represent one or more process structures for how the group or teams accomplish their goals. Domains and initiatives provide two different views of the resource without the need to duplicate the resources. Resources 121 are collections of elements defined by users that give the users access to information sources 123. The individual information sources to which the resource gives access are associated with fields in the resource.

Collaborating users can organize domains 117 and initiatives 127 into hierarchies 115 and 125. A user can associate a resource 121 with a domain, a sub-domain, or another resource associated with a domain. Resources can be presented as many limes as required within the initiative, and therefore could be used in multiple scenarios, without the need to be duplicated. The domain and initiatives hierarchies thus provide users with ability to view objects of information (such as resources and/or knowledge boards (described below)) within an organization structure or an operational structure without need to duplicate the objects.

Domains, initiatives, and resources can be renamed by administrators to reflect the terminology used by their organization. For example, a domain can be renamed as an organization or an agency; an initiative can be renamed as an operation or a process; and a resource can be renamed as a record.

Resources may be organized into resource hierarchies, as shown by arrow 122, and the resource hierarchies belong to domains 117, which themselves may be hierarchically organized (115). A resource may have a domain as a parent, but a domain cannot have a resource as a parent. A given resource 121 may belong to only one domain 117. Generally, though not necessarily, the domain hierarchy reflects the organization chart of the collaboration. For example, if the collaboration is a business, there may be domains for manufacturing, engineering, sales, accounting, human resources, and corporate management, with sub-domains within the domains, for example, a sub-domain for hourly employees in human resources.

In addition to being related to a domain, a resource may also be related to an initiative 127. Initiatives may form hierarchies 125. The navigation GUI for system 101 permits the user to navigate to a resource either by means of the domain hierarchy or by means of the initiative hierarchy. Generally, though not necessarily, initiatives are created to deal with specific problems where the resources required to deal with the problem cut across domain lines. For example, if the domains are set up as described in the foregoing example and the business has a quality control problem, an initiative may be set up to deal with the quality control problem and may include resources from the manufacturing, engineering, and corporate management domains. Domains and initiatives thus give participants different perspectives on the resources needed for the collaboration.

Resource templates 124 are global objects that define classes of resources, as defined by a system administrator. They specify what types of information are associated with resources belong to the class defined by the resource template by defining the number and types of data fields associated with them. When a user creates a resource, the user begins with a resource template. The fields of the resource template are filled in by the user when the resource is created or modified, according to the domain or initiative the resource relates to.

In addition to viewing resources within a domain or initiative, the resource template can be used to locate resources belonging to the class that the template defines. This location of resources is defined by users in knowledge boards or dashboards 129. When a user creates a knowledge board, the user uses the resource template to associate resources belonging to the resource template's class with the knowledge board and to select what information from resources of the class will be displayed in the knowledge board. The relationship between the resource template and the resources created from the template are maintained in the system for the knowledge boards. A knowledge board is defined for a workspace but does not belong to any of the hierarchies. The navigation GUI lists the workspace's knowledge boards along with both the initiative and domain hierarchies. The users select the columns (data fields) in the resource template to display and filler by parameters, such as specific text, dates, etc. These data fields are used to locate resources to which the template belongs and are then displayed in the knowledge board report in a table form.

The domains, initiatives, and resources are organized into a plurality of workspaces, each of which provides a managed environment. The system gives each collaborator/user access to one or more workspaces where a user may have different roles in different workspaces. The workspaces may be configured by non-technical people. The components of a workspace include domains 117, resources 121, initiatives 127, information sources 123, and dashboards or knowledge boards 129. These are termed in the following as the workspace's objects. Preferably, the system is implemented in a client-server architecture. The system server stores the workspace and its objects, as well as global objects, such as users and resource templates. The client comprises a processor which ahs access to the system elements. Users access the system's elements through a GUI at the client. Users may have different kinds of access to the objects in a workspace. The workspace includes a navigation GUI as part of the online collaborative software platform that presents the content of its objects. A system administrator can create a unique workspace for a group of people, assign local administration responsibilities, and assign global resources from a global pool of resources. Users can be part of multiple workspaces and carry different access permissions. For example, a specific user can be a user only in one workspace and have administrator rights in another. User access permissions are described further below.

In an exemplary embodiment, information sources that can be related with a resource include documents, text files, links, RSS (Really Simple Syndication) feeds, and discussions. For documents already created and stored locally, a user can select from his workstation or from any shared drive a document to add to a resource. The document is then physically copied and loaded into the system server and will reside on its file directory system. All documents loaded on the system are maintained for the life of the system. This enables users to upload and store documents relevant to the resource. To modify the document after its association with the resource, a user "checks out" the document and downloads it from the server to the client for editing. When the editing's done, the user uploads the modified document from the client to the server.

The system also provides a simple text editor at a client of the system with which a user can create and upload a text file of the .txt type to the system server. This enables users to create a free format text file that can be created, uploaded, and opened by users without the need for a word processing application.

The system provides users the ability to relate links to the resource. Links provide quick access to information or tools. The link can be an external link or an internal link. External links provide access to an outside source, utilizing an address like an URL, or a link to a network source, utilizing a link to a shared device. This enables users to link to a shared document or other file types without the need to upload the files to the system. Other users on the network could access the same file without being part of the system. Internal links provide access to other resources within the system. When users want to use a resource that resides in a different structure of the system, they can provide a link that will launch that resource whenever it is called. This provides the flexibility to reuse resources without the need to create special initiatives for aggregation.

The system provides users the ability to relate an RSS feed to the resource. RSS feeds are web feeds in XML format that enable users to receive updated news or information articles through a special reader screen. The ability to provide these connections allow users to create a link that provides new, updated article every time the link is selected and articles are presented.

The system provides users the ability to relate discussions to the resource. Discussions are on-line, asynchronous, threaded chat boards that provide users a place to exchange questions, opinions, and remarks in relation to the resource topic. Users can initiate a discussion in-context to the resource's objective and either receives answers to the discussed topic or reply to a discussion topic started by another user.

Figure 2:
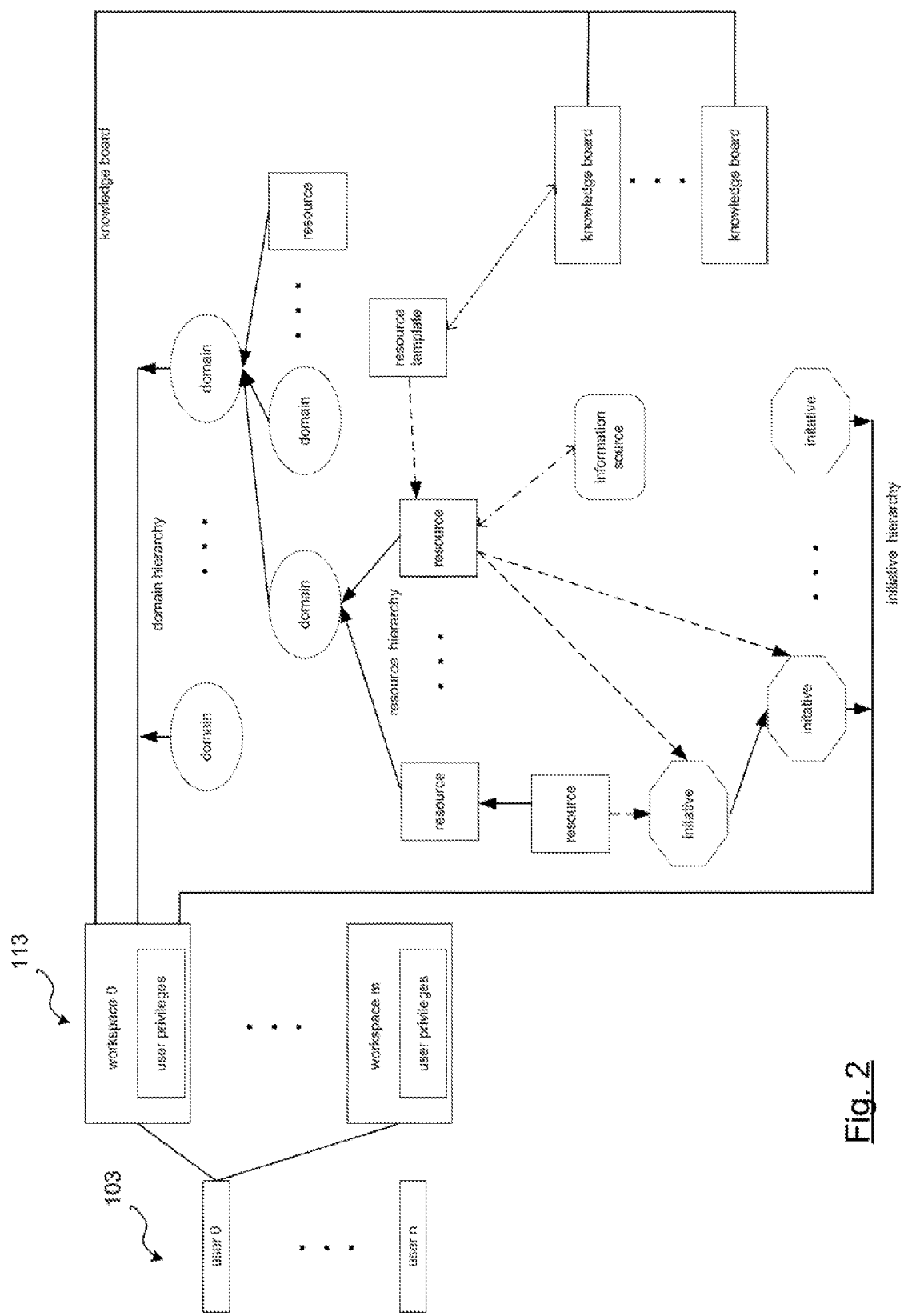
FIG. 2 illustrates a user's access to workspaces.

FIG. 2 illustrates a user's access to workspaces. Users 103 can be part of multiple workspaces 113 and carry different access permissions or privileges. The access that a given user has to a given object in a given workspace depends on the permissions that the user has to access the object in the workspace and the role that the user has in the workspace. The permissions in an exemplary embodiment are: no permission; read; read-create; read-create-update; read-create-update-delete. Permissions may be assigned to individual users and to groups of users. Group permissions override individual permissions. For example, if an individual user has no access to a given object but belongs to a group that has read-create access, the user will have read-create access as long as he or she is a member of the group. If a user has neither permission as an individual nor permission as a group member to access an object, that object will be invisible to the user.

Actual access to a given object may be limited by the given user's role in the workspace. The workspace roles in an exemplary embodiment are: viewer; user; manager; and administrator. For example, a user who has a viewer role may read but not create, update, or delete objects in the workspace. Consequently, such a user will see only those objects to which the user has some kind of access by virtue either of the user's individual permissions or by virtue of the group permissions of a group to which the user belongs. Because the user has the viewer role, the user will be able to do nothing with the objects to which he or she has access but read them.

Returning to FIG. 1, database tables 102 contain the information used to represent a workspace 113(i) and its components. In an exemplary embodiment, database tables 102 are implemented using a standard commercial database system such as those manufactured by Oracle Corporation™. The tables are shown in FIG. 1 in logical terms. A table of users 103 contains an entry for each user who has access to workspace in system 101. The users who have access to a given workspace are organized into groups in the workspace by a group table 105 and are assigned roles in the workspace by a role table 107.

A workspace table 113 has an entry for each workspace. Associated with the entry for the workspace are the groups that have access to the workspace, the roles these groups have, the resource templates used in the workspace (table 111), and the domains, initiatives, resources, and knowledge boards belonging to the workspace (table 109).

The system provides an internal messaging center to allow quick communication between users or whole groups of users. The message center does not rely on an email server so it can be used even when access to other systems in limited. The message center displays alerts generated by the system 101 and messages to specific users. Users can proactively select important resources within the system and let the system alert them whenever a new resource is added, changed, document are uploaded, links created, and others. This allows users to be selective as for what is important to them to be alerted of and reduce the need for users to send email messages alerting users of updates or changes to information. An email option is available for users who wish to receive the messages and/or the alerts on their email system as well. In this way, users who are away from the system can still be alerted to important information.

The system allows administrators to perform global setup of the navigation GUI. This includes the GUI for the application and the definitions of companies for which the workspaces are created. The system administrator can customize the application's logo, licensing keys, and application level administrative roles and names. The system administrator can define the companies that are sharing the GUI, including names and information of the companies, divisions, and departments.

B. Tables Implementing System

Figures 1, 3A:
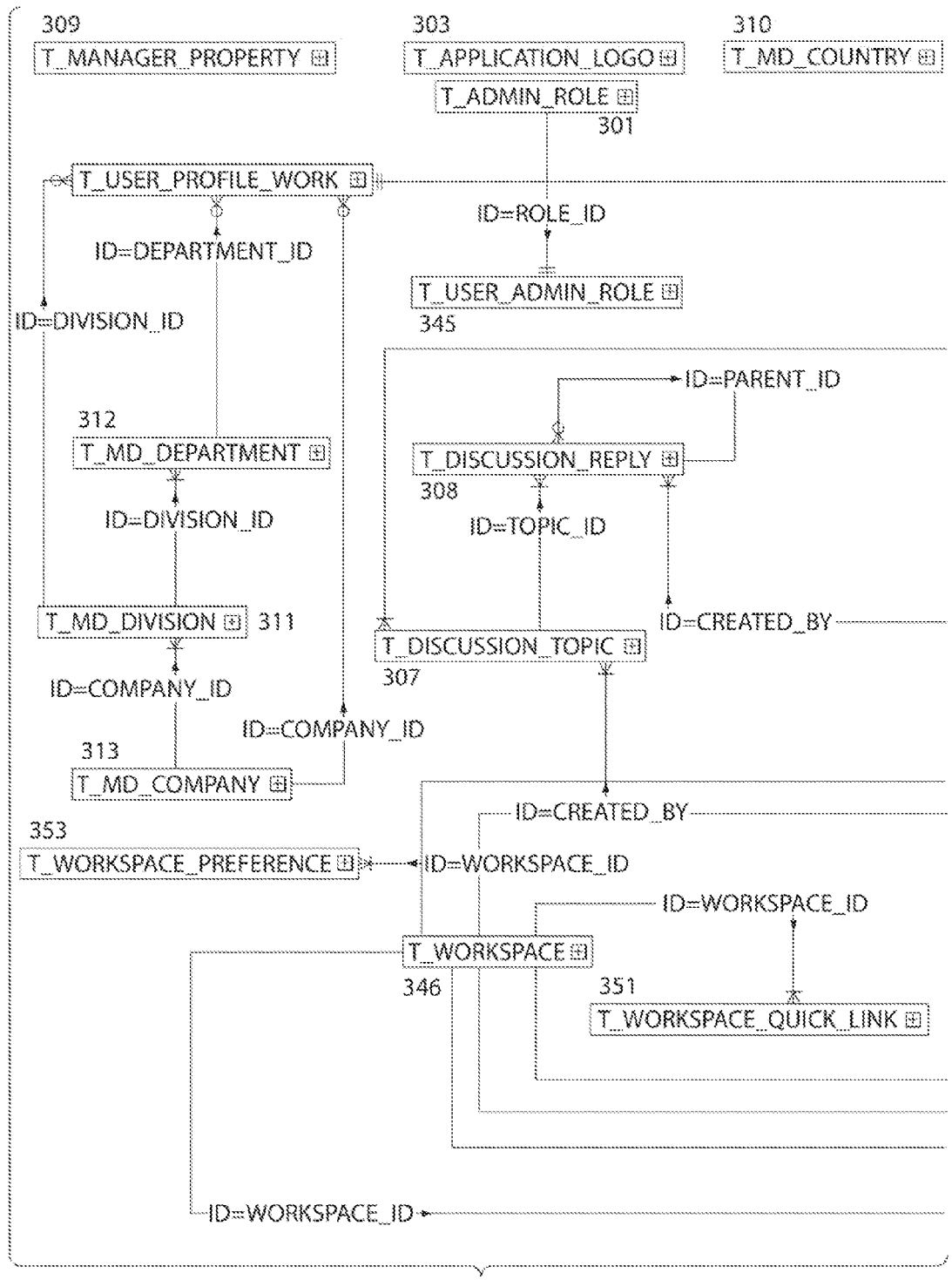
FIGS. 3A and 3B show the tables that are relevant to the implementation of the system.
Figures 2, 3A:
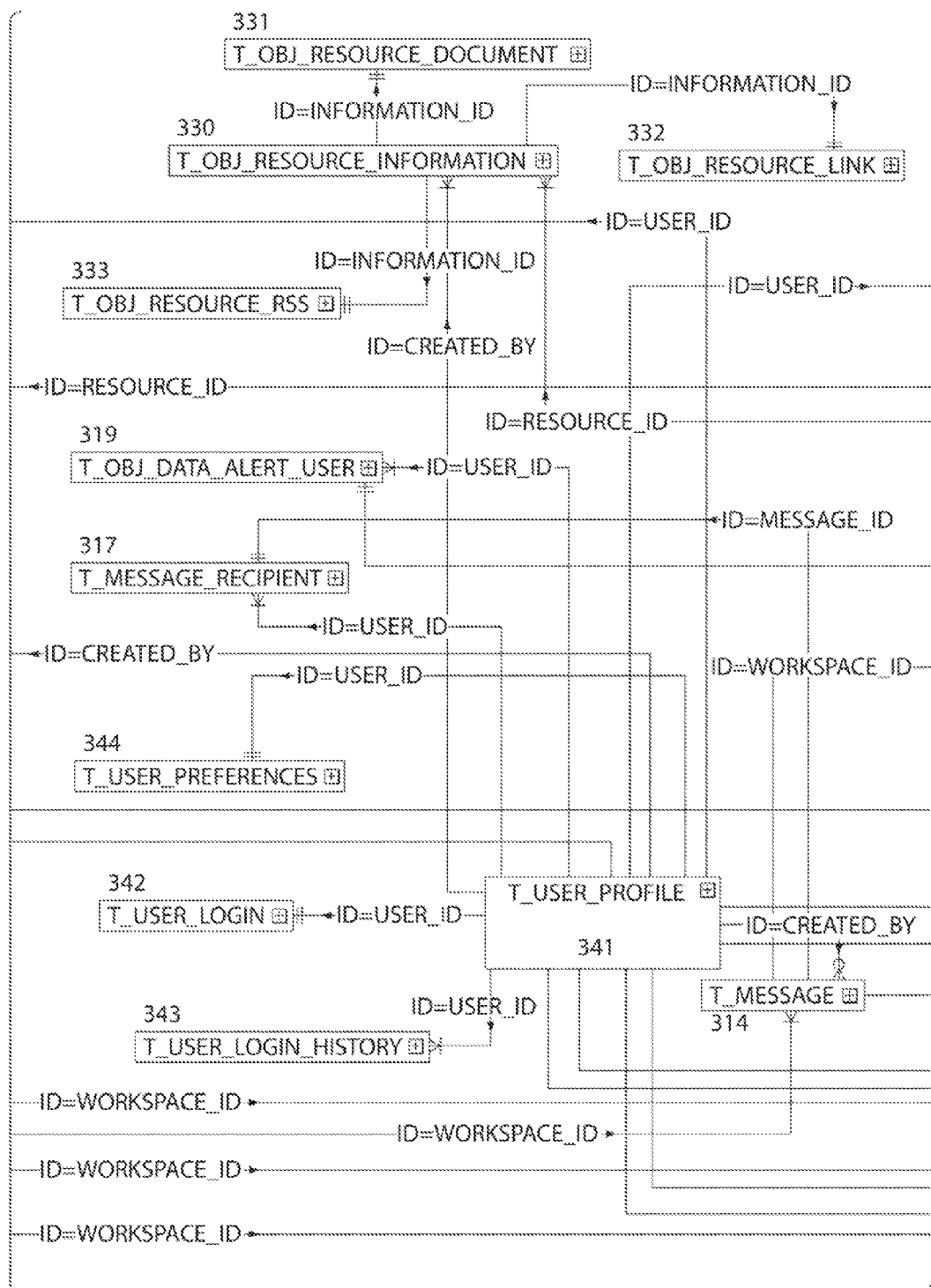
Figures 3, 3A:
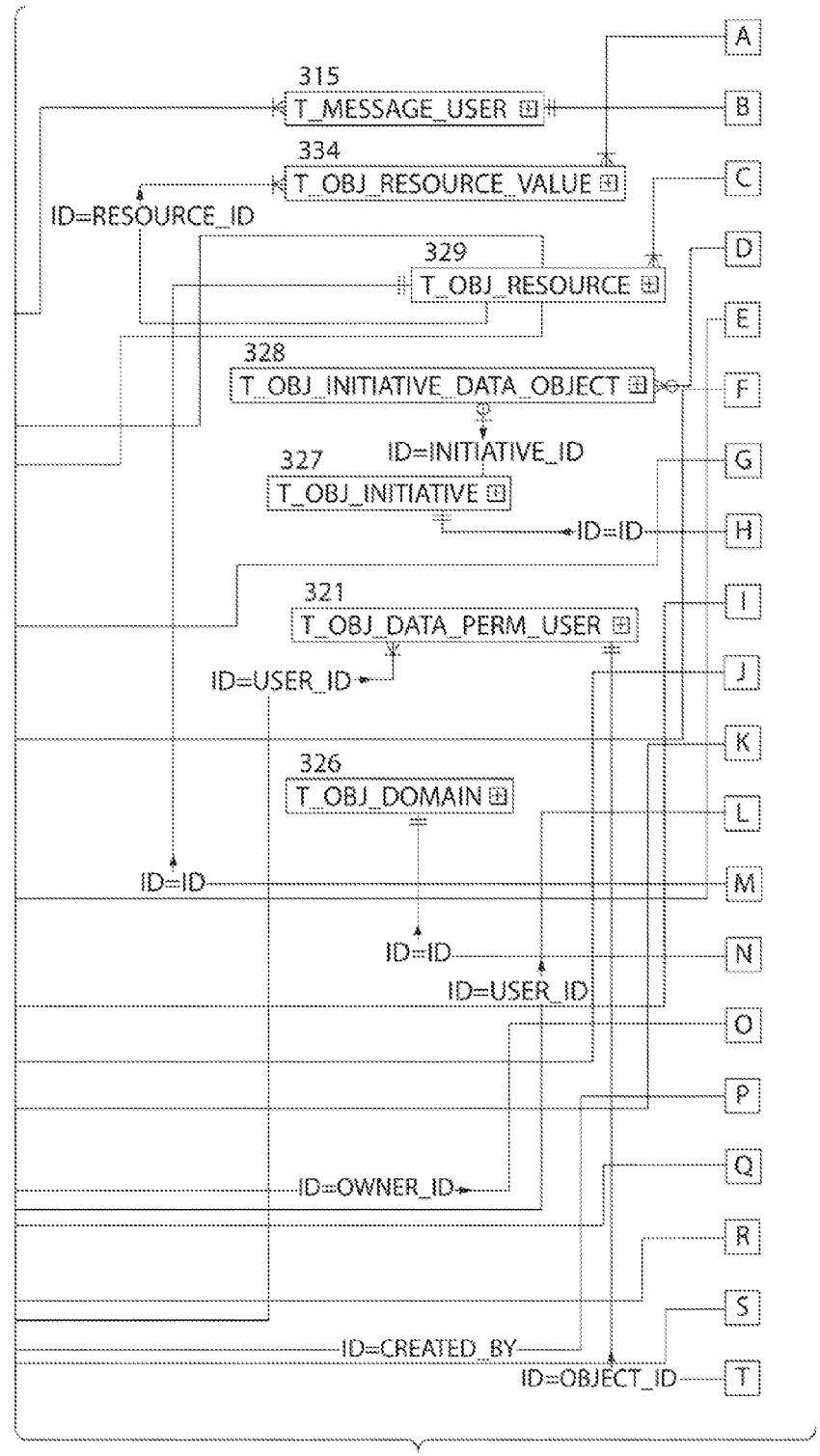
Figures 1, 3B:
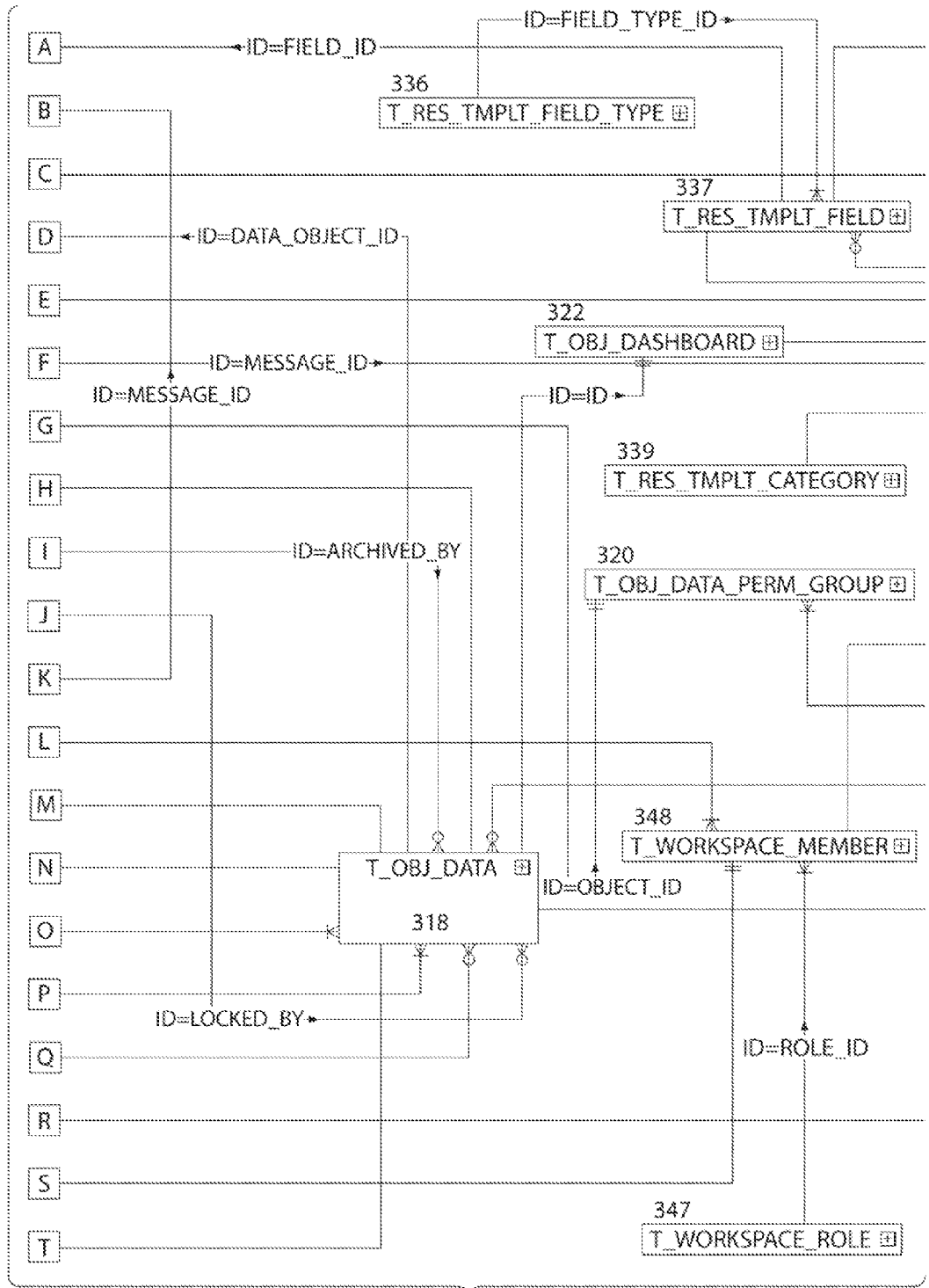
Figures 2, 3B:
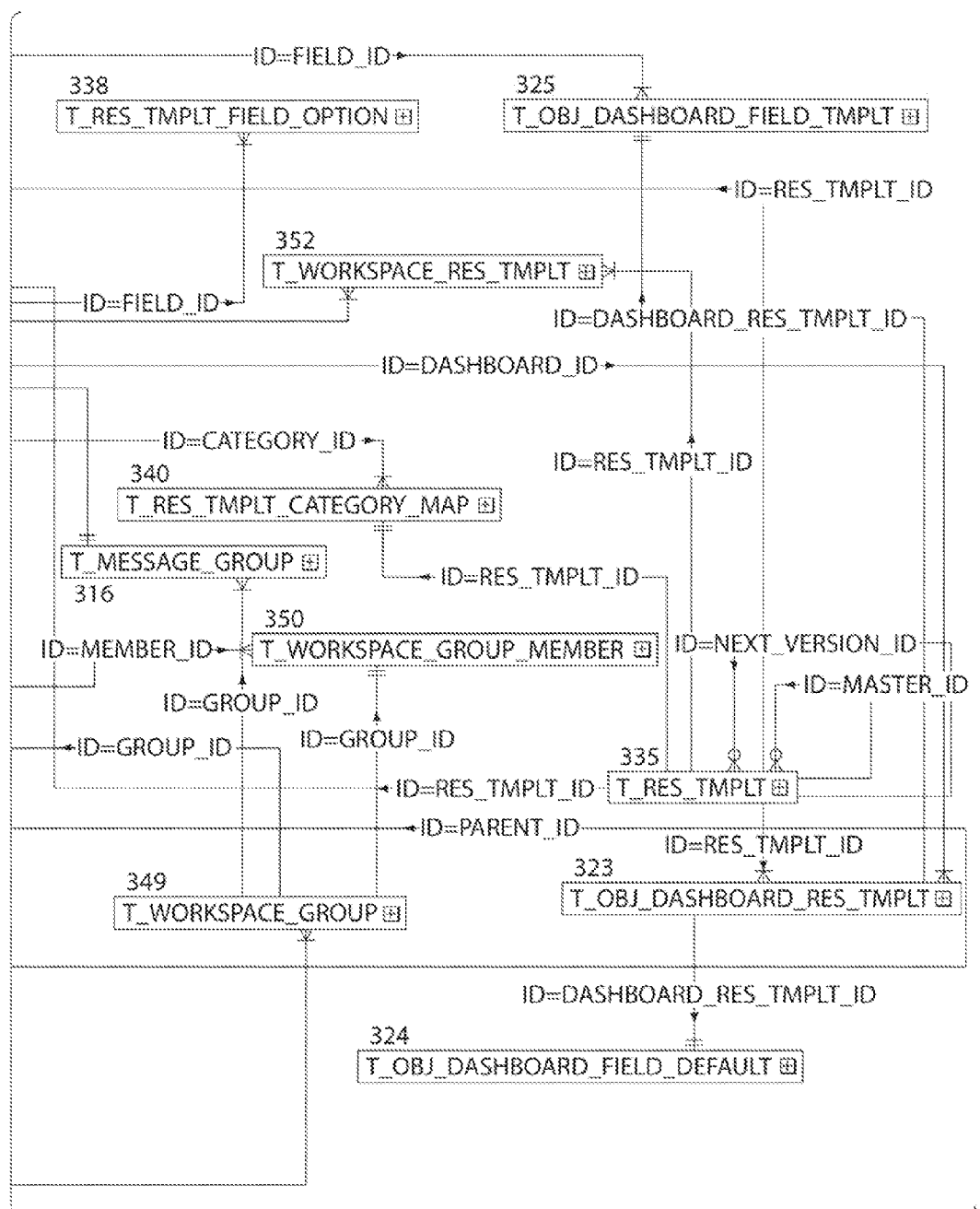

FIGS. 3A and 3B show the tables that are relevant to the implementation of the system as shown in FIGS. 1 and 2. FIGS. 3A and 3B are entity-relationship diagrams of the relevant tables. In such diagrams, arrows connecting the tables show relationships between them that are based on the occurrence of keys for rows in one table as values of non-key fields in rows in others of the tables. For example, each row of the table T_USER_ADMIN_ROLE table 345 contains a field whose value is a key for a record in the table T_ADMIN_ROLE 301. As shown there, the table in which the identifying value is a key is at the head of the arrow and the other table at the tail. In functional terms, what the arrow indicates is that the value of a field in a row of the table at the tail of the arrow can be used to retrieve a row from the table at the head of the arrow. The number of branches at the head of the arrows indicates how the numbers of rows in the two tables relate to each other. Multiple branches indicate a many-1 relationship, where many rows in the table at the tail of the arrow contain the key of a given row in the table at the head of the arrow. A single branch indicates a 1-1 relationship, where there will be a single row in the table at the tail of the arrow that has the key of the given record.

Figures 1, 4A:
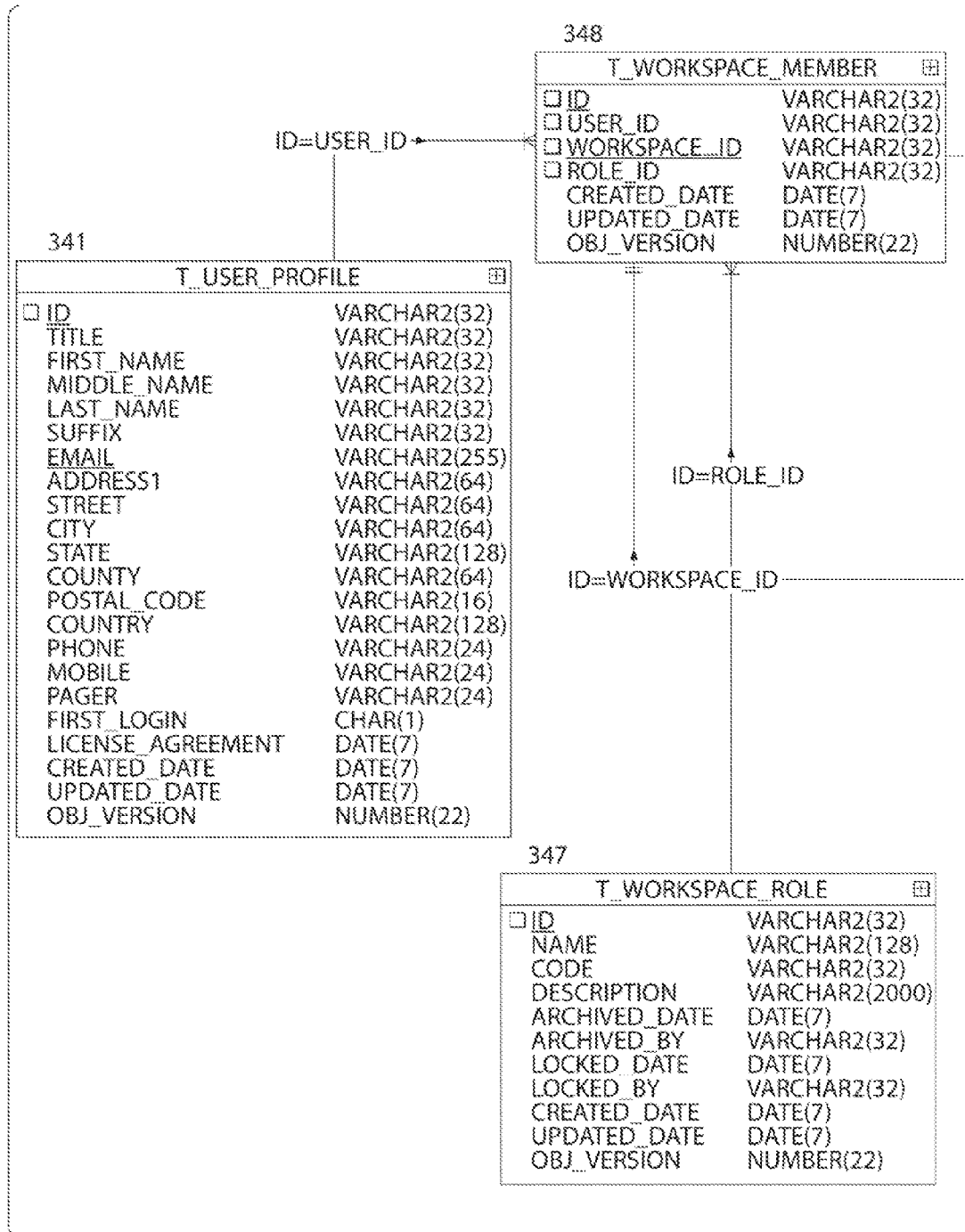
Figures 2, 4A:
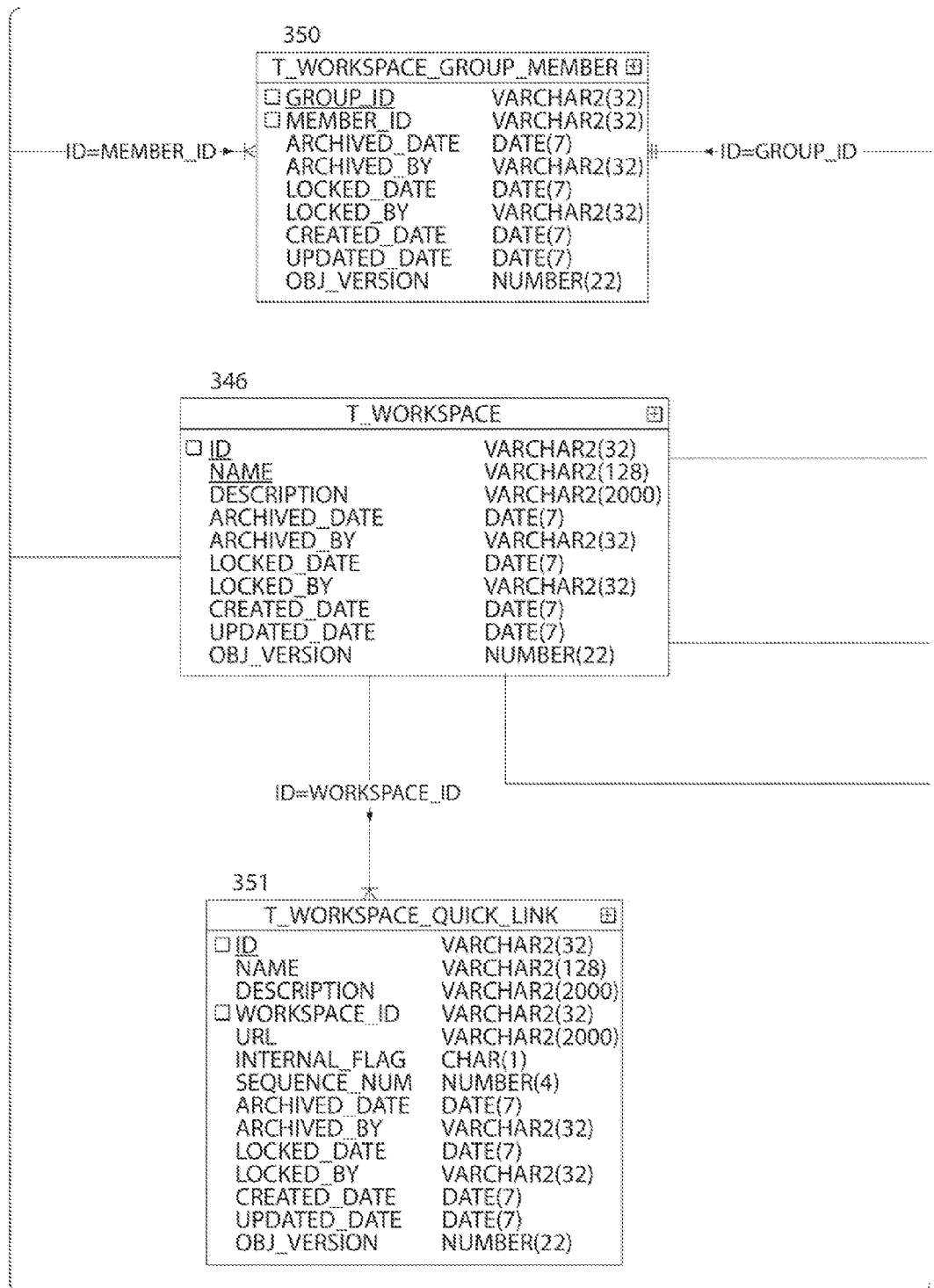
Figures 3, 4A:
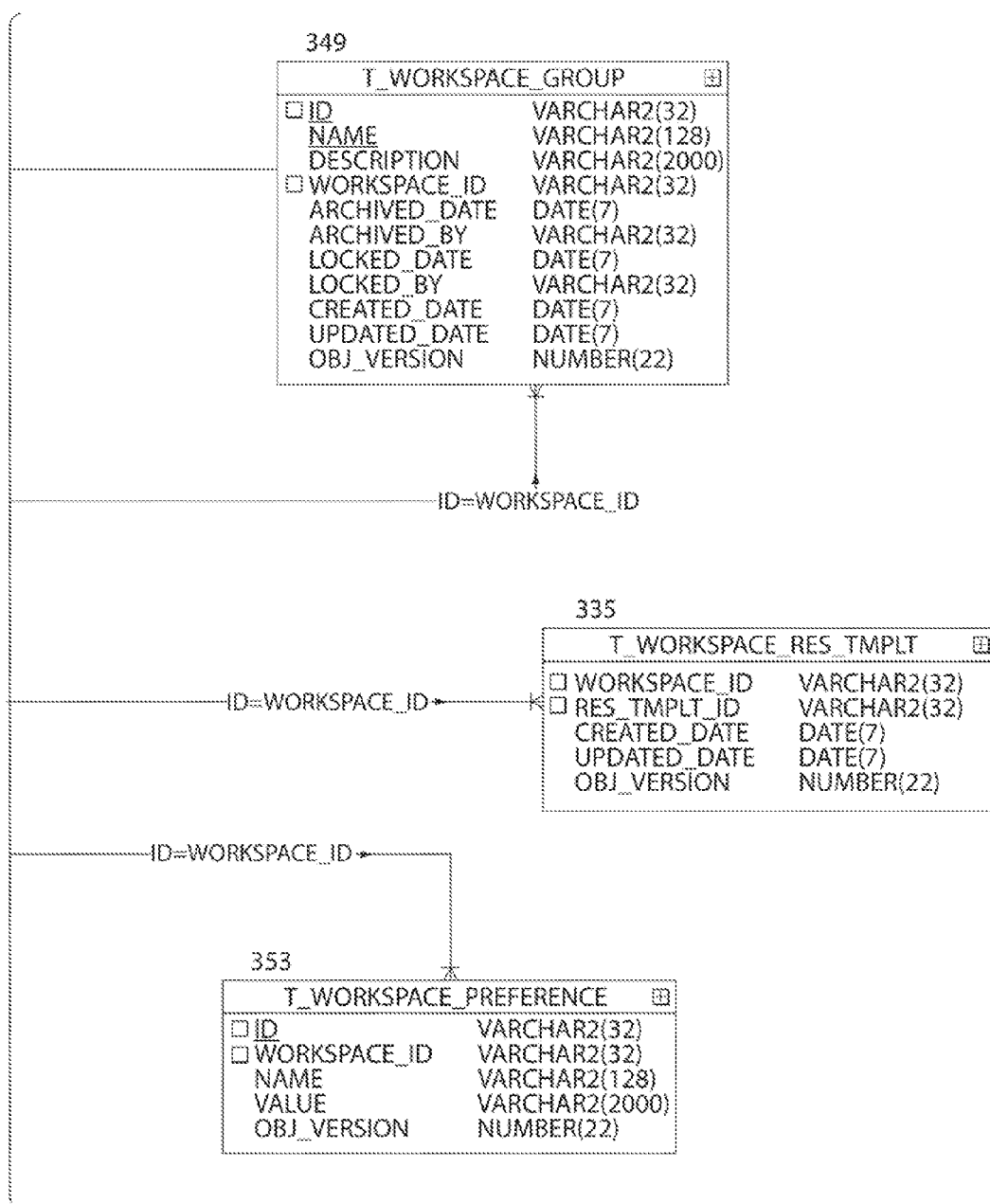
Figures 1, 4B:
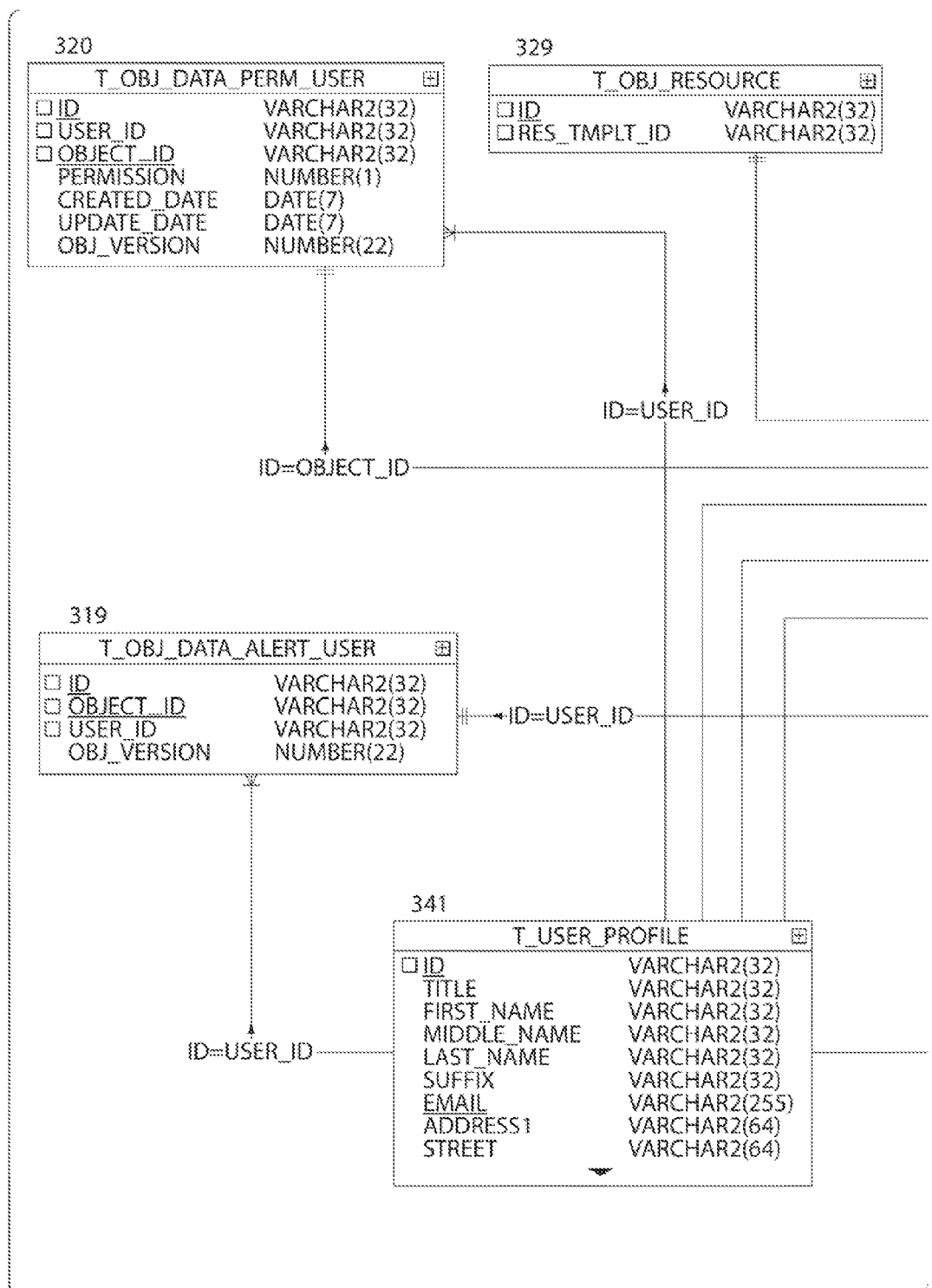
Figures 2, 4B:
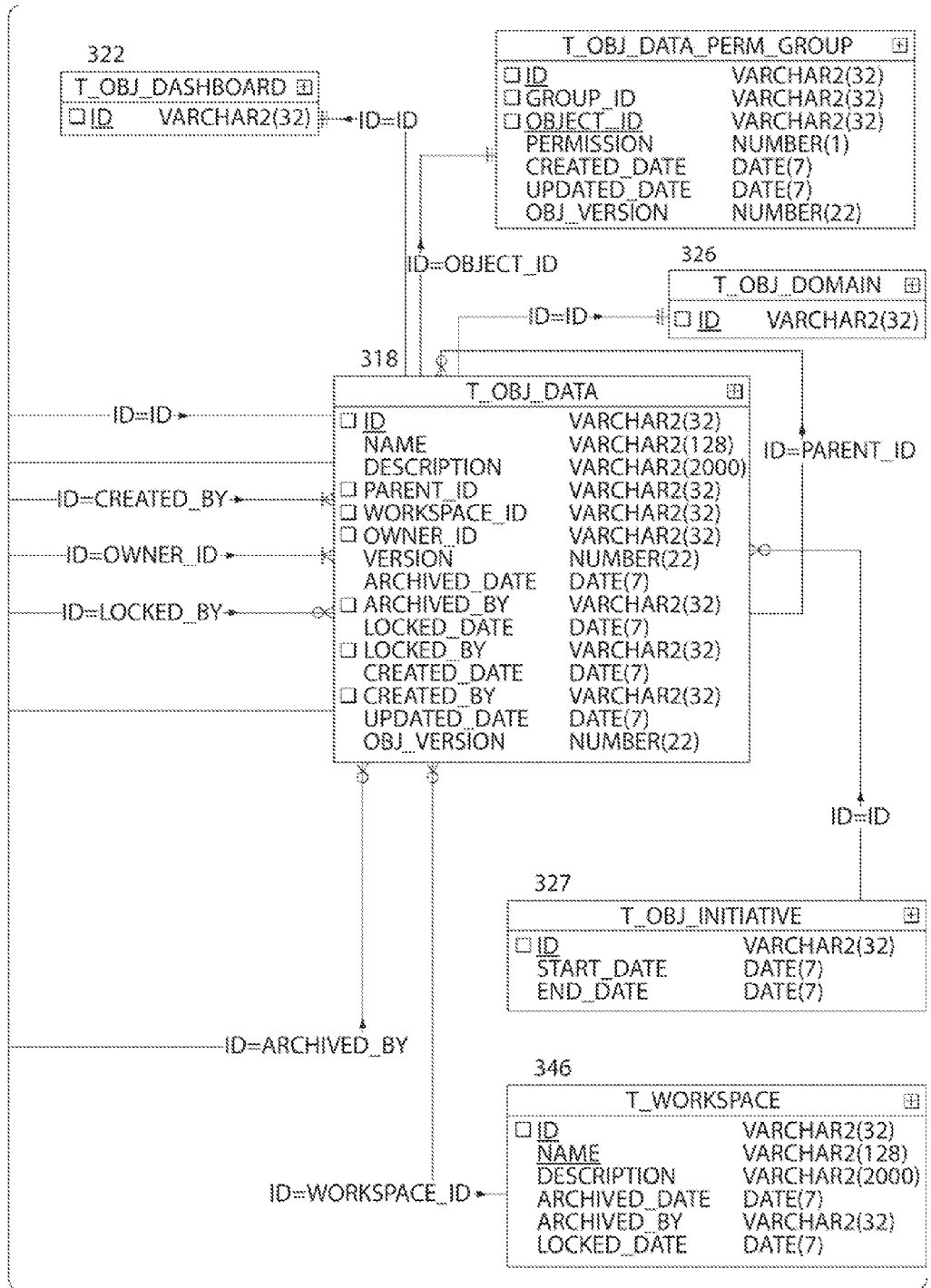
Figures 1, 4C:
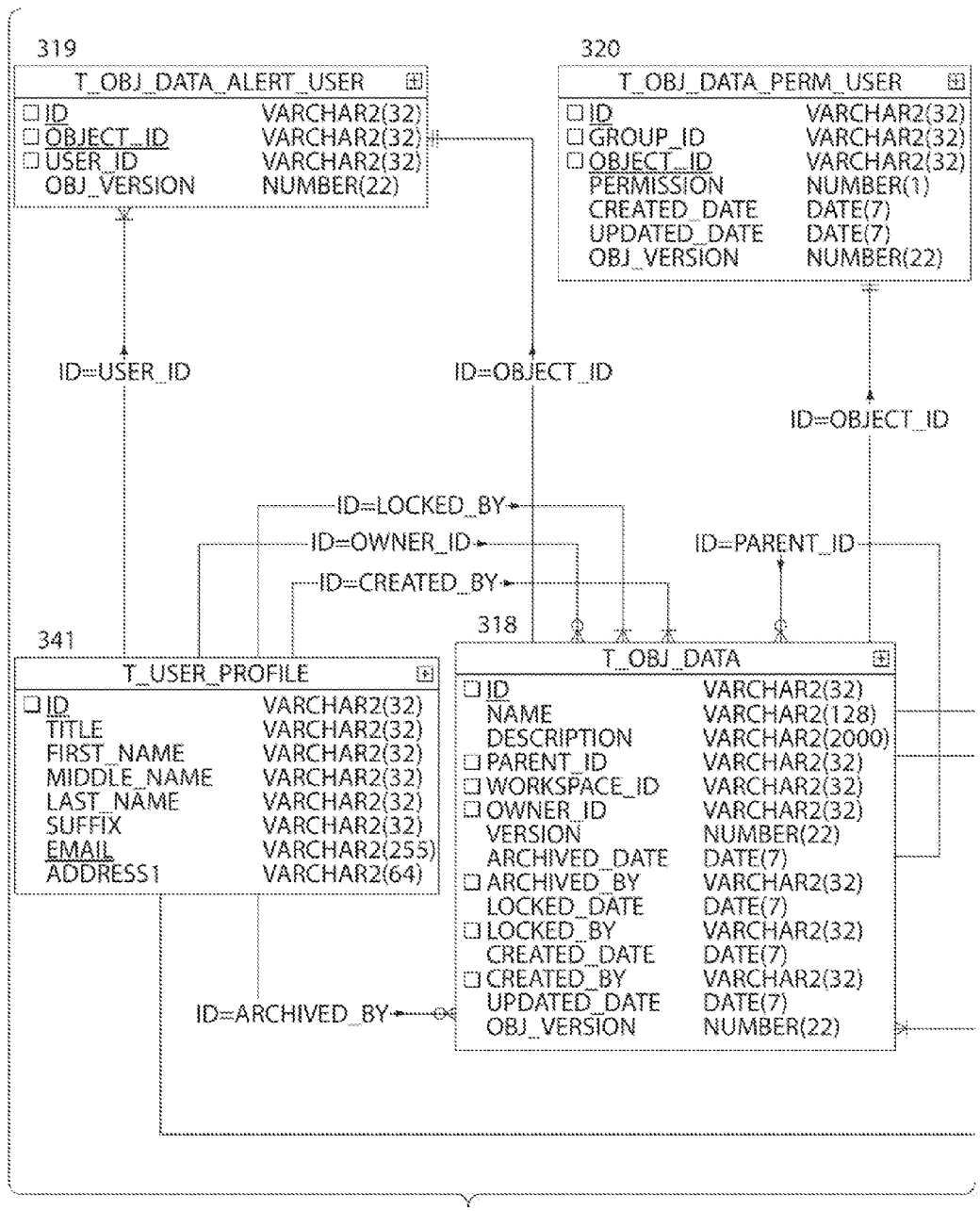
Figures 2, 4C:
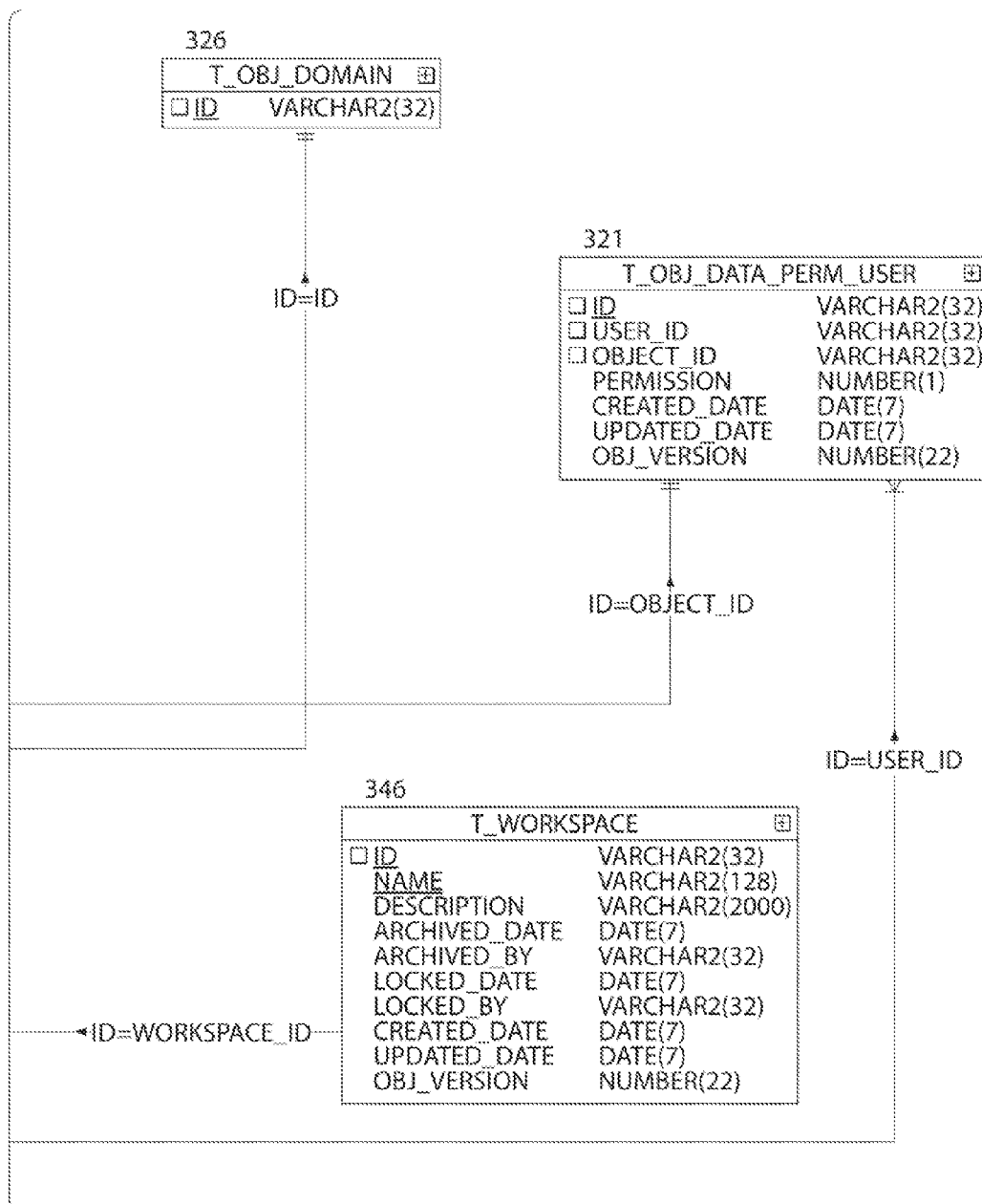
Figures 1, 4D:
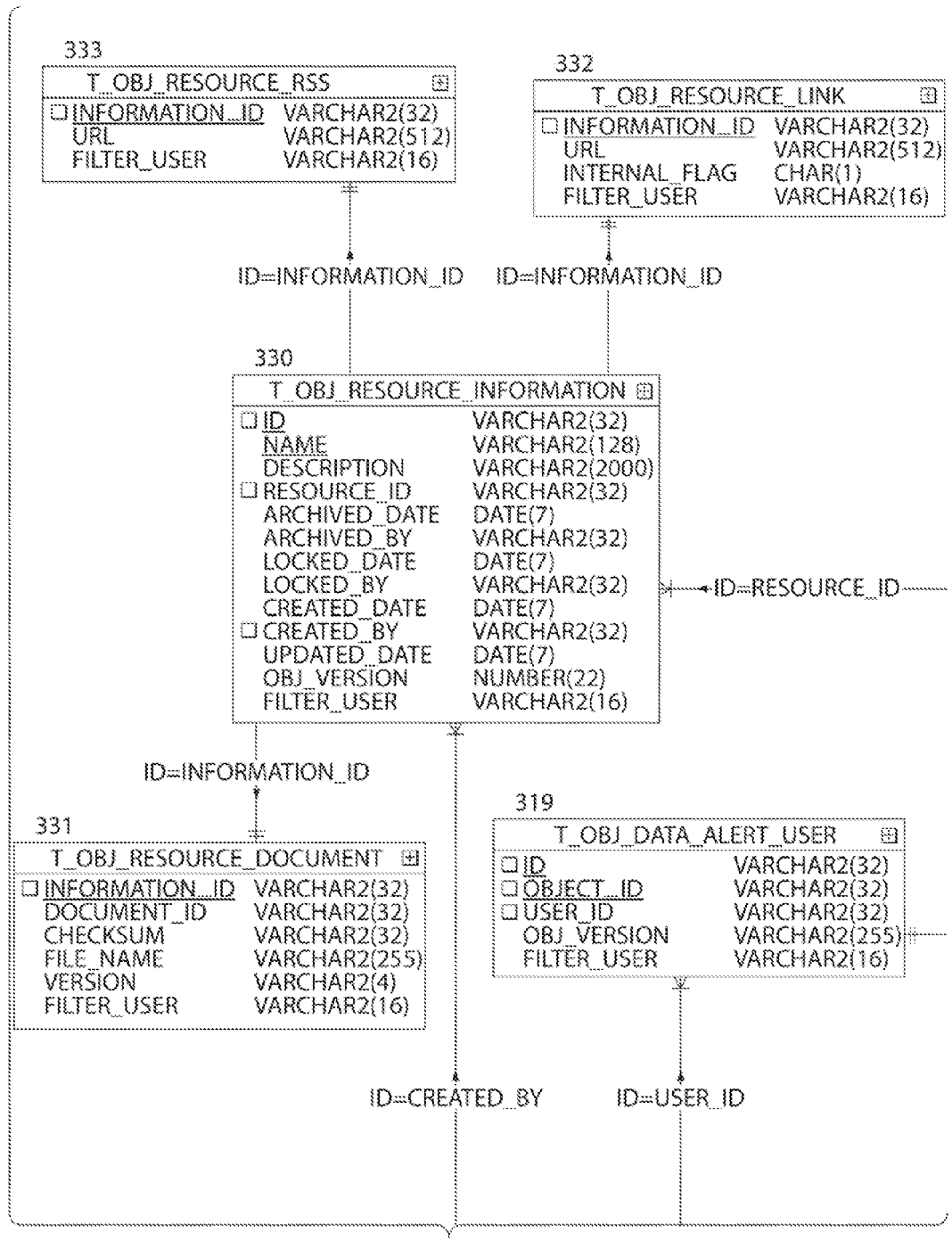
Figures 2, 4D:
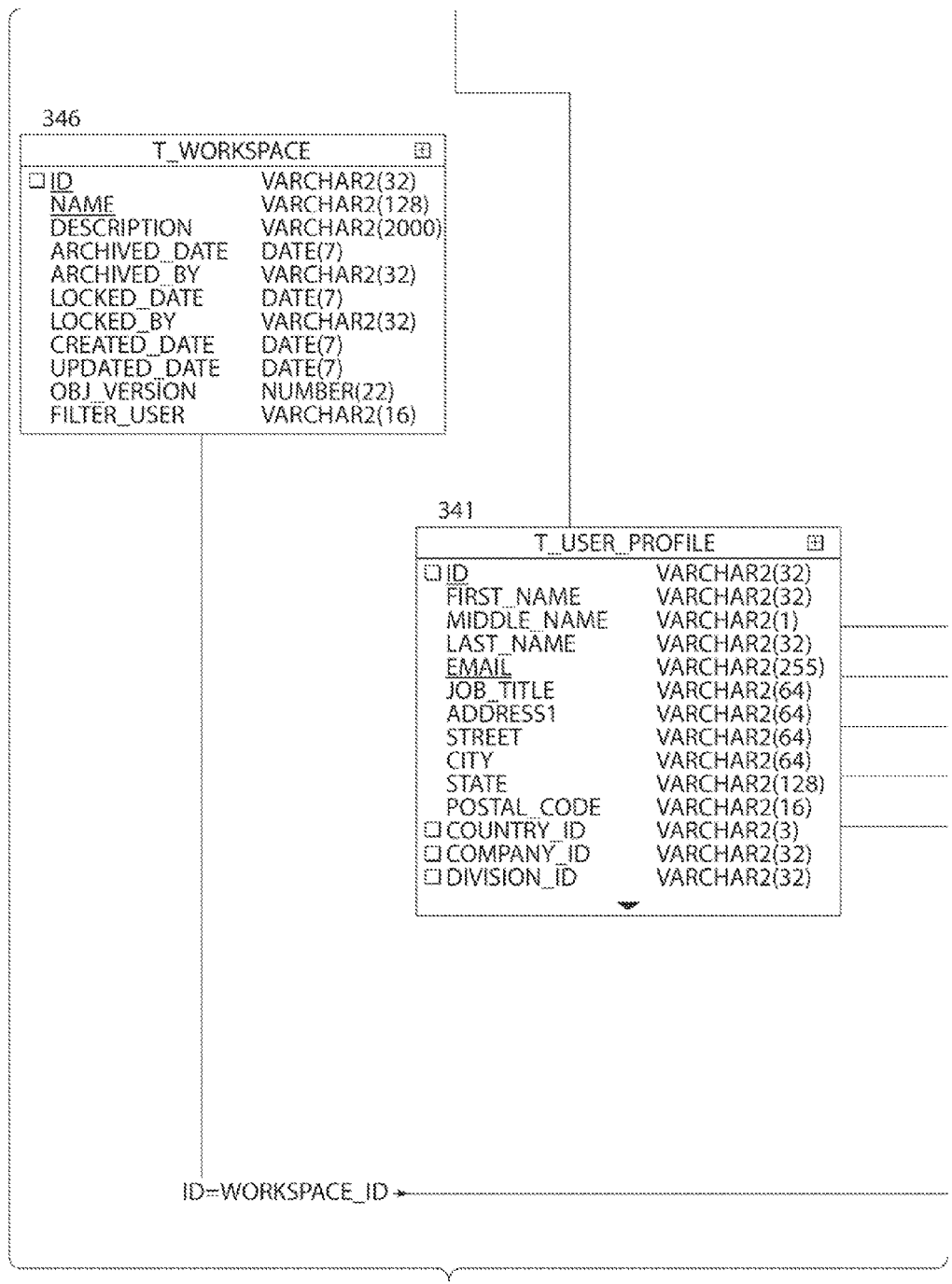
Figures 3, 4D:
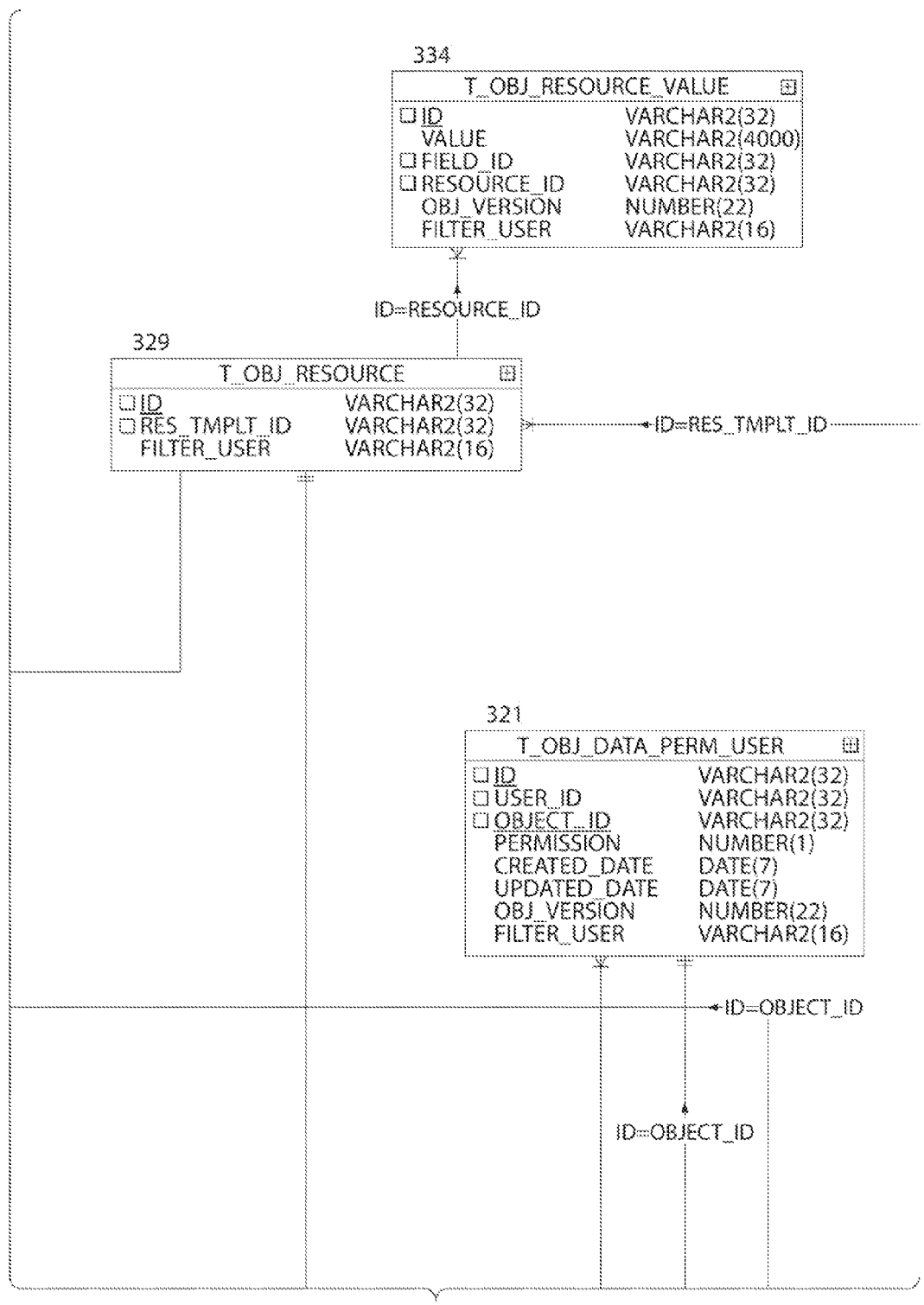
Figures 4, 4D:
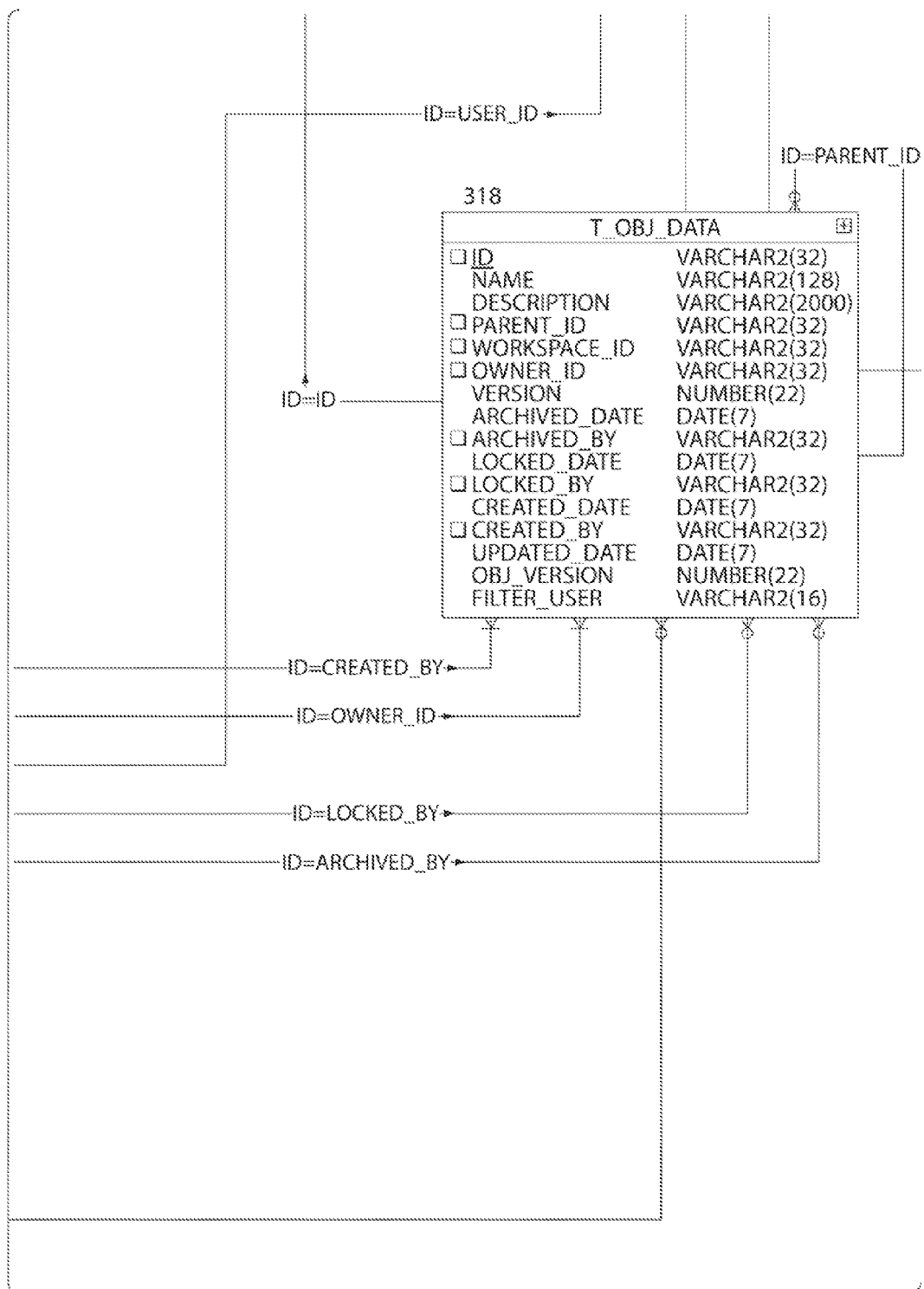
Figures 4, 4D, 5:
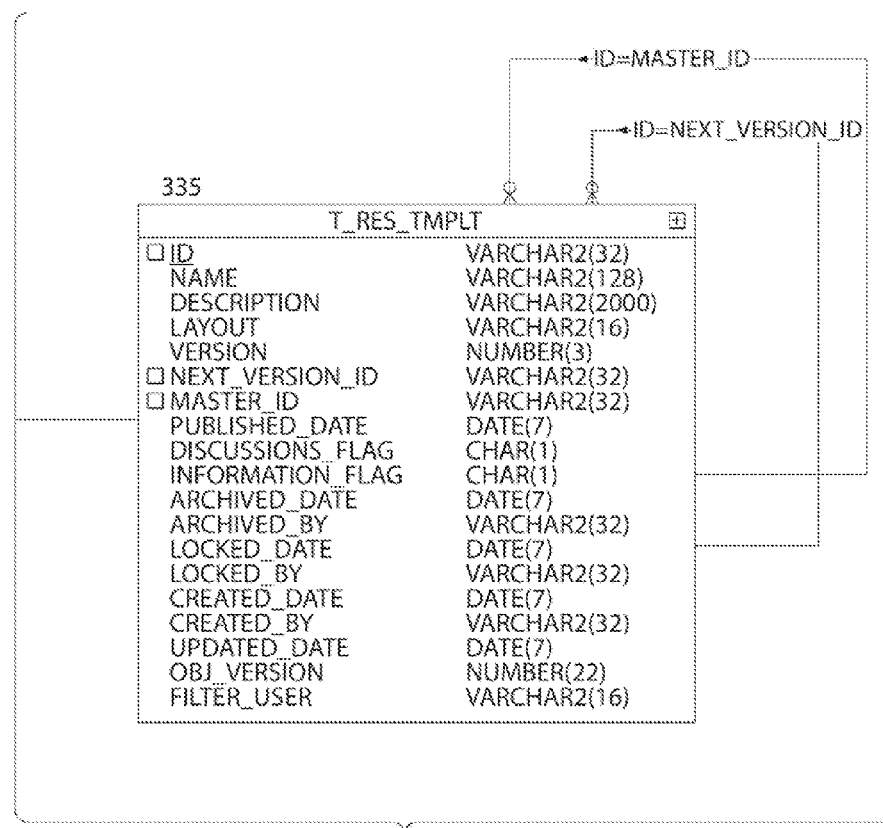
Figures 4, 4D, 5, 6:
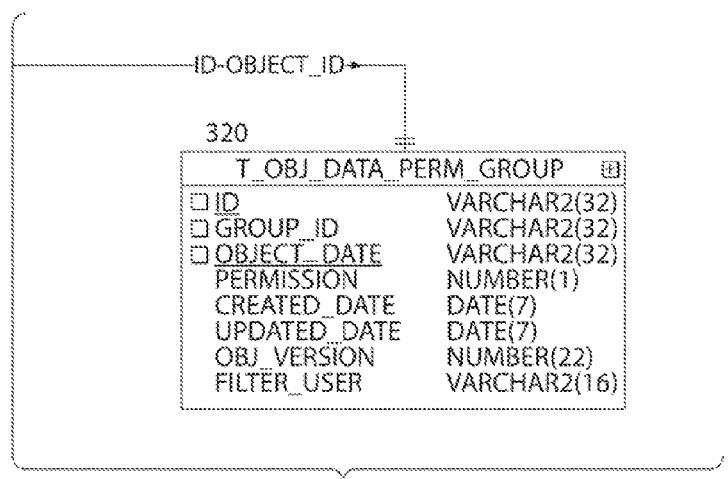
Figures 1, 4E:
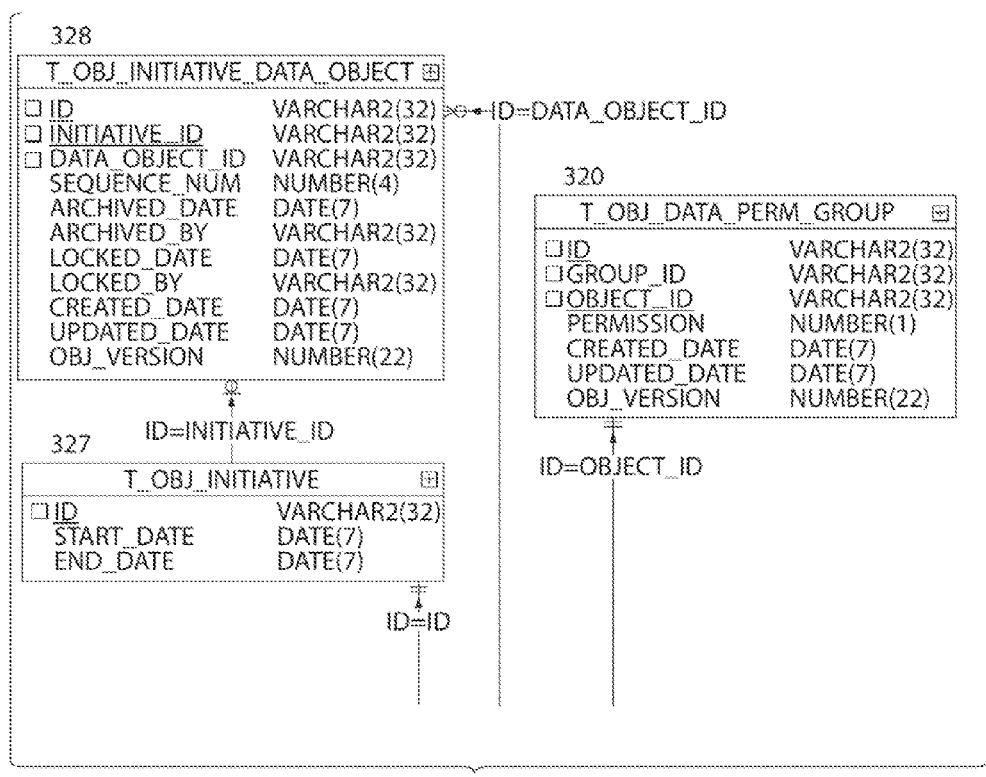
Figures 2, 4E:
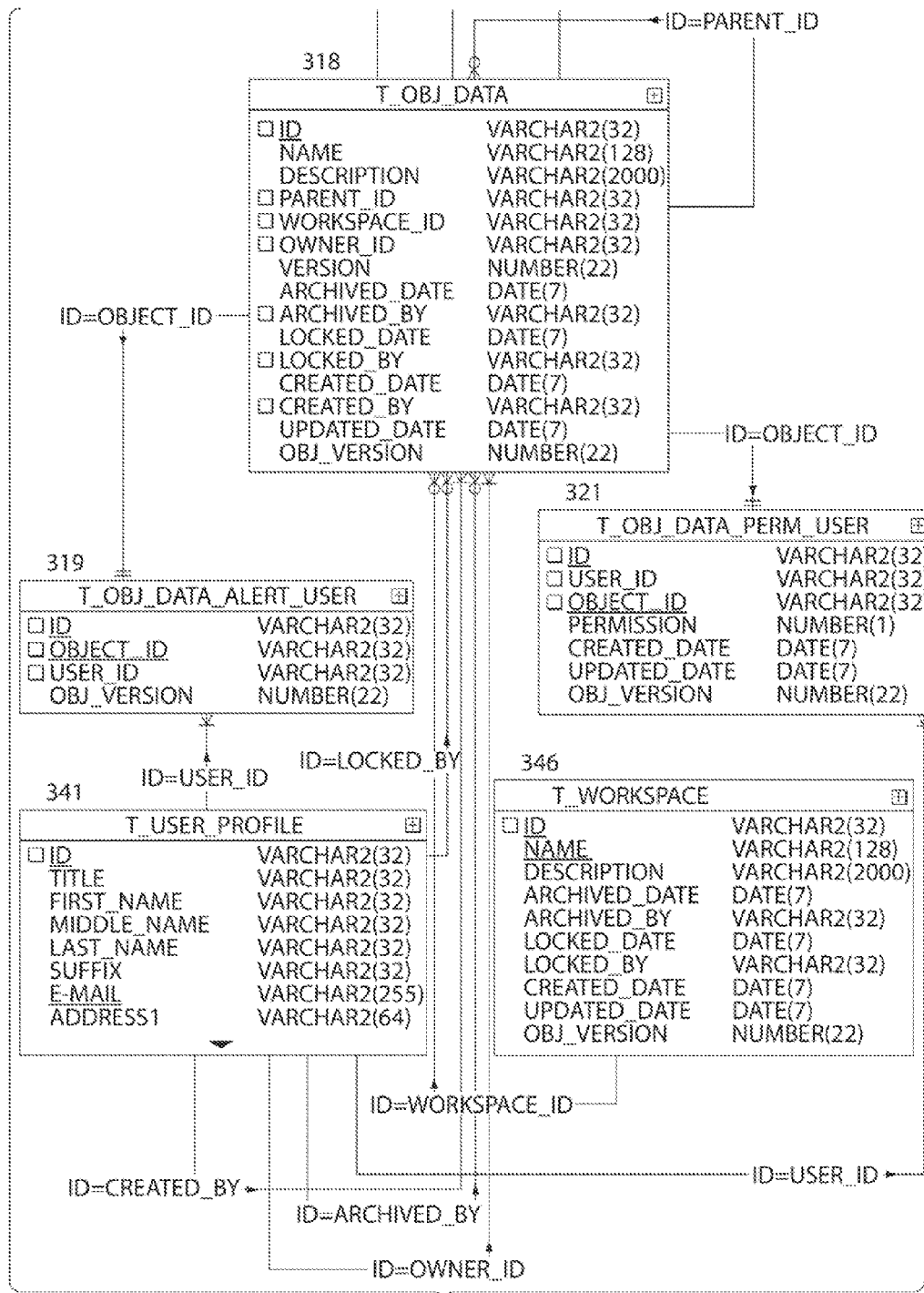
Figures 1, 4F:
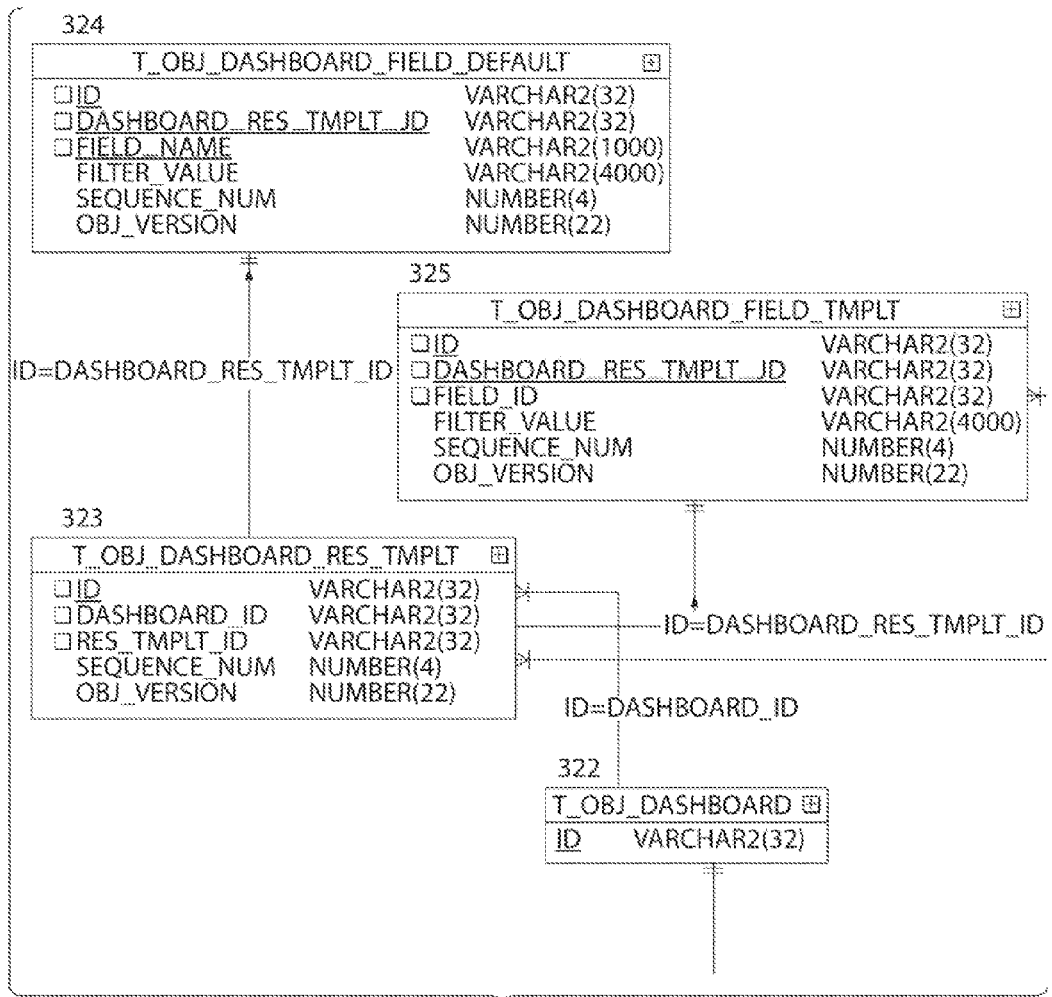
Figures 2, 4F:
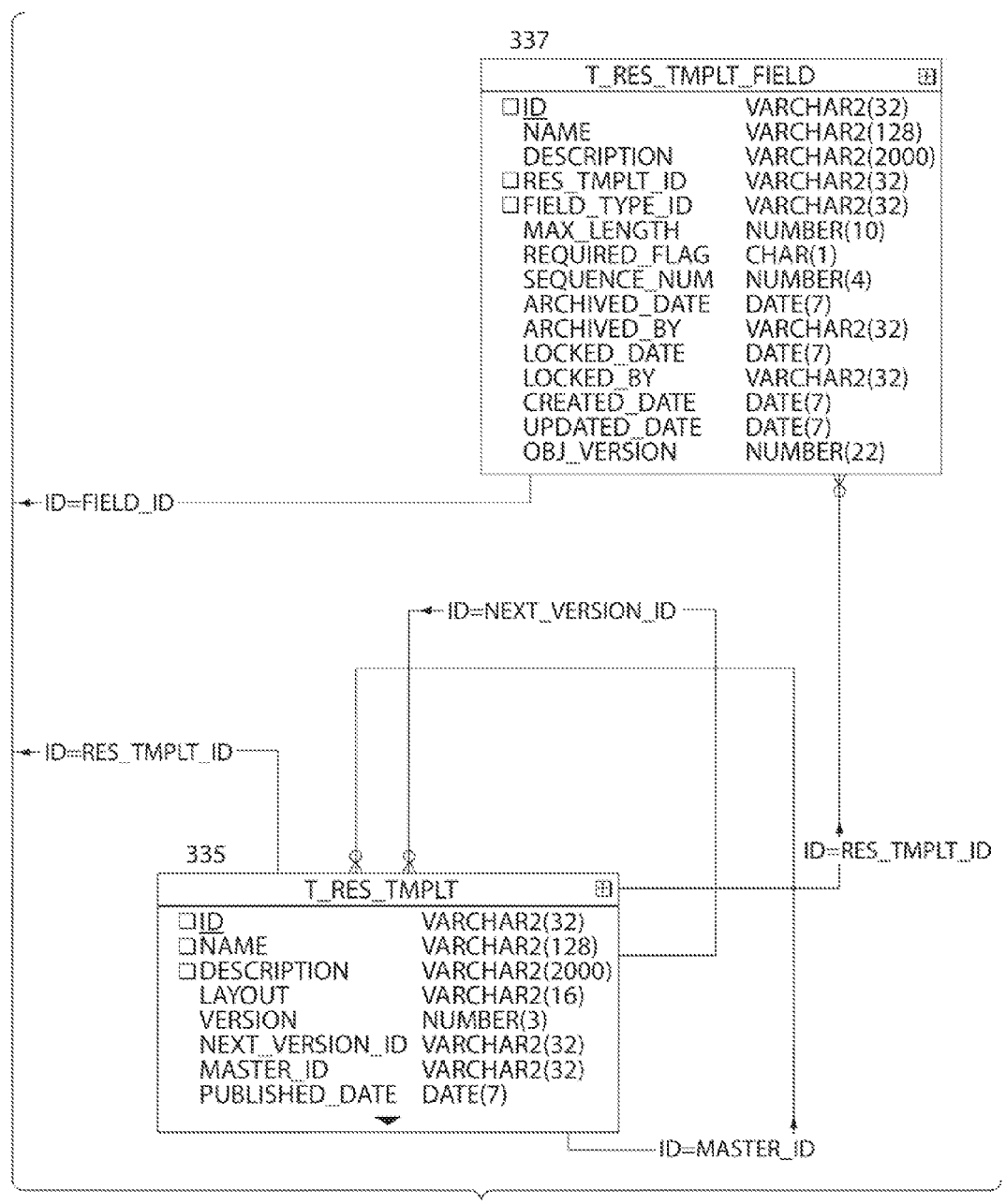
Figures 3, 4F:
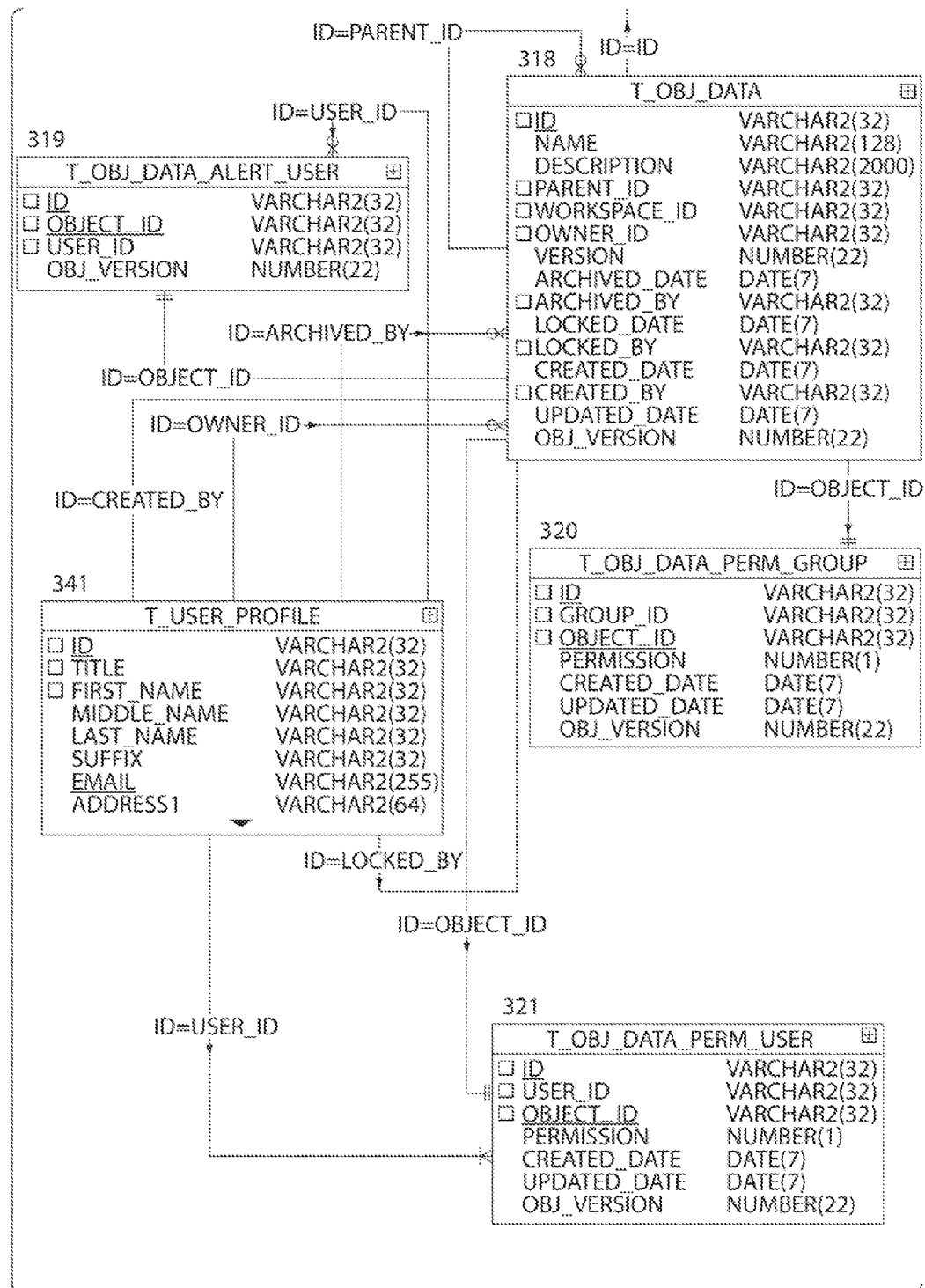
Figures 2, 4G:
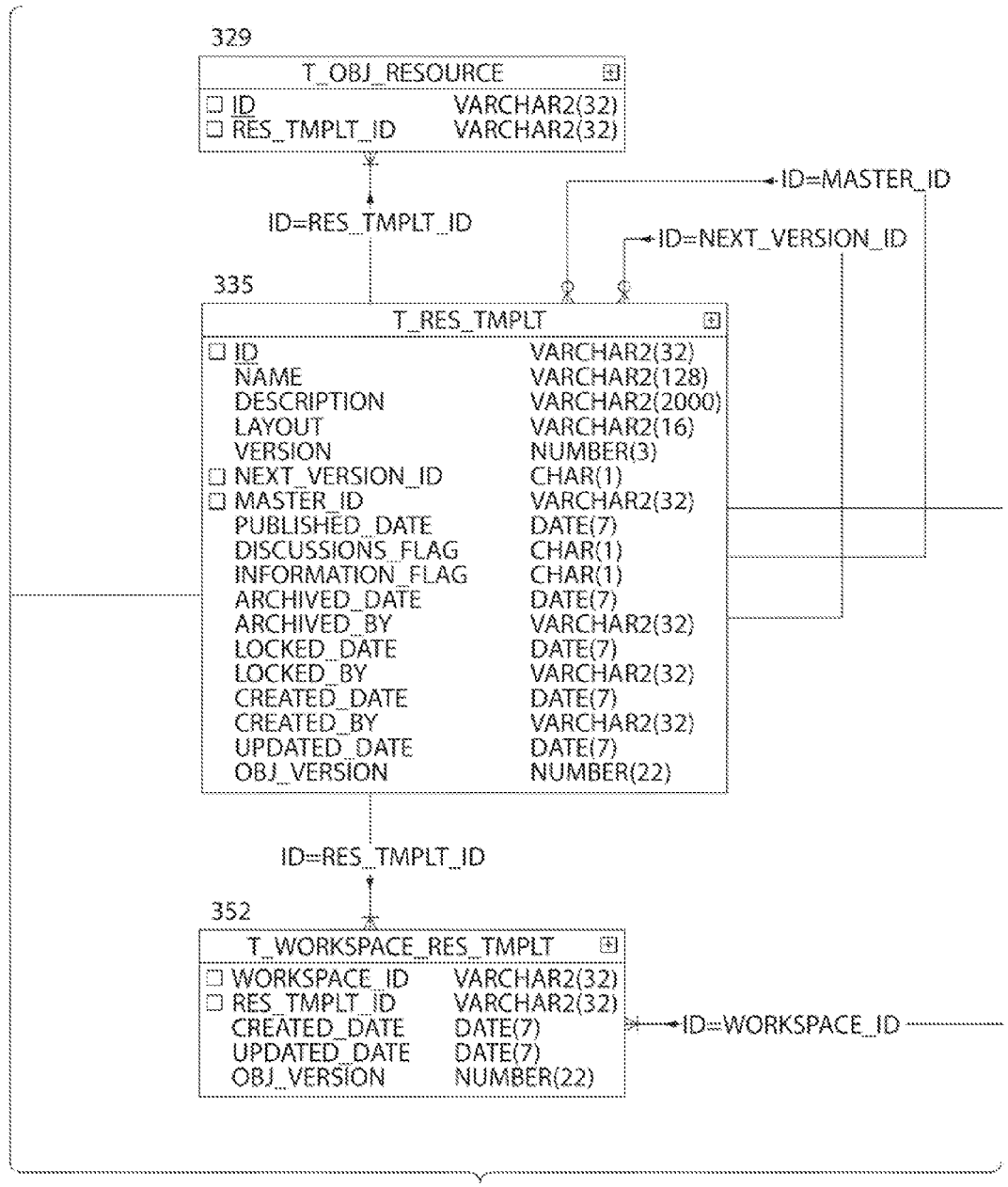
Figures 3, 4G:
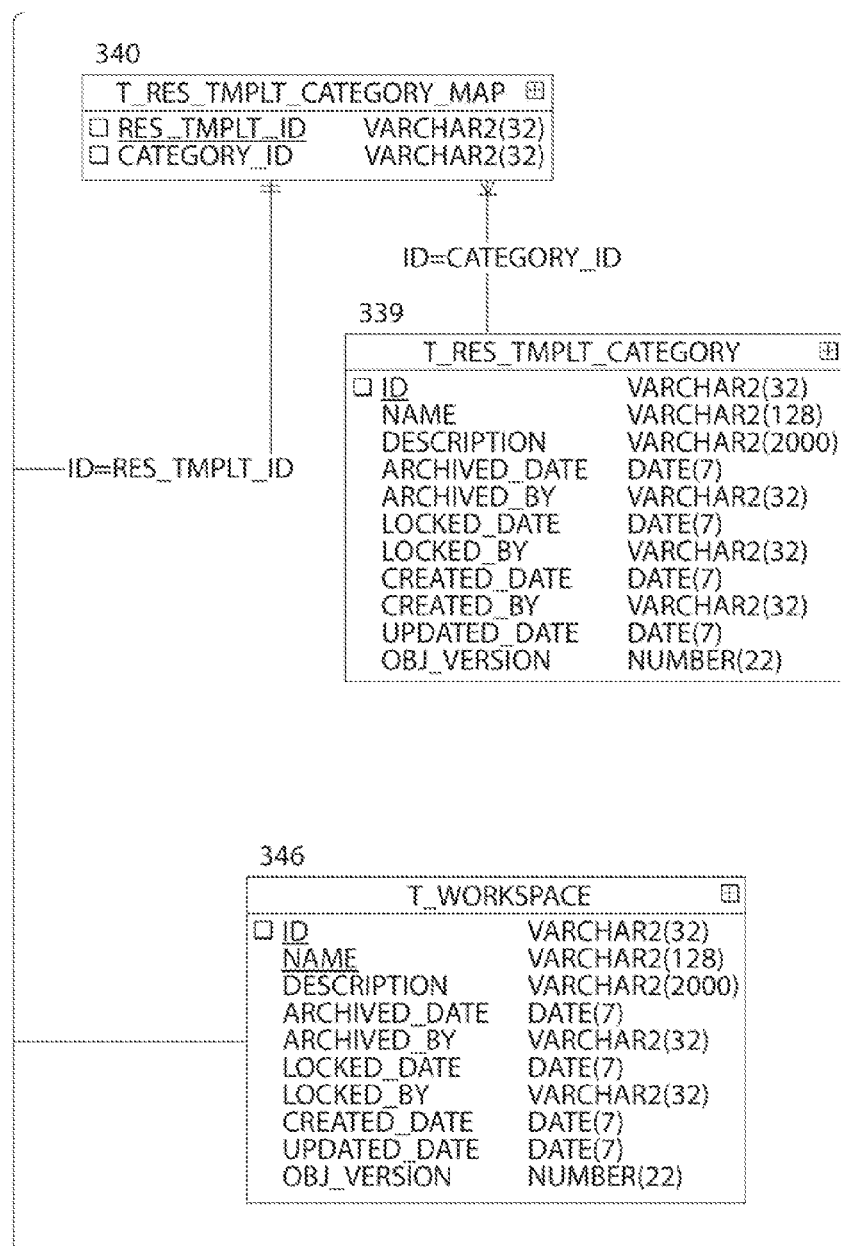
Figures 1, 4H:
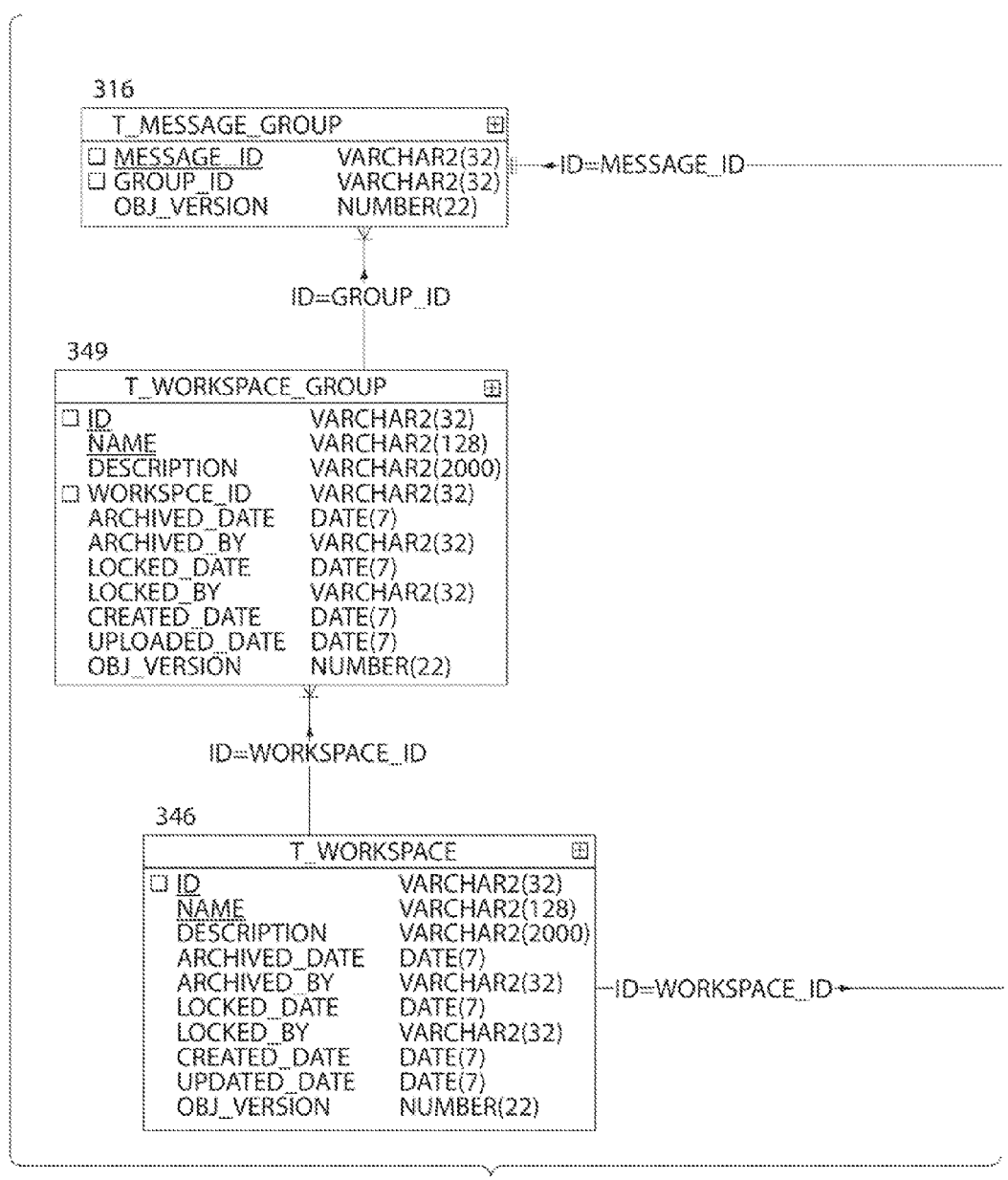
Figures 2, 4H:
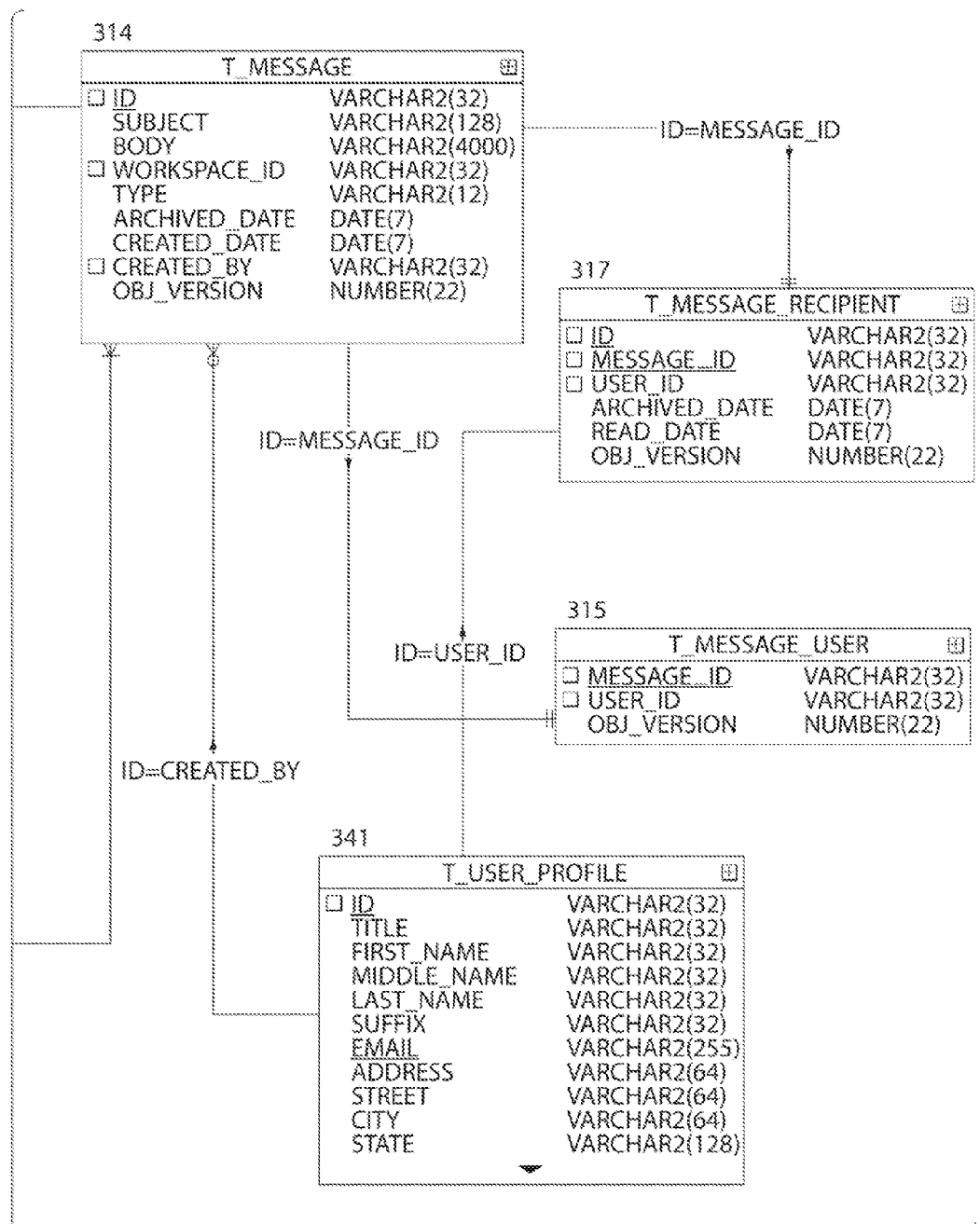
Figures 1, 4I:
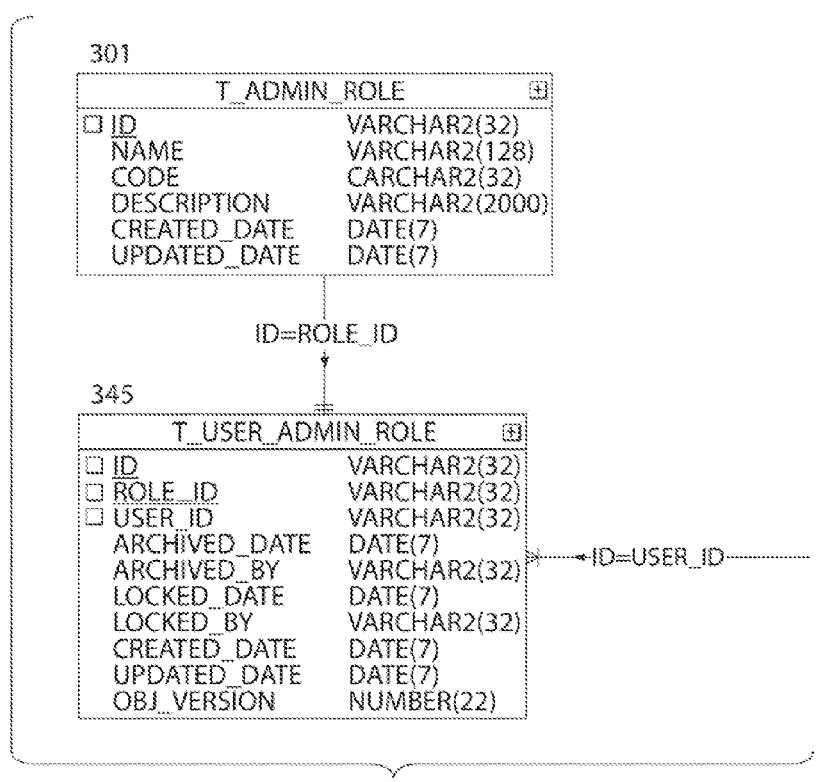
Figures 2, 4I:
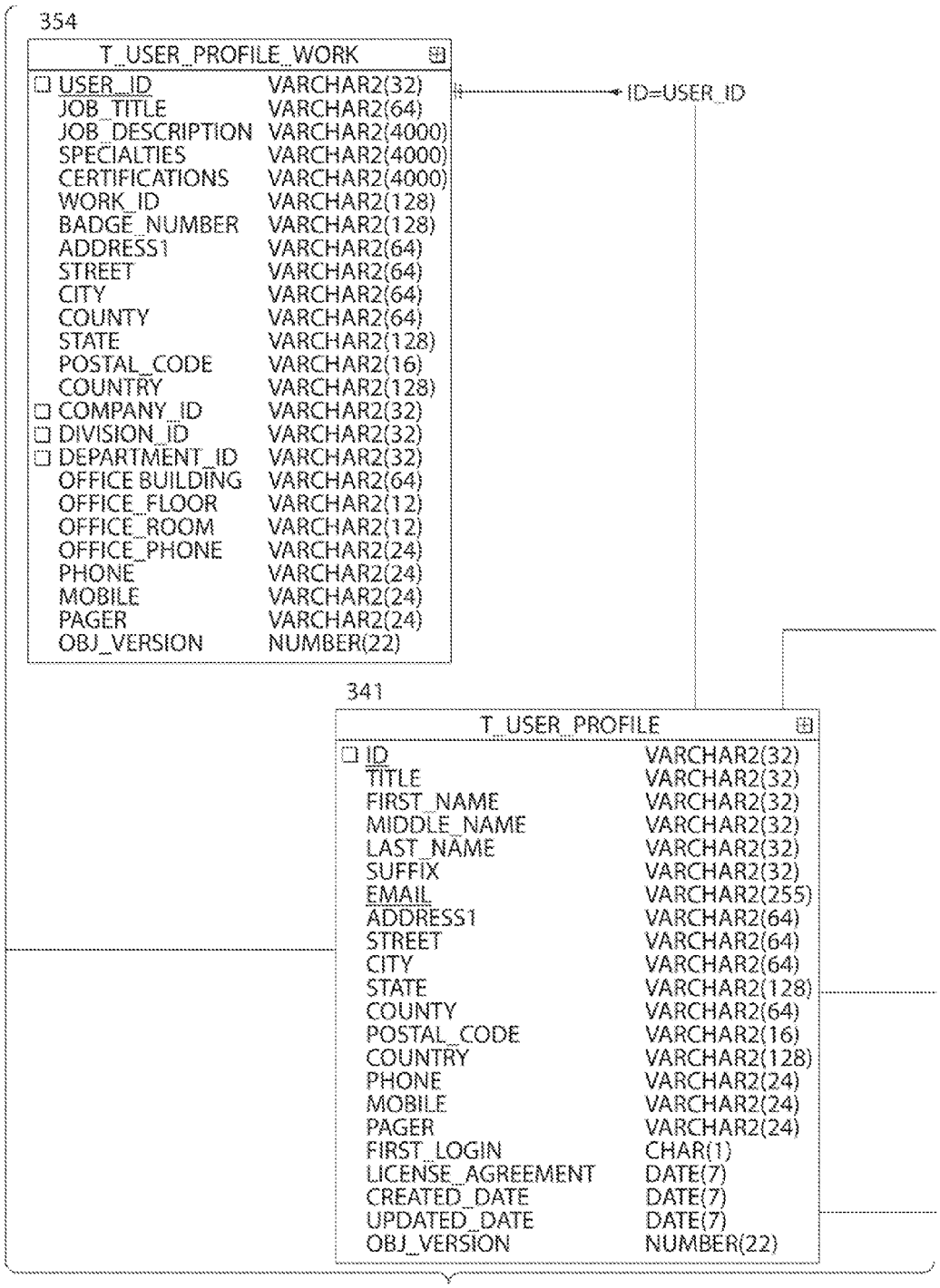
Figure 4K:
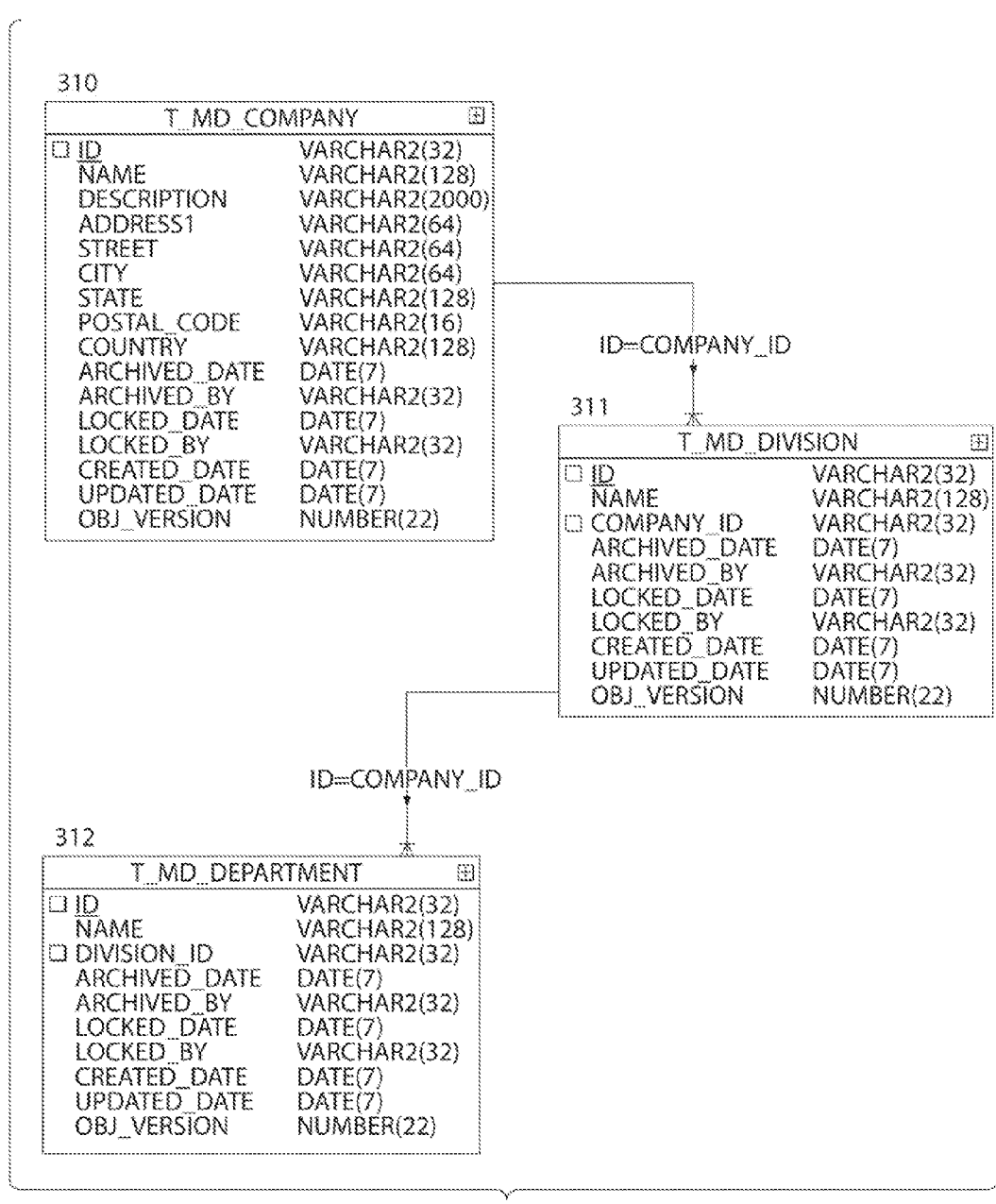
Figure 5:
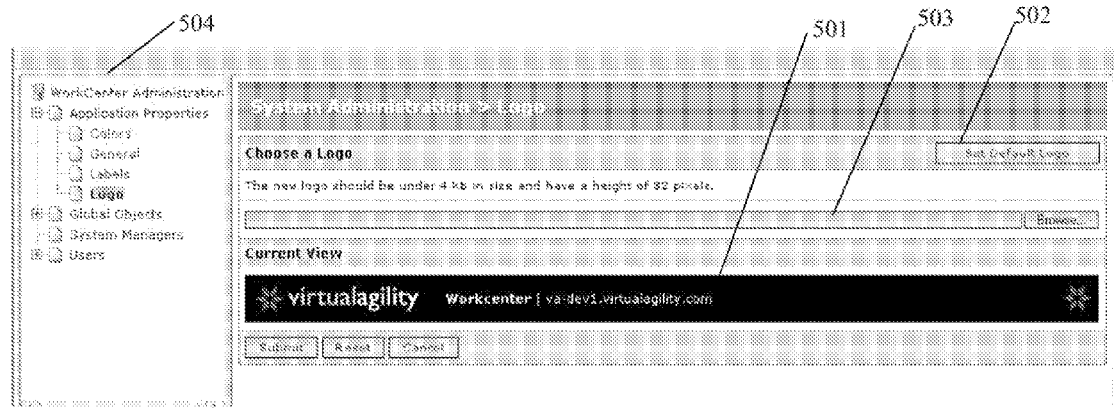
FIG. 5 illustrates the setup of the logo for the application.

FIGS. 4A-4K show more detailed views of entity-relationship diagrams for select groups of tables. FIG. 4A shows the tables relevant to workspaces 113. FIG. 413 shows the tables relevant to data objects, which are the super class for workspace objects 109, including domains 116, initiatives 127, knowledge boards 129, and resources 121. FIG. 4C shows the tables relevant to domains 116. FIG. 40 shows the tables relevant to resources 121. FIG. 4E shows the tables relevant to initiatives 127. FIG. 4F shows the tables relevant to knowledge boards 129. FIG. 4G shows the tables 111 relevant to resource templates 124. FIG. 4H shows the tables relevant to messages. FIG. 4I shows the tables relevant to users 103, including groups 105 and their roles 107. FIG. 4J shows the tables relevant to applications. FIG. 4K shows the tables relevant to companies.

Descriptions of the tables shown in FIGS. 4A through 4K are provided below.

T_ADMIN_ROLE (301): The T_ADMIN_ROLE table 301 holds the application level administrator role identifiers and names. There is an entry for each administrator. There is a code that is used to easily identify the role when adding it to a user. The fields in the table's entries are as follows:

| Name | Type | Description |
| --- | --- | --- |
| ID | varchar2(32) | record identifier |
| NAME | varchar2(128) | name of administrative role |
| CODE | varchar2(132) | code for administrative role |
| DESCRIPTION | varchar2(2000) | description for administrative role |
| CREATED_DATE | date | date created |
| UPDATED_DATE | date | date last updated |

T_APPLICATION_LICENSE (302): The T_APPLICATION_LICENSE table 302 holds the license key that enables certain features in the system. There is an entry for each license key. The fields in the table's entries are as follows:

| Name | Type | Description |
| --- | --- | --- |
| LICENSE_ID | varchar2(32) | license identifier |
| LICENSE_KEY | varchar2(400) | license key |
| PASS_WORD | varchar2(32) | license password |
| OBJ_VERSION | integer | version number |

T_APPLICATION_LOGO (303): The T_APPLICATION_LOGO table 303 holds the default logo for the application. It can also store another row that contains an administrative uploaded logo. The LOGO_DATE row holds the binary data for the image file itself. The fields in the table's entries are as follows:

| Name | Type | Description |
| --- | --- | --- |
| ID | varchar2(32) | record identifier |
| LOGO_DATA | long raw | data for logo image file |
| MIMETYPE | varchar2(255) | mime type |
| OBJ_VERSION | integer | version number |

T_DISCUSSION_TOPIC (307): The entries in the T_DISCUSSION_TOPIC table 307 relate discussion topics to a resource. There is an entry for each discussion topic. Each entry references the resource's record in the T_OBJ_RESOURCE table 329. The fields in the table's entries are as follows:

| Name | Type | Description |
| --- | --- | --- |
| ID | varchar2(32) | record identifier |
| NAME | varchar2(128) | discussion topic name |
| COMMENTS | varchar2(4000) | comments |
| RESOURCE_ID | varchar2(32) | record identifier from T_OBJ_RESOURCE |
| ARCHIVED_DATE | date | date archived |
| ARCHIVED_BY | varchar2(32) | user archiving record |
| LOCKED_DATE | date | date locked |
| LOCKED_BY | varchar2(32) | user locking record |
| CREATED_DATE | date | date created |
| CREATED_BY | varchar2(32) | user creating record from T_USER_PROFILE |
| UPDATED_DATE | date | date last updated |
| OBJ_VERSION | integer | version number |

T_DISCUSSION_REPLY (308): The entries in the T_DISCUSSION_REPLY table 308 relate discussion replies to a discussion topic. There is one entry for each reply. Each entry references the discussion topic's record in the T_DISCUSSION_TOPIC table 307 and the parent message. The parent can be another reply in the same table. Replies can be children of other replies in order to maintain a threaded discussion. The fields in the table's entries are as follows:

| Name | Type | Description |
| --- | --- | --- |
| ID | varchar2(32) | record identifier |
| TOPIC_ID | varchar2(32) | record ID from T_DISCUSSION_TOPIC |
| PARENT_ID | varchar2(32) | parent topic |
| NAME | varchar2(128) | topic name |
| COMMENTS | varchar2(4000) | comments |
| ARCHIVED_DATE | date | date archived |
| ARCHIVED_BY | varchar2(32) | user archiving record |
| LOCKED_DATE | date | date locked |
| LOCKED_BY | varchar2(32) | user locking record |
| CREATED_DATE | date | date created |
| CREATED_BY | varchar2(32) | user creating record from T_USER_PROFILE |
| UPDATED_DATE | date | date last updated |
| OBJ_VERSION | integer | version number |

T_MANAGER_PROPERTY (309): The entries in the T_MANAGER_PROPERTY table 309 stores custom property values for various system managers. There is an entry for each property value. Each manager is configured with its own default values. When a system administrator updates those values, they are stored in this table. The fields in the table's entries are as follows:

| Name | Type | Description |
| --- | --- | --- |
| ID | varchar2(32) | record identifier |
| MANAGER_CLASS | varchar2(255) | manager class |
| NAME | varchar2(128) | property name |
| VALUE | varchar2(2000) | property value |
| CREATED_DATE | date | date created |
| UPDATED_DATE | date | date updated |
| OBJ_VERSION | integer | version number |

T_MD_COMPANY (310): The T_MD_COMPANY table 310 has an entry for each entity, such as a company, that a user of the system may belong to. Entries for users in the system refer to this table to indicate the companies the users belong to. The fields in the table's entries are as follows:

| Name | Type | Description |
| --- | --- | --- |
| ID | varchar2(32) | record identifier |
| NAME | varchar2(128) | company name |
| DESCRIPTION | varchar2(2000) | company description |
| ADDRESS1 | varchar2(64) | company address |
| STREET | varchar2(64) | street |
| CITY | varchar2(64) | city |
| STATE | varchar2(128) | state |
| COUNTRY_ID | varchar2(128) | country code |
| POSTAL_CODE | varchar2(16) | postal code |
| ARCHIVED_DATE | date | date archived |
| ARCHIVED_BY | varchar2(32) | archived by |
| LOCKED_DATE | date | date locked |
| LOCKED_BY | varchar2(32) | locked by |
| CREATED_DATE | date | date created |
| UPDATED_DATE | date | date last updated |
| OBJ_VERSION | integer | version number |

T_MD_DIVISION (311): The T_MD_DIVISION table 311 has an entry for each division under a company. Entries for users in the system refer to this table to indicate the division the users belong to. Each entry references a company's record in the T_MD_COMPANY table 310. The fields in the table's entries are as follows:

| Name | Type | Description |
|---|---|---|
| ID | varchar2(32) | record identifier |
| NAME | varchar2(128) | division name |
| COMPANY_ID | varchar2(32) | company ID from T_MD_COMPANY |
| ARCHIVED_DATE | date | date archived |
| ARCHIVED_BY | varchar2(32) | user arching record |
| LOCKED_DATE | date | date locked |
| LOCKED_BY | varchar2(32) | user locking record |
| CREATED_DATE | date | date created |
| UPDATED_DATE | date | date last updated |
| OBJ_VERSION | integer | version number |

T_MD_DEPARTMENT (312): The T_MD_DEPARTMENT table 312 has an entry for each department under a division. Entries for users in the system refer to this table to indicate the department the users belong to. Each entry references a division's record in the T_MD_DIVISION table 311. The fields in the table's entries are as follows:

| Name | Type | Description |
|---|---|---|
| ID | varchar2(32) | record identifier |
| NAME | varchar2(128) | department name |
| DIVISION_ID | varchar2(32) | division ID from T_MD_DIVISION |
| ARCHIVED_DATE | date | date archived |
| ARCHIVED_BY | varchar2(32) | user archiving record |
| LOCKED_DATE | date | date locked |
| LOCKED_BY | varchar2(32) | user locking record |
| CREATED_DATE | date | date created |
| UPDATED_DATE | date | date last updated |
| OBJ_VERSION | integer | version number |

T_MD_COUNTRY (313). The T_MD_COUNTRY table 313 holds the names for the countries. There is an entry for each country. These are used for address fields in user profiles and company profiles. The fields in the table's entries are as follows:

| Name | Type | Description |
|---|---|---|
| ID | varchar2(3) | record identifier |
| NAME | varchar2(128) | country name |

T_MESSAGE (314): The T_MESSAGE table 314 holds messages sent by users of the system. There is an entry for each message. Each entry references the record of a workspace in which the message was sent from the T_WORKSPACE table 346 and the record of the message creator from the T_USER_PROFILE table 341. The fields in the table's entries are as follows:

| Name | Type | Description |
|---|---|---|
| ID | varchar2(32) | record identifier |
| SUBJECT | varchar2(128) | message subject |
| BODY | varchar2(4000) | message body |
| WORKSPACE_ID | varchar2(32) | workspace ID from T_WORKSPACE |
| ARCHIVED_DATE | date | date archived |
| CREATED_DATE | date | date created |
| CREATED_BY | varchar2(32) | user creating message |
| OBJ_VERSION | integer | version number |

T_MESSAGE_USER (315): The entries in the T_MESSAGE_USER table 315 relate messages to the user to which they were addressed. There is an entry for each user message recipient for each message. Each entry references the message's record in the T_MESSAGE table 314 and the user's record in the T_USER_PROFILE table 341. The fields in the table's entries are as follows:

| Name | Type | Description |
|---|---|---|
| MESSAGE_ID | varchar2(32) | message ID |
| USER_ID | varchar2(32) | user ID from T_USER_PROFILE |
| OBJ_VERSION | integer | version number |

T_MESSAGE_GROUP (316): The entries in the T_MESSAGE_GROUP table 316 relates message to the groups to which the message was addressed. There is an entry for each group message recipient for each message. Each entry references the message's record in the T-MESSAGE table 314 and the group's record from the T_WORKSPACE_GROUP table 349. The fields in the table's entries are as follows:

| Name | Type | Description |
|---|---|---|
| MESSAGE_ID | varchar2(32) | message ID |
| GROUP_ID | varchar2(32) | group ID from T_WORKSPACE_GROUP |
| OBJ_VERSION | integer | version number |

T_MESSAGE_RECIPIENT (317): The T_MESSAGE_RECIPIENT table 317 relates messages to users the message was sent to. It breaks out users from the groups that were addressed. There is an entry for each user regardless if the user was selected from the user or group side. There is an entry for each user message recipient for each message. Each entry references the message's record in the T_MESSAGE table 314 and the user's record in THE T_USER_PROFILE table 341. When a user reads the message, it is marked here. The fields in the table's entries are as follows:

| Name | Type | Description |
|---|---|---|
| ID | varchar2(32) | record identifier |
| MESSAGE_ID | varchar2(32) | message ID from T_MESSAGE |
| USER_ID | varchar2(32) | user ID from T_USER_PROFILE |
| ARCHIVED_DATE | DATE | date archived |
| READ_DATE | DATE | date read |
| OBJ_VERSION | integer | version number |

T_OBJ_DATA (318): The T_OBJ_DATA table 318 holds the details of the data object. It's the superclass for all other data objects (Domains, Initiatives, Dashboards and Resources). There is an entry for each data object. The fields in the table's entries are as follows:

| Name | Type | Description |
|---|---|---|
| ID | varchar2(32) | record identifier |
| NAME | varchar2(128) | name of object |
| DESCRIPTION | varchar2(2000) | description of object |
| WORKSPACE_ID | varchar2(32) | workspace ID from T_WORKSPACE |
| PARENT_ID | varchar2(32) | ID of parent object in this table |
| OWNER_ID | varchar2(32) | owner ID from T_USER_PROFILE |
| ARCHIVED_DATE | date | date archived |
| ARCHIVED_BY | varchar2(32) | user archiving record |
| LOCKED_DATE | date | date locked |
| LOCKED_BY | varchar2(32) | user locking record |
| CREATED_DATE | date | date created |
| CREATED_BY | varchar2(32) | user creating record |
| UPDATED_DATE | date | date last updated |
| OBJ_VERSION | integer | version number |

T_OBJ_DATA_ALERT_USER (319): The entries in the T_OBJ_DATA_ALERT_USER table 319 relate alerts to users and data objects. There is an entry for each user and each data object. Each entry references the object's record in the T_OBJ_DATA table 318 and the user's record in the T_USER_PROFILE table 341. The fields in the table's entries are as follows:

| Name | Type | Description |
|---|---|---|
| ID | varchar2(32) | record identifier |
| OBJECT_ID | varchar2(32) | object ID from T_OBJ_DATA |
| USER_ID | varchar2(32) | user ID from T_USER_PROFILE |
| OBJ_VERSION | integer | version number |

T_OBJ_DATA_PERM_GROUP (320): The entries in the T_OBJ_DATA_PERM_GROUP table 320 relate permissions for groups to data objects. There is an entry for each permission for a group for each data object. Each entry references the object's record in the T_OBJ_DATA table 318 and the group's record in the T_WORKSPACE_GROUP table 349. Possible permission values are:

0=no permission

1=read

2=read-create

3=read-create-update

4=read-create-update-delete

The fields in the table's entries are as follows:

| Name | Type | Description |
|---|---|---|
| ID | varchar2(32) | record identifier |
| GROUP_ID | varchar2(32) | group ID from T_WORKSPACE_GROUP |
| OBJECT_ID | varchar2(32) | object ID from T_OBJ_DATA |
| PERMISSION | number(1) | permission code |
| CREATED_DATE | date | date created |
| UPDATED_DATE | date | date last updated |
| OBJ_VERSION | integer | version number |

T_OBJ_DATA_PERM_USER (321): The T_OBJ_DATA_PERM_USER table 321 relates permissions for a user to data objects. There is an entry for each permission for a user for each data object. Each entry references the object's record in the T_OBJ_DATA table 318 and the user's record in the T_USER_PROFILE table 341. Possible permission values are:

0=no permission

1=read

2=read-create

3=read-create-update

4=read-create-update-delete

The fields in the table's entries are as follows:

| Name | Type | Description |
|---|---|---|
| ID | varchar2(32) | record identifier |
| USER_ID | varchar2(32) | user ID from T_USER_PROFILE |
| OBJECT_ID | varchar2(32) | object ID from T_OBJ_DATA |
| PERMISSION | number(1) | permission code |
| CREATED_DATE | date | date created |
| UPDATED_DATE | date | date last updated |
| OBJ_VERSION | integer | version number |

T_OBJ_DASHBOARD (322): The T_OBJ_DASHBOARD table 322 holds the details of a knowledge board. The fields in the table's entries are as follows:

| Name | Type | Description |
|---|---|---|
| ID | varchar2(32) | record identifier |

T_OBJ_DASHBOARD_RES_TMPLT (323): The entries in the T_OBJ_DASHBOARD_RES_TMPLT table 323 relates resource templates with a particular knowledge board. There is an entry for each resource template/knowledge board association. Each entry references a knowledge board's record in the T_OBJ_DASHBOARD_TABLE 322 and a resource's record in the T_OBJ_RESOURCE table 329. The fields in the table's entries are as follows:

| Name | Type | Description |
|---|---|---|
| ID | varchar2(32) | record identifier |
| DASHBOARD_ID | varchar2(32) | knowledge board ID from T_OBJ_DASHBOARD |
| RES_TMPLT_ID | varehar2(32) | resource ID from T_OBJ_RESOURCE |
| SEQUENCE_NUM | number(4,0) | display sequence number |
| OBJ_VERSION | integer | version number |

T_OBJ_DASHBOARD_FIELD_DEFAULT (324): The T_OBJ_DASHBOARD_FIELD_DEFAULT table 324 holds the list of default fields that should be shown on a knowledge board for a particular resource template and any filter data. There is an entry for each field. Each entry references a knowledge board's record in the T_OBJ_DASHBOARD_RES_TMPLT table 323. The fields in the table's entries are as follows:

| Name | Type | Description |
| --- | --- | --- |
| ID | varchar2(32) | record identifier |
| DASHBOARD_RES_TMPLT_ID | varchar2(32) | knowledge board ID with resource from T_OBJ_DASHBOARD_RES_TMPLT |
| FIELD_NAME | varchar2(1000) | field name |
| FILTER_VALUE | varchar2(4000) | filter value |
| SEQUENCE_NUM | number(4,0) | display sequence number |
| OBJ_VERSION | integer | version number |

T_OBJ_DASHBOARD_FIELD_TMPLT (325): The T_OBJ_DASHBOARD_FIELD_TMPLT table 325 holds the list of dynamic fields that should be shown on a knowledge board for a particular resource template and any filter data. There is an entry for each field. Each entry references a knowledge board's record in the T_OBJ_DASHBOARD_RES_TMPLT table 325 and a field's record in the T_RES_TMPLT_FIELD table 337. The fields in the table's entries are as follows:

| Name | Type | Description |
| --- | --- | --- |
| ID | varchar2(32) | record identifier |
| DASHBOARD_RES_TMPLT_ID | varchar2(32) | knowledge board ID with resource from T_OBJ_DASHBOARD_RES_TMPLT |
| FIELD_ID | varchar2(32) | field ID from T_RES_TMPLT_FIELD |
| FILTER_VALUE | varchar2(4000) | filter value |
| SEQUENCE_NUM | number(4,0) | display sequence number |
| OBJ_VERSION | integer | version number |

T_OBJ_DOMAIN (326): The T_OBJ_DOMAIN table 326 holds the details of a domain. There is an entry for each domain. The fields in the table's entries are as follows:

| Name | Type | Description |
| --- | --- | --- |
| ID | varchar2(32) | record identifier |

T_OBJ_INITIATIVE (327): The T_OBJ_INITIATIVE table 327 holds the details of an initiative. There is an entry for each initiative. The fields in the table's entries are as follows:

| Name | Type | Description |
| --- | --- | --- |
| ID | varchar2(32) | record identifier |
| START_DATE | date | start date |
| END_DATE | date | end date |

T_OBJ_INITIATIVE_DATA_OBJECT (328): The entries in the T_OBJ_INITIATIVE_DATA_OBJECT table 328 relate data objects to initiatives. There is an entry for each initiative/data object association. Each entry references the initiative's record in the T_OBJ_INITIATIVE table 327 and the data object's record in the T_OBJ_DATA table 318. The initiative is related to a workspace through the Workspace_ID in the object's record. The fields in the table's entries are as follows:

| Name | Type | Description |
| --- | --- | --- |
| ID | varchar2(32) | record identifier |
| INITIATIVE_ID | varchar2(32) | initiative ID from T_OBJ_INITIATIVE |
| DATA_OBJECT_ID | varchar2(32) | data object ID from T_OBJ_DATA |

-continued

| Name | Type | Description |
| --- | --- | --- |
| SEQUENCE_NUM | number(4,0) | display sequence number |
| ARCHIVED_DATE | date | date archived |
| ARCHIVED_BY | varchar2(32) | user archiving record |
| LOCKED_DATE | date | date locked |
| LOCKED_BY | varchar2(32) | user locking record |
| CREATED_DATE | date | date created |
| UPDATED_DATE | date | date last updated |
| OBJ_VERSION | integer | version number |

T_OBJ_RESOURCE (329): The T_OBJ_RESOURCE table 329 holds the details of a resource. There is an entry for each resource. Each entry references the resource template's record in the T_RES_TMPLT 335 from which the resource was created. This association is used in knowledge boards to find resources belonging to the resource template for the purpose of generating a report, as described above. The fields in the table's entries are as follows:

| Name | Type | Description |
| --- | --- | --- |
| ID | varchar2(32) | record identifier |
| RESOURCE_TMPLT_ID | varchar2(32) | resource template ID from T_RES_TMPL |

T_OBJ_RESOURCE_INFORMATION (330): The entries in the T_OBJ_RESOURCE_INFORMATION table 330 relate information (documents, links & RSS feeds) to resources. There is an entry for each piece of information. Each entry references the resource's record in the T_OBJ_RESOURCE table 329. The fields in the table's entries are as follows:

| Name | Type | Description |
| --- | --- | --- |
| ID | varchar2(32) | record identifier |
| NAME | varchar2(128) | information name |
| DESCRIPTION | varchar2(2000) | information description |
| RESOURCE_ID | varchar2(32) | resource ID from T_OBJ_RESOURCE |
| ARCHIVED_DATE | date | date archived |
| ARCHIVED_BY | varchar2(32) | user archiving record |
| LOCKED_DATE | date | date locked |
| LOCKED_BY | varchar2(32) | user locking record |
| CREATED_DATE | date | date created |
| UPDATED_DATE | date | date last updated |
| OBJ_VERSION | integer | version number |

T_OBJ_RESOURCE_DOCUMENT (331): The entries in the T_OBJ_RESOURCE_DOCUMENT table 331 relate documents to the information table. It subclasses the T_RESOURCE_IN FORMATION table 330. There is an entry for each document. Each entry references an information's record in the T_OBJ_RESOURCE_INFORMATION table 330. The document is related to a resource through the Resource_ID in the information's record. The fields in the table's entries are as follows:

| Name | Type | Description |
| --- | --- | --- |
| INFORMATION_ID | varchar2(32) | information ID from T_OBJ_RESOURCE_INFORMATION |
| DOCUMENT_ID | varchar2(32) | document ID |
| CHECKSUM | varchar2(32) | checksum value |
| FILE_NAME | varchar2(255) | file name |
| VERSION | varchar2(4) | version number |

T_OBJ_RESOURCE_LINK (332): The entries in the T_OBJ_RESOURCE_LINK 332 table relate links to information. It subclasses the T_RESOURCE_INFORMATION table 330. There is an entry for each link. Each entry references an information's recording the T_OBJ_RESOURCE_INFORMATION table 330. The link is related to a resource through the Resource_ID in the information's record. The fields in the table's entries are as follows:

| Name | Type | Description |
| --- | --- | --- |
| INFORMATION_ID | varchar2(32) | information ID from T_OBJ_RESOURCE_INFORMATION |
| URL | varchar2(512) | URL for link |
| INTERNAL_FLAG | char(1) | set if internal link |

T_OBJ_RESOURCE_RSS (333): The entries in the T_OBJ_RESOURCE_RSS table 333 relate RSS feeds to information. It subclasses the T_RESOURCE_INFORMATION table 330. There is an entry for each RSS feed. Each entry references an information's record in the T_OBJ_RESOURCE_INFORMATION table 330. The RSS feed is related to a resource-through the Resource_ID in the information's record. The fields in the table's entries are as follows:

| Name | Type | Description |
| --- | --- | --- |
| INFORMATION_ID | varchar2(32) | information ID from T_OBJ_RESOURCE_INFORMATION |
| URL | varchar2(512) | URL for RSS feed |

T_OBJ_RESOURCE_VALUE (334): The T_OBJ_RESOURCE_VALUE table 334 holds values for each field of each resource, as set by a user. There is an entry for each field of each resource. Each entry references a field's record in the T_RES_TMPLT_FIELD table 337 and a resource's record in the T_OBJ_RESOURCE table 329. The field ID's come from the resource template associated with this resource. The fields in the table's entries are as follows:

| Name | Type | Description |
| --- | --- | --- |
| ID | varchar2(32) | record identifier |
| VALUE | varchar2(4000) | field value |
| FIELD_ID | varchar2(32) | field ID from T_RES_TMPLT_FIELD |
| RESOURCE_ID | varchar2(32) | resource ID from T_OBJ_RESOURCE |
| OBJ_VERSION | varchar2 | version number |

T_RES_TMPLT (335): The T_RES_TMPLT table 335 holds the details of the resource templates. There is an entry for each resource template. The fields in the table's entries are as follows:

| Name | Type | Description |
| --- | --- | --- |
| ID | varchar2(32) | record identifier |
| NAME | varchar2(128) | template name |
| DESCRIPTION | varchar2(2000) | template description |
| LAYOUT | varchar2(16) | template display layout |
| VERSION | number(3) | version number |
| NEXT_VERSION_ID | varchar2(32) | next version record ID in this table |

-continued

| Name | Type | Description |
| --- | --- | --- |
| MASTER_ID | varchar2(32) | master template record ID in this table |
| PUBLISHED_DATE | date | date published |
| DISCUSSIONS_FLAG | char(1) | set if discussions associated |
| INFORMATION_FLAG | char(1) | set if information associated |
| ARCHIVED_DATE | date | date archived |
| ARCHIVED_BY | varchar2(32) | user archiving record |
| LOCKED_DATE | date | date locked |
| LOCKED_BY | varchar2(32) | user locking record |
| CREATED_DATE | date | date created |
| CREATED_BY | varchar2(32) | user creating record |
| UPDATED_DATE | date | date updated |
| OBJ_VERSION | integer | version number |

T_RES_TMPLT_FIELD_TYPE (336): The T_RES_TMPLT_FIELD_TYPE table 336 holds a number of different types a data field in a resource template can exist as. There is an entry for each data field type. This is used when producing a visual representation of the field. Each field type can be associated with a category. The fields in the table's entries are as follows:

| Name | Type | Description |
| --- | --- | --- |
| ID | varchar2(32) | record identifier |
| NAME | varchar2(128) | field name |
| DESCRIPTION | varchar2(2000) | field description |
| HTML_CLASS | varchar2(255) | HTML class |
| MAX_DEFAULT_OPTIONS | number(4,0) | default maximum number of options |
| CATEGORY | varchar2(16) | category of field type |

T_RES_TMPLT_FIELD (337): The T_RES_TMPLT_FIELD table 337 holds both global data fields that apply to multiple object types and resource template specific data fields. The difference is determined by the RES_TMPLT_ID field. If this field is null, the field is global. Global fields are used when creating a new resource template. There is an entry for each data field. The Each entry references the resource template's record in the T_RES_TMPLT table 335, and the field type's record in the T_RES_TMPLT_FIELD_TYPE table 336. The fields in the table's entries are as follows:

| Name | Type | Description |
| --- | --- | --- |
| ID | varchar2(32) | record identifier |
| NAME | varchar2(128) | name of data field |
| DESCRIPTION | varchar2(2000) | description of data field |
| RES_TMPLT_ID | varchar2(32) | resource template ID from T_RES_TMPLT |
| FIELD_TYPE_ID | varchar2(32) | field type ID from T_RES_TMPLT_FIELD_TYPE |
| MAX_LENGTH | number(10,0) | maximum text length |
| REQUIRED_FLAG | char(1) | set if value required for field |
| SEQUENCE_NUM | number(4,0) | display sequence number |
| ARCHIVED_DATE | date | date archived |
| ARCHIVED_BY | varchar2(32) | user archiving record |
| LOCKED_DATE | date | date locked |
| LOCKED_BY | varchar2(32) | user locking record |
| CREATED_DATE | date | date created |
| UPDATED_DATE | date | date last updated |
| OBJ_VERSION | integer | version number |

T_RES_TMPLT_FIELD OPTION (338): The T_RES_TMPLT_FIELD OPTION table 338 holds options values for the various data fields in the resource templates. There is an entry for each option. Each entry references the field's record in the T_RES_TMPLT_FIELD table 337. For instance, a select list might contain 15 different predefined options. These can be setup for both global fields and resource template specific fields. The fields in the table's entries are as follows:

| Name | Type | Description |
| --- | --- | --- |
| ID | varchar2(32) | record identifier |
| NAME | varchar2(128) | name of data field |
| FIELD_ID | varchar2(32) | field ID from T_RES_TMPLT_FIELD |
| SEQUENCE_NUM | number(4,0) | display sequence number |
| ARCHIVED_DATE | date | date archived |
| ARCHIVED_BY | varchar2(32) | user archiving record |
| LOCKED_DATE | date | date locked |
| LOCKED_BY | varchar2(32) | user locking record |
| CREATED_DATE | date | date created |

| Name | Type | Description |
| --- | --- | --- |
| UPDATED_DATE | date | date updated |
| OBJ_VERSION | integer | version number |

T_RES_TMPLT_CATEGORY (339): The T_RES_TMPLT_CATEGORY table 339 holds the details of the resource template categories. There is an entry for each category. The fields in the table's entries are as follows:

| Name | Type | Description |
| --- | --- | --- |
| ID | varchar2(32) | record identifier |
| NAME | varchar2(128) | category name |
| DESCRIPTION | varchar2 | category description |
| ARCHIVED_DATE | date | date archived |
| ARCHIVED_BY | varchar2(32) | user archiving record |
| LOCKED_DATE | date | date locked |
| LOCKED_BY | varchar2(32) | user locking record |
| CREATED_DATE | date | date created |
| CREATED_BY | varchar2(32) | user creating record |
| UPDATED_DATE | date | date last updated |
| OBJ_VERSION | integer | version number |

T_RES_TMPLT_CATEGORY_MAP (340): The entries in the T_RES_TMPLT_CATEGORY_MAP table 340 relate categories to resource templates. There is an entry for each template/category association. Each entry references the resource template's record in the T_RES_TMPLT table 335 and the category's record in the T_RES_TMPLT_CATEGORY table 339. The fields in the table's entries are as follows:

| Name | Type | Description |
| --- | --- | --- |
| RES_TMPLT_ID | varchar2(32) | resource template ID from T_RES_TMPLT |
| CATEGORY_ID | varchar2(32) | category ID from T_RES_TMPLT_CATEGORY |

T_USER_PROFILE (341): The T_USER_PROFILE table 341 holds the information of users in the system and relates the user to a company, division, and department. There is an entry for each user. Each entry references a company's record in the T_MD_COMPANY table 310, a division's record in the T_MD_DIVISION table 311, and a department's record in the T_MD_DEPARTMENT table 312. The fields in the table's entries are as follows:

| Name | Type | Description |
| --- | --- | --- |
| ID | varchar2(32) | record identifier |
| TITLE | varchar2(32) | user job title |
| FIRST_NAME | varchar2(32) | first name |
| MIDDLE_NAME | varchar2(32) | middle name |
| LAST_NAME | varchar2(32) | last name |
| SUFFIX | varchar2(32) | name suffix |
| EMAIL | varchar2(255) | email address |
| ADDRESS1 | varchar2(64) | address |
| STREET | varchar2(64) | street |
| CITY | varchar2(64) | city |
| COUNTY | varchar2(64) | county |
| STATE | varchar2(128) | state |
| COUNTRY | varchar2(128) | country |
| POSTAL_CODE | varchar2(16) | postal code |
| PHONE | varchar2(24) | phone number |
| MOBILE | varchar2(24) | mobile number |
| PAGER | varchar2(24) | page number |
| FIRST_LOGIN | char(1) | whether logged in for first time |
| LICENSE_AGREEMENT | date | date accept license agreement |
| CREATED_DATE | date | date created |
| UPDATED_DATE | date | date last updated |
| OBJ_VERSION | integer | version number |

T_USER_PROFILE_WORK (354): The T_USER_PROFILE_WORK table holds the information of users in the system. There is an entry for each user, and each entry references the user's record in the T_USER_PROFILE table 341. The fields in the table's entries are as follows:

| Name | Type | Description |
| --- | --- | --- |
| USER_ID | varchar2(32) | user ID from T_USR_PROFILE |
| JOB_TITLE | varchar2(64) | user job title |
| JOB_DESCRIPTION | varchar2(4000) | job description |
| SPECIALTIES | varchar2(4000) | user specialties |
| CERTIFICATIONS | varchar2(4000) | user certifications |
| WORK_ID | varchar2(128) | user work ID |
| BADGE_NUMBER | varehar2(128) | user badge number |
| ADDRESS1 | varchar2(64) | address |
| STREET | varchar2(64) | street |
| CITY | varchar2(64) | city |
| COUNTY | varchar2(64) | county |
| STATE | varchar2(128) | state |
| COUNTRY | varchar2(128) | country |
| POSTAL_CODE | varchar2(16) | postal code |
| COMPANY_ID | varchar2(32) | company ID from T_MD_COMPANY |
| DIVISION_ID | varchar2(32) | division ID from T_MD_DIVISION |
| DEPARTMENT_ID | varchar2(32) | department ID from T_MD_DEPARTMENT |
| PHONE | varchar2(24) | phone number |
| MOBILE | varchar2(24) | mobile number |
| PAGER | varchar2(24) | page number |
| OFFICE_BUILDING | varchar2(64) | office building |
| OFFICE_FLOOR | varchar2(12) | office floor |
| OFFICE_ROOM | varchar2(12) | office room |
| OFFICE_PHONE | varchar2(24) | office phone number |
| OBJ_VERSION | integer | version number |

T_USER_LOGIN (342): The entries in the T_USER_LOGIN table 342 relate login information to users in the system, if authenticating users through the application. There is one entry for each user. Each entry references the user's record in the T_USER_PROFILE table 341. The fields in the table's entries are as follows:

| Name | Type | Description |
| --- | --- | --- |
| USER_ID | varchar2(32) | user ID from T_USER_PROFILE |
| PASS_WORD | varchar2(64) | password |
| PASS_WORD_DATE | date | date password set |
| AUTO_LOCKED_DATE | date | date auto locked set |
| ARCHIVED_DATE | date | date archived |
| ARCHIVED_BY | varchar2(32) | user archiving record |
| LOCKED_DATE | date | date locked |
| LOCKED_BY | varchar2(32) | user locking record |
| CONNECTED_DATE | date | date connected |

| Name | Type | Description |
| --- | --- | --- |
| CREATED_DATE | date | date created |
| UPDATED_DATE | date | date last updated |
| OBJ_VERSION | integer | version number |

T_USER_LOGIN_HISTORY (343): The entries in the T_USER_LOGIN_HISTORY table 343 relate the login/logout dates/times to individual users. There is an entry for each login and each logout. Each entry references a user's record in the T_USER_PROFILE table 341. The fields in the table's entries are as follows:

| Name | Type | Description |
| --- | --- | --- |
| HISTORY_ID | varchar2(32) | history ID |
| USER_ID | varchar2(32) | user ID from T_USER_PROFILE |
| LOGIN_DATE | date | date of login |
| LOGOUT_DATE | date | date of logout |
| OBJ_VERSION | integer | version number |

T_USER_PREFERENCES (344): The entries in the T_USER_PREFERENCES table 344 relate preferences to individual users. There is an entry for each user. Each entry references a user's record in the T_USER_PROFILE table 341. The fields in the table's entries are as follows:

| Name | Type | Description |
| --- | --- | --- |
| USER_ID | varchar2(32) | user ID from T_USER_PROFILE |
| DEFAULT_WORKSPACE_ID | varchar2(32) | default workspace |
| DEFAULT_NAVIGATOR | varchar2(16) | default navigator view |
| DEFAULT_LANGUAGE | varchar2(2) | default language |
| EMAIL_ALERTS | char(1) | set to receive email alerts |
| EMAIL_MESSAGES | char(1) | set to receive email message |
| OBJ_VERSION | integer | version number |

T_USER_ADMIN_ROLE (345): The entries in the T_USER_ADMIN_ROLE table 345 relate application level admin role assignments to users. Users can have multiple admin roles, There is an entry for each role assignment. Each entry references the role's record in the T_ADMIN_ROLE table 301 and the user's record in the T_USER_PROFILE table 341. The fields in the table's entries are as follows:

| Name | Type | Description |
| --- | --- | --- |
| ID | varchar2(32) | record identifier |
| ROLE_ID | varchar2(32) | role ID from T_ADMIN_ROLE |
| USER_ID | varchar2(32) | user ID from T_USER_PROFILE |
| ARCHIVED_DATE | date | date archived |
| ARCHIVED_BY | varchar2(32) | user archiving record |
| LOCKED_DATE | date | date locked |
| LOCKED_BY | varchar2(32) | user locking record |
| CREATED_DATE | date | date created |
| UPDATED_DATE | date | date updated |
| OBJ_VERSION | integer | version number |

T_WORKSPACE (346): The T_WORKSPACE table 346 holds information about workspaces. There is an entry for each workspace. The fields in the table's entries are as follows:

| Name | Type | Description |
| --- | --- | --- |
| ID | varchar2(32) | record identifier |
| NAME | varchar2(128) | workspace name |
| DESCRIPTION | varchar2(2000) | workspace description |
| ARCHIVED_DATE | date | date archived |
| ARCHIVED_BY | varchar2(32) | user archiving record |
| LOCKED_DATE | date | date locked |
| LOCKED_BY | varchar2(32) | user locking record |
| CREATED_DATE | date | date created |
| UPDATED_DATE | date | date last updated |
| OBJ_VERSION | integer | version number |

T_WORKSPACE_ROLE (347): The T_WORKSPACE_ROLE table 347 holds the four workspace roles available: Viewer, User, Manager, and Administrator. There is an entry for each workspace role The fields in the table's entries are as follows:

| Name | Type | Description |
| --- | --- | --- |
| ID | varchar2(32) | record identifier |
| NAME | varchar2(128) | role name |
| CODE | varchar2(32) | role code |
| DESCRIPTION | varchar2(2000) | role description |
| ARCHIVED_DATE | date | date archived |
| ARCHIVED_BY | varchar2(32) | user archiving record |
| LOCKED_DATE | date | date locked |
| LOCKED_BY | varchar2(32) | user locking record |
| CREATED_DATE | date | date created |
| UPDATED_DATE | date | date last updated |
| OBJ_VERSION | integer | version number |

T_WORKSPACE_MEMBER (348): The entries in the T_VORKSPACE_MEMBER table 348 relate users to a workspace and assign their role within the workspace. Users can have different roles in different workspaces. There is an entity for each user/workspace relationship. Each entry references the user's record in the T_USER_PROFILE table 341, the workspace's record in the t-WORKSPACE table 346, and the role's record in the T_WORKSPACE_ROLE table 347. The fields in the table's entries are as follows:

| Name | Type | Description |
| --- | --- | --- |
| ID | varchar2(32) | record identifier |
| USER_ID | varchar2(32) | user ID from T_USER_PROFILE |
| WORKSPACE_ID | varchar2(32) | workspace ID from T_WORKSPACE |
| ROLE_ID | varchar2(32) | role ID from T_WORKSPACE_ROLE |
| CREATED_DATE | date | date created |
| UPDATED_DATE | date | date last updated |
| OBJ_VERSION | integer | version number |

T_WORKSPACE_GROUP (349): The entries in the T_WORKSPACE_GROUP table 349 relate groups to a workspace. Groups are just a way of grouping a number of users together for easy reference. There is an entry for each group/workspace relationship. Each entry references a workspace's record in the T_WORKSPACE table 346. The fields in the table's entries are as follows:

| Name | Type | Description |
| --- | --- | --- |
| ID | varchar2(32) | record identifier |
| NAME | varchar2(128) | group name |
| DESCRIPTION | varchar2(2000) | group description |
| WORKSPACE_ID | varchar2(32) | workspace ID from T_WORKSPACE |
| ARCHIVED_DATE | date | date archived |
| ARCHIVED_BY | varchar2(32) | user archiving record |
| LOCKED_DATE | date | date locked |
| LOCKED_BY | varchar2(32) | user locking record |
| CREATED_DATE | date | date created |
| UPDATED_DATE | date | date updated |
| OBJ_VERSION | integer | version number |

T_WORKSPACE_GROUP_MEMBER (350): The entries in the T_WORKSPACE_GROUP_MEMBER table 350 relate users to workspace groups. Users can belong to any number of groups. There is an entry for each user/workspace relationship. Each entry references the group's record in the T_WORKSPACE_GROUP table 349 and a member's record in the T_WORKSPACE_MEMBER table 348. The fields in the table's entries are as follows:

| Name | Type | Description |
| --- | --- | --- |
| GROUP_ID | varchar2(32) | group ID from T-WORKSPACE_GROUP |
| MEMBER_ID | varchar2(32) | member ID from T_WORKSPACE_MEMBER |
| ARCHIVED_DATE | date | date archived |
| ARCHIVED_BY | varchar2(32) | user archiving record |
| LOCKED_DATE | date | date locked |
| LOCKED_BY | varchar2(32) | user locking record |
| CREATED_DATE | date | date created |
| UPDATED_DATE | date | date last updated |
| OBJ_VERSION | integer | version number |

T_WORKSPACE_QUICK_LINK (351): The entries in the T_WORKSPACE_QUICK_LINK table 351 relate links to workspaces. They can be used to quickly access information for the entire workgroup. There is an entry for each link/workspace relationship. Each entry references the workspace's record in the T_WORKSPACE table 346. The fields in the table's entries are as follows:

| Name | Type | Description |
| --- | --- | --- |
| ID | varchar2(32) | record identifier |
| NAME | varchar2(128) | link name |
| DESCRIPTION | varchar2(2000) | link description |
| WORKSPACE_ID | varchar2(32) | workspace ID from T_WORKSPACE |
| URL | varchar2(2000) | URL for link |
| TARGET | varchar2(32) | target of link |
| SEQUENCE_NUM | number(4,0) | display sequence number |
| ARCHIVED_DATE | date | date archived |
| ARCHIVED_BY | varchar2(32) | user archiving record |
| LOCKED_DATE | date | date locked |
| LOCKED_BY | varchar2(32) | user locking record |
| CREATED_DATE | date | date created |
| UPDATED_DATE | date | date last updated |
| OBJ_VERSION | integer | version number |

T_WORKSPACE_RES_TMPLT (352): The entries in the T_WORKSPACE_RES_TMPLT table 352 relate resources templates to workspaces. There is an entry for each workspace/template relationship. Each entry references the workspace's record in the T_WORKSPACE table 346, and the resource template's record in the T_RES_TMPLT table 335. The fields in the table's entries are as follows:

| Name | Type | Description |
| --- | --- | --- |
| WORKSPACE_ID | varchar2(32) | workspace ID from T_WORKSPACE |
| RES_TMPLT_ID | varchar2(32) | resource template ID from T_RES_TMPLT |
| CREATED_DATE | date | date created |
| UPDATED_DATE | date | date last updated |
| OBJ_VERSION | integer | version number |

T_WORKSPACE_PREFERENCE (353): The T_WORKSPACE_PREFERENCE table 353 has a many-to-one relationship with T_WORKSPACE 345 and holds an array of preferences for each workspace. There is an entry for each workspace preference. Each entry references the workspace's record in the T_WORKSPACE table 346. The fields in the table's entries are as follows:

| Name | Type | Description |
| --- | --- | --- |
| ID | varchar2(32) | record identifier |
| WORKSPACE_ID | varchar2(32) | workspace ID from T_WORKSPACE |
| NAME | varchar2(128) | preference name |
| VALUE | varchar2(2000) | preference value |
| OBJ_VERSION | integer | version number |

C. Administrative Setup

1. Company

FIGS. 5-10F show administrative tools for setup and management of the system. Administrators can customize non-workspace objects, such as logos to provide a corporate identity to the navigation GUI. The non-workspace objects are displayed in the left navigation GUI 504. As illustrated in FIG. 5, the current logo 501 is shown on the screen. An administrator can choose to set the default logo by selecting the "Set Default Logo" button 502 and selecting the file of the logo in field 503. The logo information is stored in the T_APPLICATION_LOGO table 303.

Figure 6A:
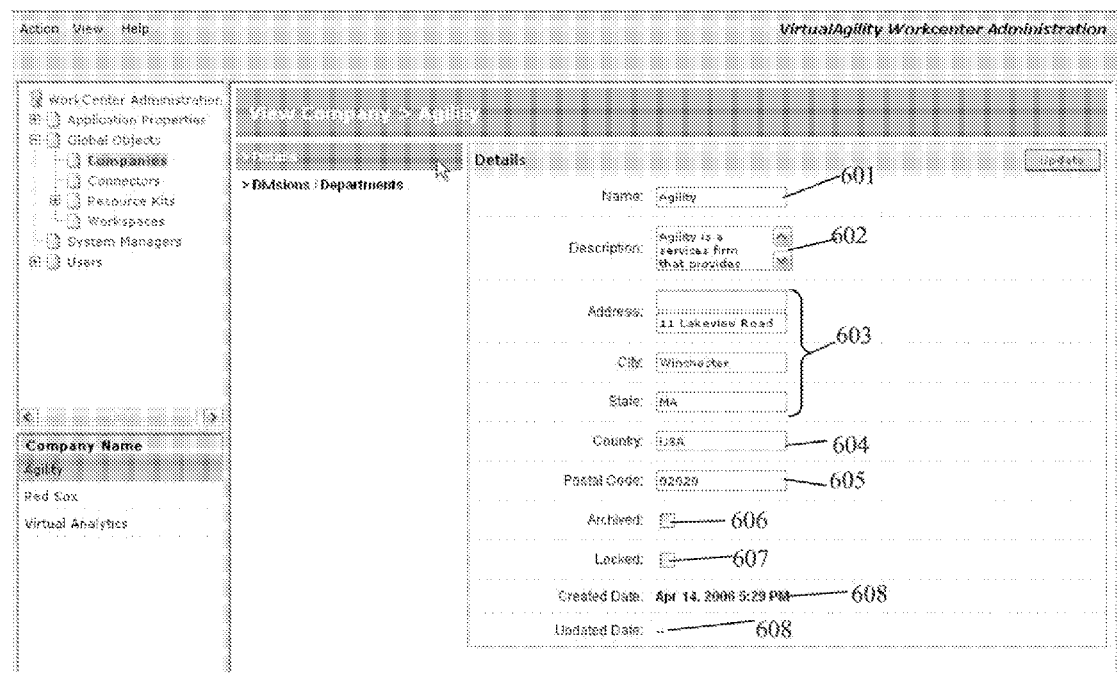
FIGS. 6A-6C illustrate the set up of companies that will be sharing the navigation GUI.
Figure 6B:
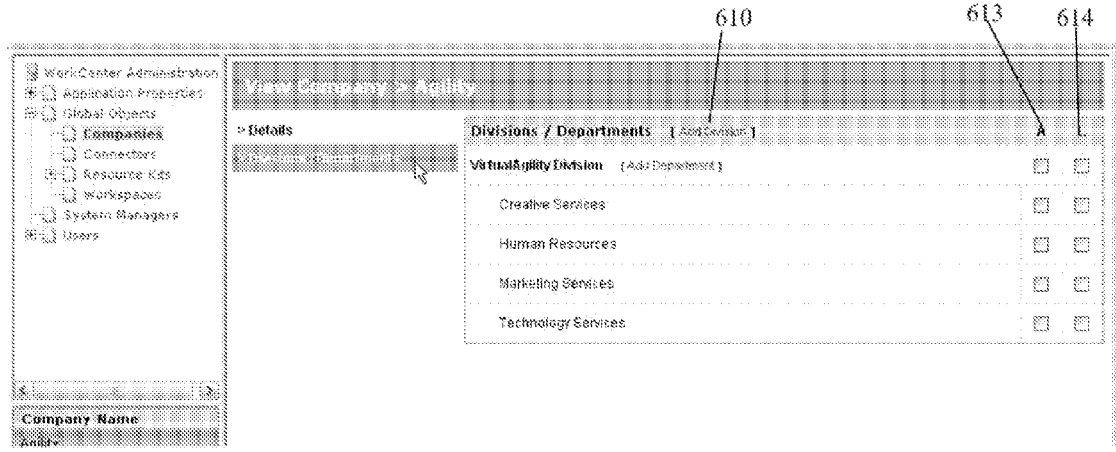
Figure 6C:
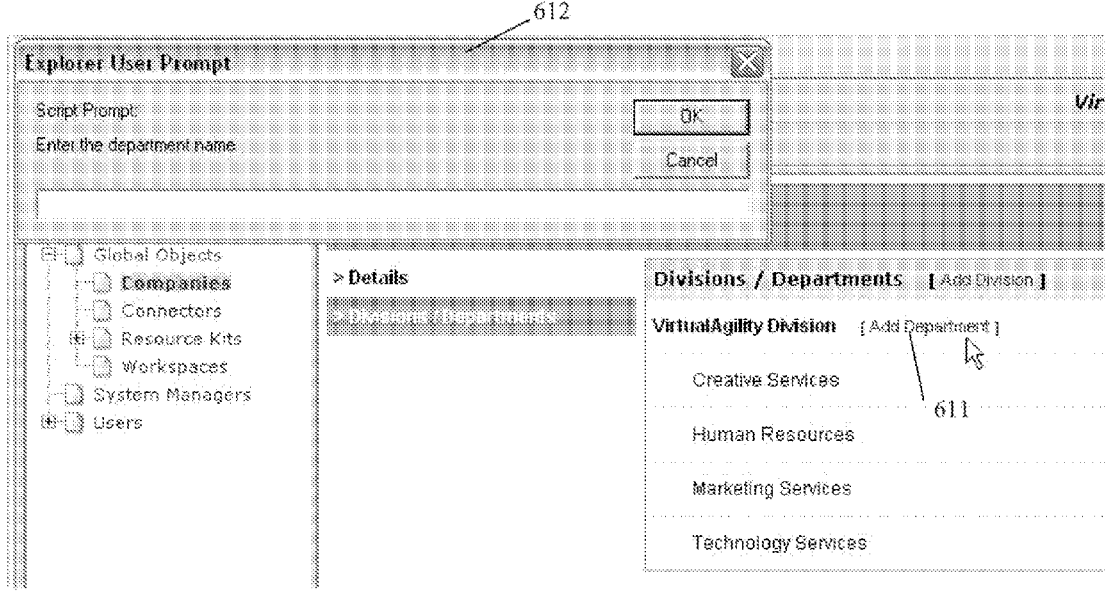

FIGS. 6A-6C illustrate the set up of companies that will be sharing the navigation GUI. An administrator can set the companies, divisions, and departments in the system. Information for a company is stored in an entry in the T_MD_COMPANY table 310. As illustrated in FIG. 6A, the administrator sets the name 601, description 602, the address, city, and state 603, country 604, and postal code 605. The date that the company's record was created 608 and the date that the company information was last updated 609 are also stored in the T_MD_COMPANY table 310.

An administrator can further select the Archive 606 or Lock 607 options. These options provide the ability to lock or archive the system's elements or documents. These options are important in supporting the compliance aspect of the system, where any user, company or element, including any document ever put in the system, is maintained forever. Selection of the Lock option 607 provides the ability to protect an entity so that no other person can change or remove it from the system. The selection of the Archive option 606 means that the record for the company will be removed from the view on the system but will remain within the system's database and could be retrieved if needed.

As illustrated in FIG. 6B, a division can be created and associated with the company by selecting "Add Division"

610. The administrator is then prompted for information for the division. Division information is stored in an entry in the T_MD_DIVISION table 311. The administrator sets the name of the division, the company with which the division is associated, the date the division's record was created, and the date the division information was last updated, which are stored in the entry. The entry references the company in the Company_ID field. The administrator can further select the archive option 613 and/or the lock option 614 for this division.

As illustrated in FIG. 6C, a department can be created and associated with the division by selecting "Add Department" 611. The administrator is then prompted for information for the department, such as through a prompt window 612 for the department name. Information for the department is stored in an entry in the T_MD_DEPARTMENT table 312. The administrator sets the name of the department, the division with which the department is associated, the date the department's record was created, and the date the department information was last updated, which are stored in the entry. The entry references the division in the Division_ID field. The administrator can further select the archive option and/or the lock option (not shown).

2. Resources

Figure 7:
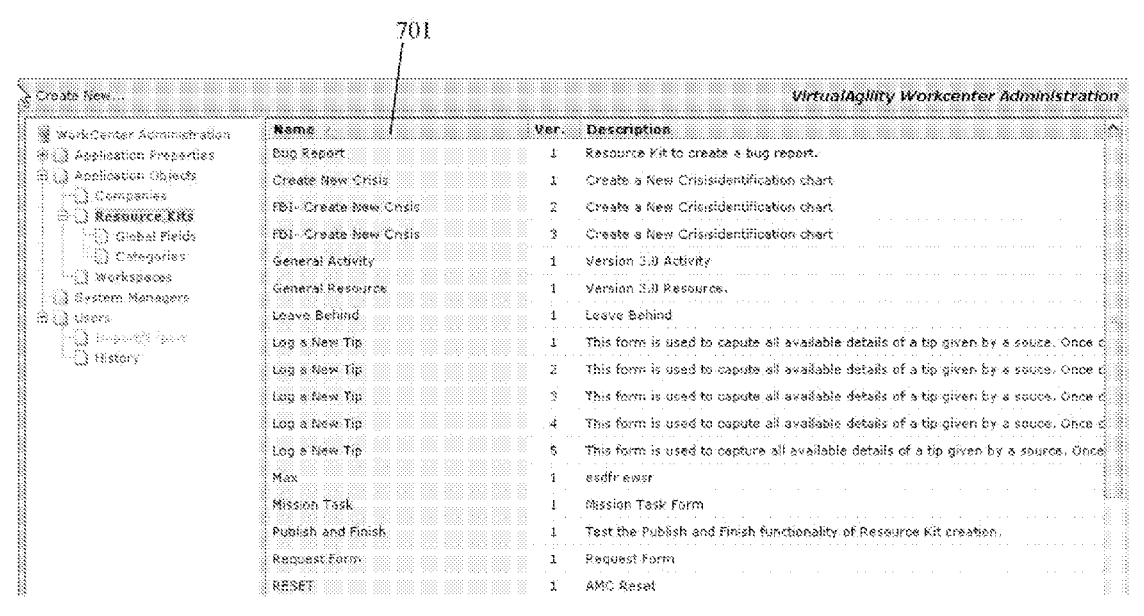
Figure 8A:
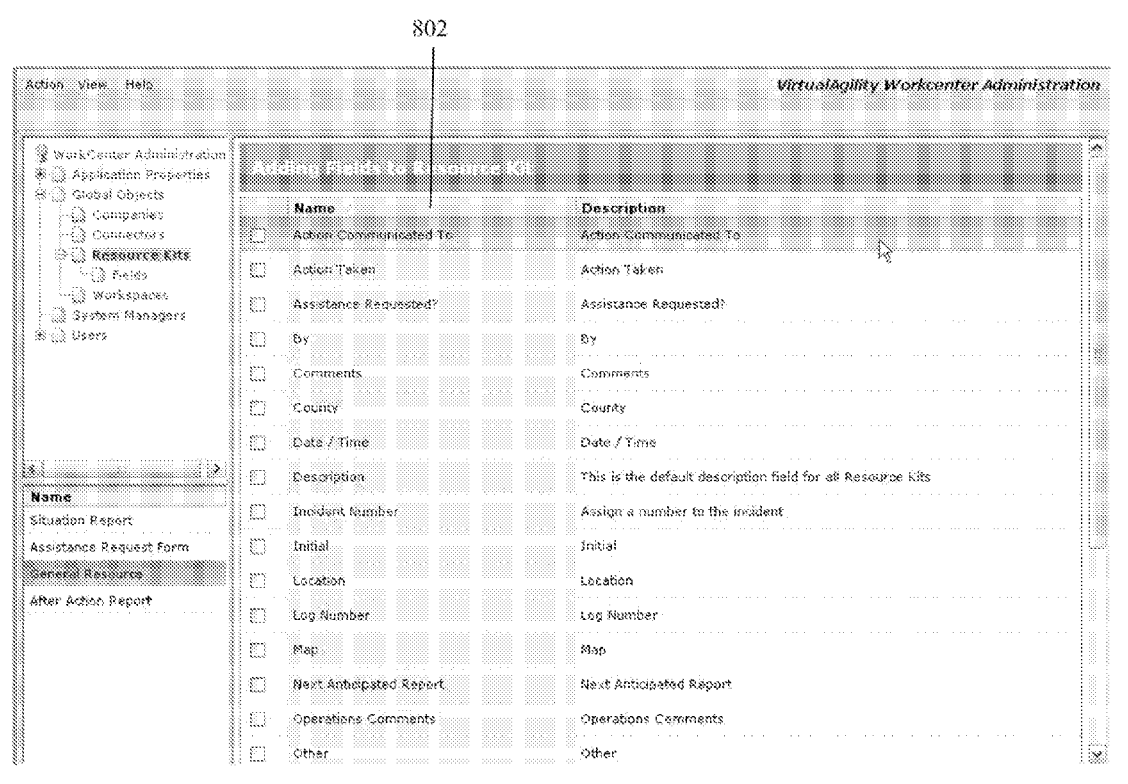
Figure 8B:
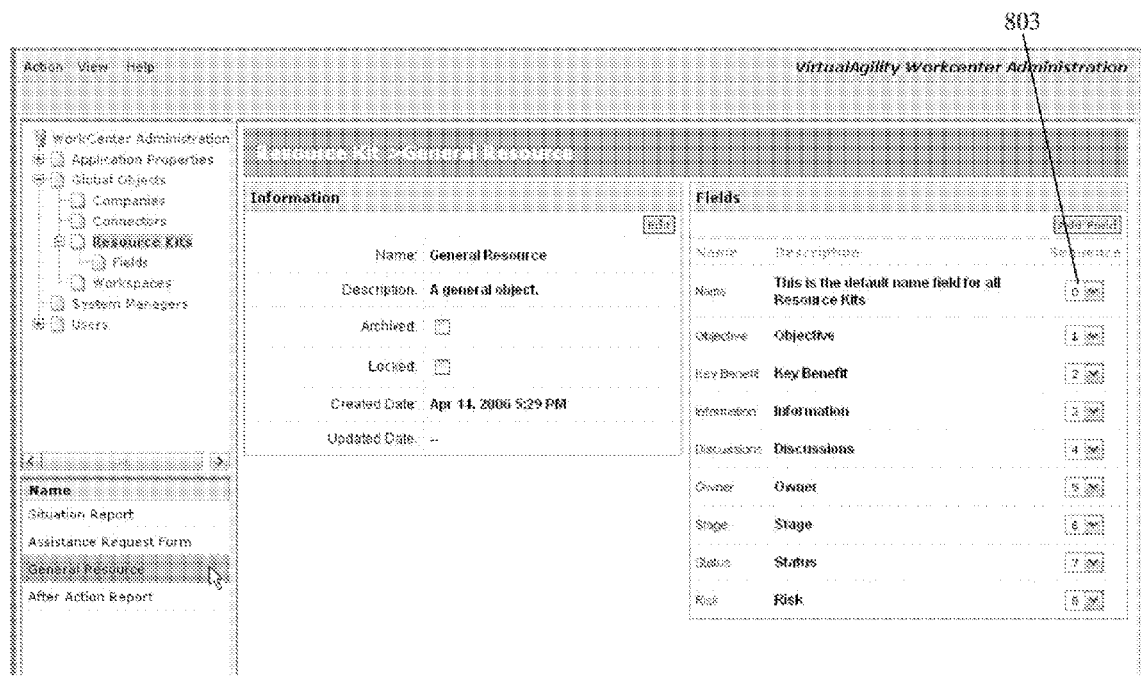

FIGS. 7-8B illustrate the set up of resources. Resource information is stored in the T_OBJ_RESOURCE table 329. As illustrated in FIG. 7, the system first displays the available resources templates 701, which are stored in the T_RES_TMPLT table 335. The fields in a resource template are stored in the T_RES_TMPLT_FIELD_TYPE table 336, the T_RES_TMPLT_FIELD table 337, and the T_RES_TMPLT_FIELD_OPTION table 338. An administrator can choose one of the available resource templates 701 from which to create a new resource template. As illustrated in FIG. 8A, when creating a new resource template, an administrator selects the field(s) they want to use in the resource that will be created from the resource template. The system will contain a list of available fields 802, such as Action Communicated To, Action Taken, Assistance Requested, and others as shown in FIG. 8A. In addition, an administrator can add new fields by defining the type of field and the elements presented. As illustrated in FIG. 5B, the fields can then be placed in the order in which they will appear in the resource template by setting the sequence 803. The creation of a resource from the resource template is described further below in the User's Experience section.

The administrator can further create template categories (not shown) to which the resource template can be related. The template categories are stored in the T_RES_TMPLT_CATEGORY table 339, with the resource template/category association stored as an entry in the T_RES_TMPLT_CATEGORY_MAP table 340.

3. Workspaces

Figure 9A:
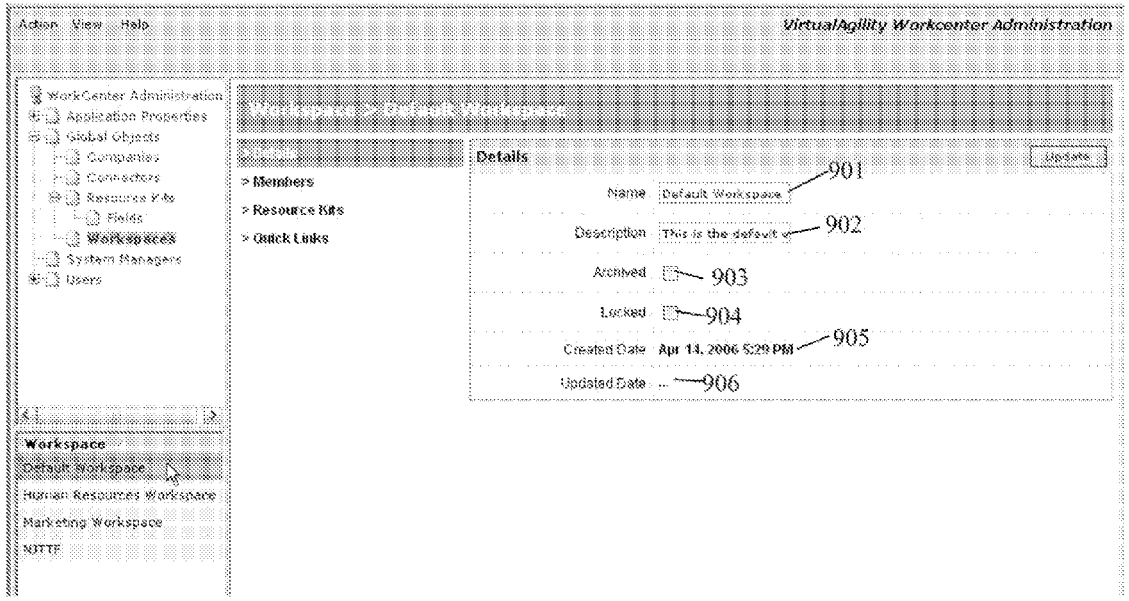

FIGS. 9A-9E illustrate the set up of workspaces. An administrator sets workspace information, which is stored in the T_WORKSPACE table 346. As illustrated in FIG. 9A, workspace information includes the name of the workspace 901, a description of the workspace 902, the date the workspace record was created 905, and the date the workspace information was last updated 906. The administrator can further select the archive option 903 and/or the lock option 904.

Figure 9B:
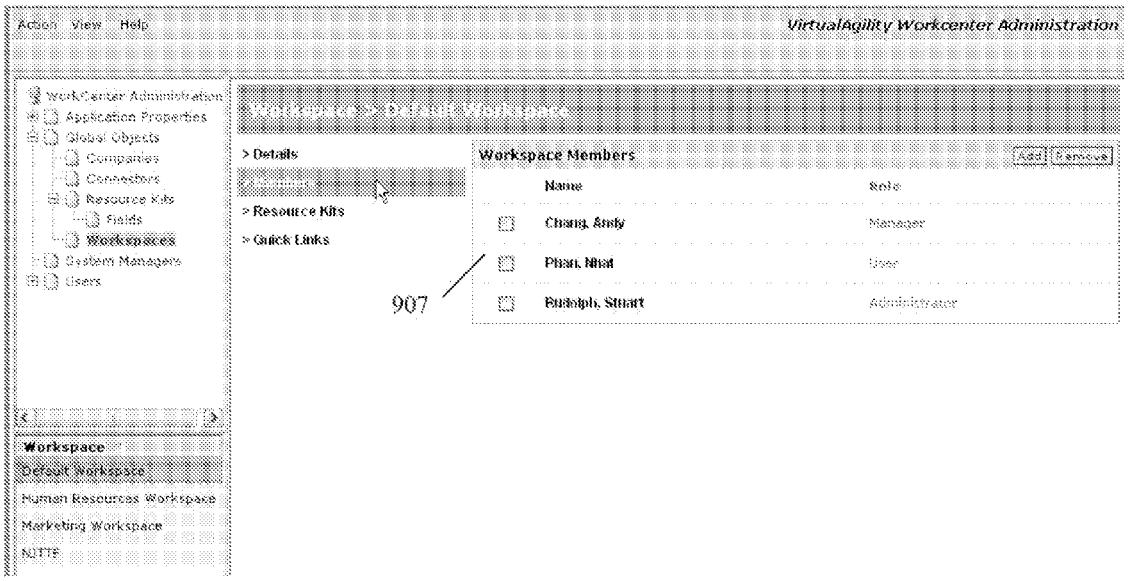
Figure 9C:
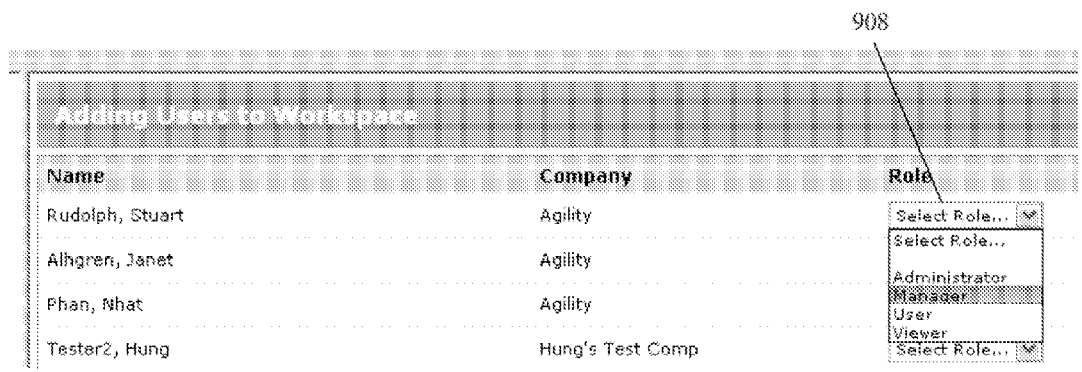

As illustrated in FIG. 9B, the administrator can add users 907 as members of the workspace. Information for each user member is stored in the T_WORKSPACE_MEMBER table 348. The information includes the identity of the user member, the User_ID coming from the T_USER_PROFILE table 341. The workspace to which the user is a member is stored in the Workspace_ID field, the workspace ID coming from the T_WORKSPACE table 346. As illustrated in FIG. 9C, each member is assigned privileges or roles 908. The role of a member is stored in the Role_ID field in the T_WORKSPACE_MEMBER TABLE 348, the Role_ID coming from the T_WORKSPACE_ROLE table 347.

If a workspace group is created (not shown), then the workspace group information is stored in the T_WORKSPACE_GROUP table 349. Users are then added as members of the workspace group by adding an entry to the T_WORKSPACE_GROUP_MEMBER table 350 with a user's Member_ID and a Group_ID for a workspace group. The Member_ID comes from the T_WORKSPACE_MEMBER table 348. This links users to the workspace group.

Figure 9D:
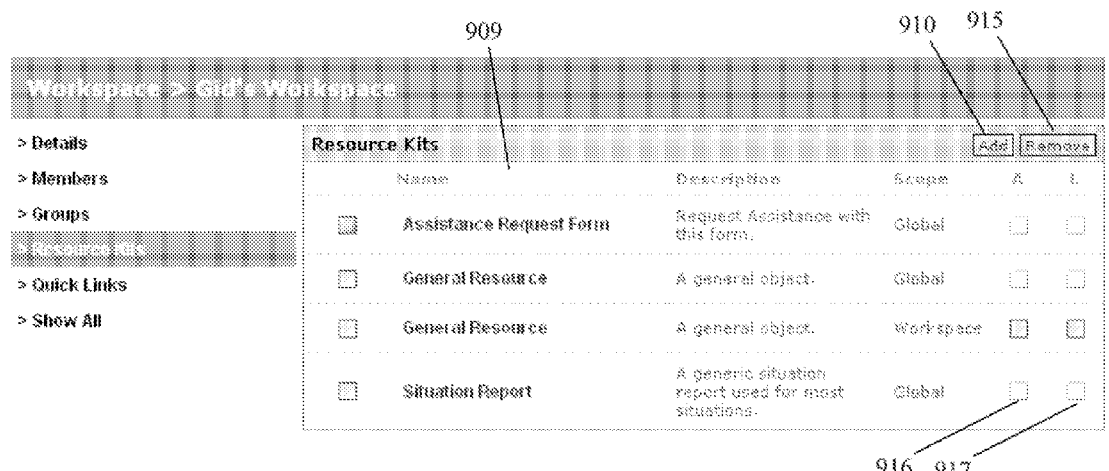

As illustrated in FIG. 9D, resource templates 909 can be associated or disassociated with the workspace by checking the appropriate resource template and selecting the Add button 910 or Remove button 915. The association is stored in the T_WORKSPACE_RES_TMPLT table 352, which stores the Workspace_ID from the T_WORKSPACE table 346 and the Res_Tmplt_ID FROM THE T_RES_TMPLT table 335 in the same record. The administrator can further select the archive option 916 or the lock option 917 for any of the resource templates 909.

Figures 9E, 10A:
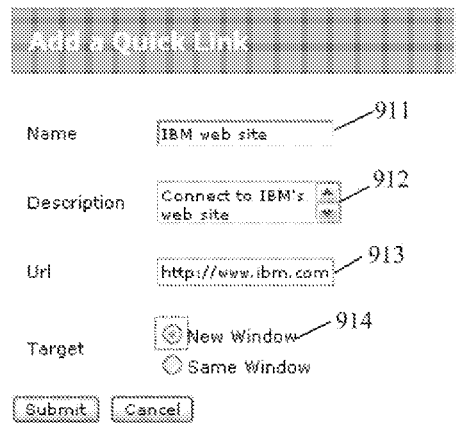

As illustrated in FIG. 9E, quick links can also be added to the workspace. The quick links are stored in the T_WORKSPACE_QUICK_LINK table 351, including the name 911 of the quick link in the Name field, the description 912 of the quick link, the URL 913 for the quick link, and whether the Target 914 of the quick link is to be displayed in a new window or the same window as the workspace.

4. Users

FIGS. 10A-10F illustrate the set up of users. Setting up users is a key function of the system administrator. Users can be added to and removed from the system at any point in time. Since the activities of a user are recorded and information loaded by users might be in use after the user's departure, there is a need to maintain the identity of a user even after he has left or has been terminated from using the system. Therefore, a user is never deleted but rather "archived". The administrator can create a new user by setting the personal information, provide passwords, and associate the user's role within the system. Users are associated with a company, division, and department as set in the company's profile option. The administrator can update users' information or archive them.

Figure 10B:
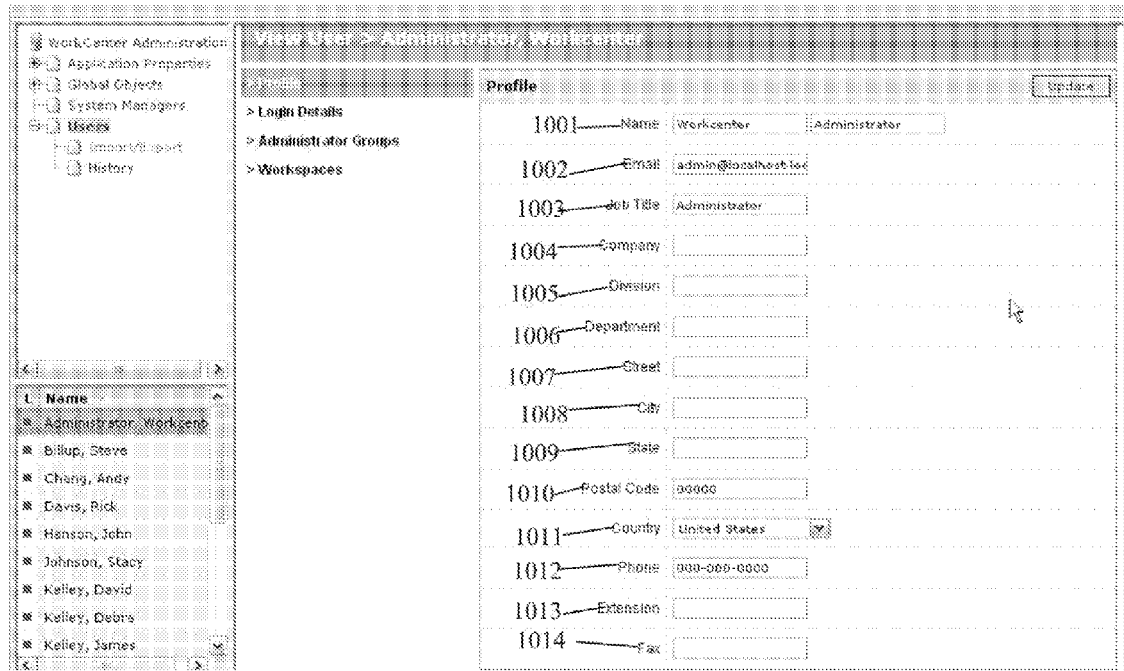

As illustrated in FIG. 10A, the administrator is first shown a list of existing users 1030. From this screen, the administrator can select the archive option 1031 or the lock option 1032 for any of the users 1030. When the administrator selects an "Add User" option (not shown), a blank profile is displayed, as illustrated in FIG. 10B. The administrator fills in the fields, and the field values are stored in the T_USER_PROFILE table 341 and the T_USER_PROFILE_WORK table 354. The user information includes the user name 1001, the email address 1002, the job title 1003, the company 1004, which comes from the T_MD_COMPANY table 310, the division, which comes from the T_MD_DIVISION table 311, and the department, which comes from the T_MD_DIVISION table 312. Also set are the street 1007, city 1008, state 1009, postal code 1010, and country 1011 of the user's address, and the user's phone 1012, extension 1013, and fax 1014 numbers. Also stored in the T_USER_PROFILE table 341 are the first time the user logs in the system, the date the user accepts the application license agreement, the date the user's profile was created, and the date the user's profile was last updated. Drop down menu can be used for any of these fields.

Figure 10C:
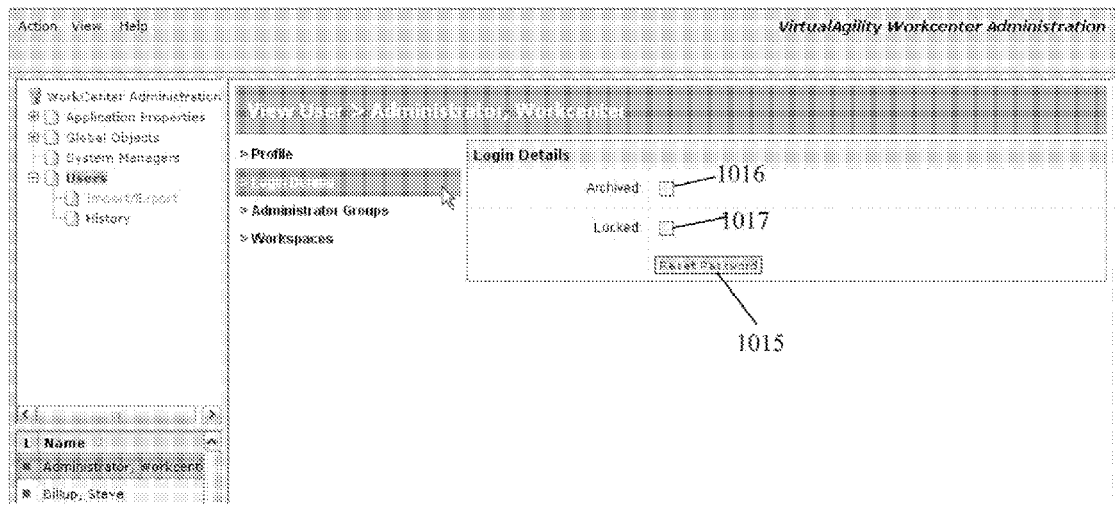

As illustrated in FIG. 10C, the administrator can reset the user's password by selecting the reset password button 1015. The password is stored as part of the user's record in the T_USER_LOGIN table 342, which also stores the date the password was created, the date the login record was created, and the date the login record was last updated. Users can be archived by selecting the archive option 1016, and/or or locked by selecting the lock option 1017.

Figure 10D:
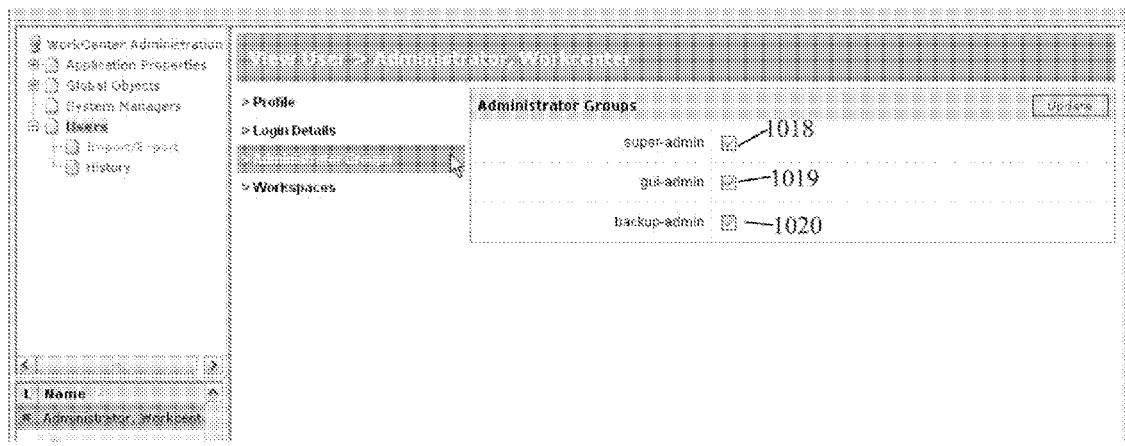

As illustrated in FIG. 10D, the administrator can authorize the user for administrative roles by selecting a super-admin (site administrator) option 1018, a GUI administrator option 1019, or a backup administrator option 1020. The super-admin has authority to manage anything in the system. The GUI administrator has authority only to manage the navigator GUI. The backup administrator has authority to manage only the backup of the system. The user's role is stored in the T_USER_ADMIN_ROLE table 345, which includes the User_ID and the Role_ID fields. The User_ID comes from the T_USER_PROFILE table 341, and the Role_ID comes the T_ADMIN_ROLE table 301.

Figure 10E:
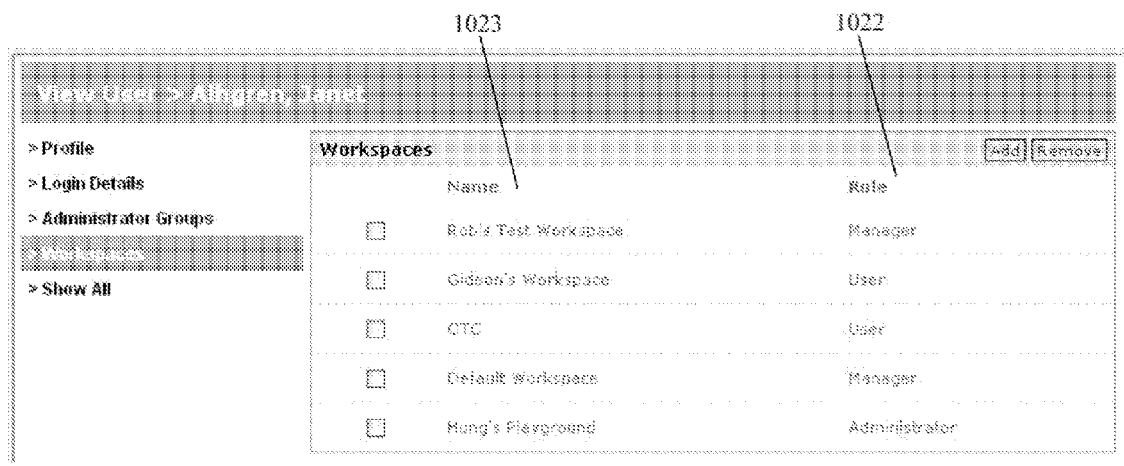

The administrator can assign users 1021 to each workspace. At the time of selecting a workspace, the administrator can assign to Users roles and privileges. Possible roles include Workspace administrator. Manager, User, and Viewer. These assignments are stored in the T_WORKSPACE_MEMBER table 348, which includes the User_ID field from the T_USER_PROFILE table 341, and the Role_ID field from the T_WORKSPACE_ROLE table 347. Users can have different roles in different workspaces. For example, as illustrated in FIG. 10E, user Janet Alhgren is given access to the workspaces listed 1021 and assigned the roles listed 1022 in each respective workspace.

As illustrated in FIG. 10F, the administrator can select History and view the log of each user' access to the system. The login history is stored in the T_USER_LOGIN_HISTORY table 343.

D. User Experience

Once the system administrator sets up an account for a user, the user has the ability to log into the system and access the workspaces. The user is provided with a URL, for accessing the workspaces, as well as a unique username and password. The user, through a web enabled application, accesses the site at the URL. FIGS. 11A-33G show an example user's experience in using the system to access workspaces.

1. Login

Figure 11A:
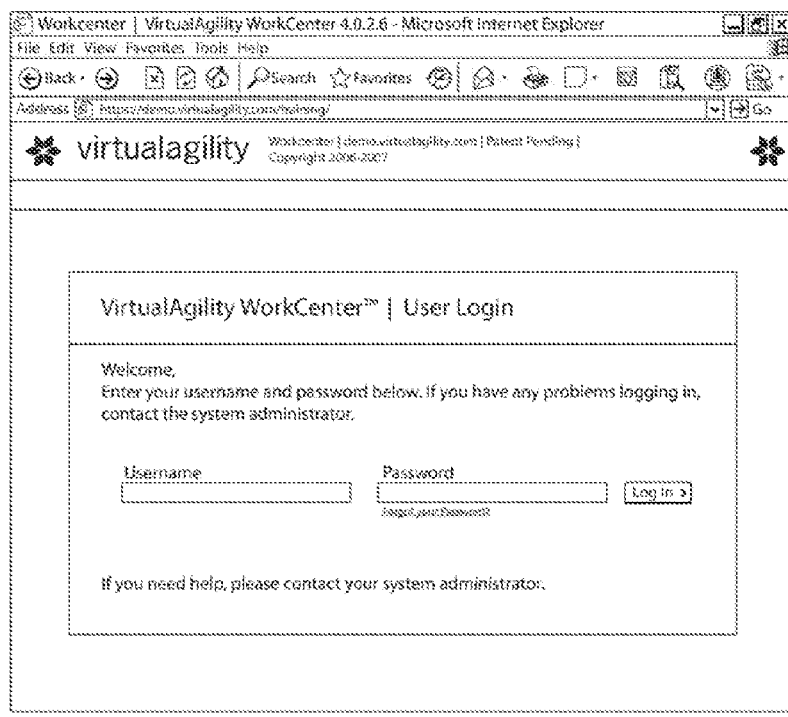
Figure 11B:
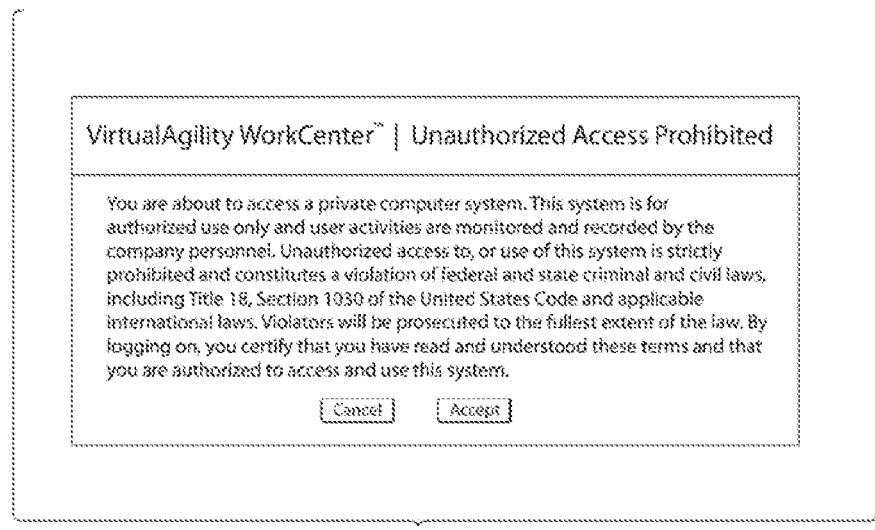

The user launches an Internet browser application at a client and enters the URL address in the browser address field. The user enters the user name and password provided by the administrator in the logon screen, illustrated in FIG. 11A. A corporate network and server usage message may show, as illustrated in FIG. 11B. The user continues by accepting the terms.

Figure 11C:
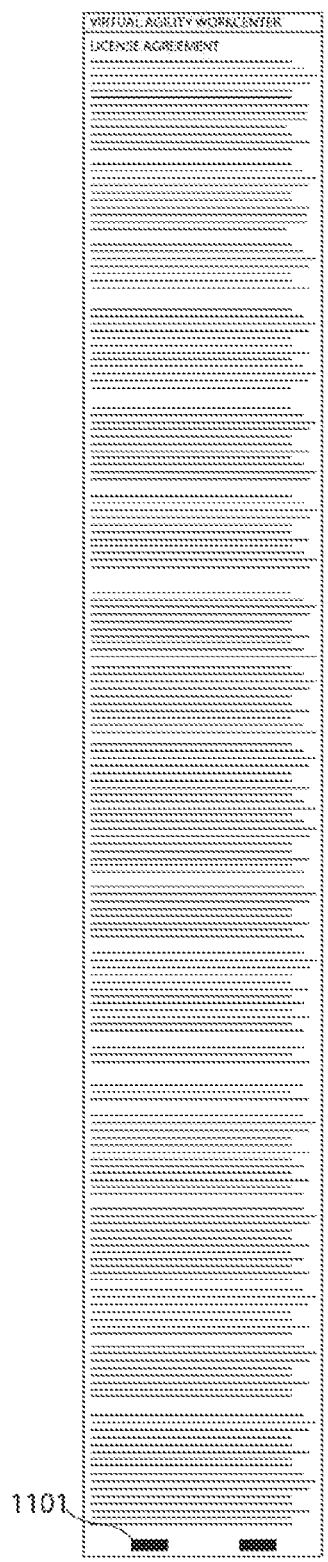
Figure 12:
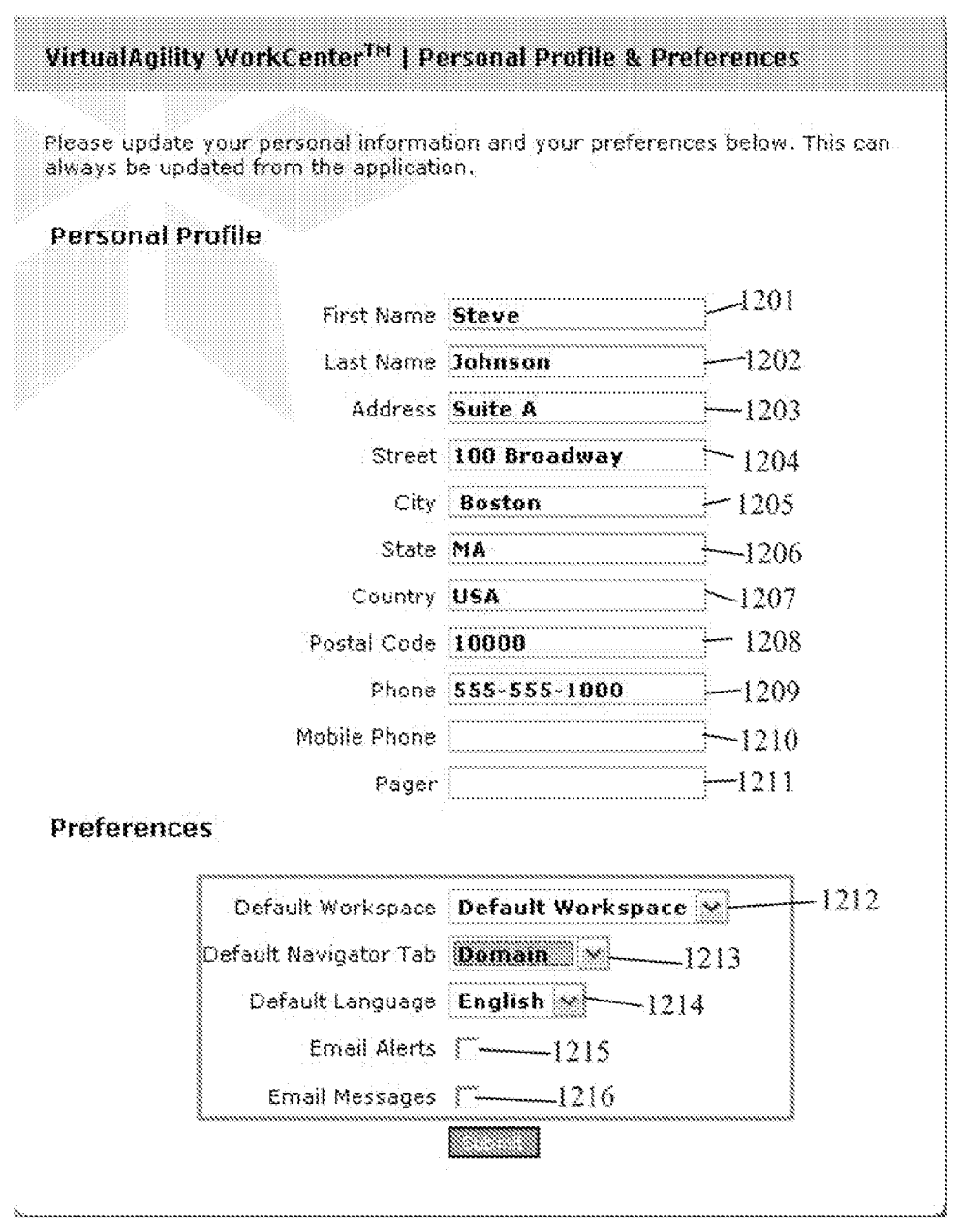

For first time users, a screen will display the licensing agreement and terms of use, as illustrated in FIG. 11C. The user continues by selecting an accept button 1101. The user is then provided an opportunity to add, update, or correct his personal profile information, as illustrated in FIG. 12. The personal profile information is stored in the T_USER_PROFILE table 341 and the T_USER_PROFILE_WORK table 354, and the preferences are stored in the T_USER_PREFERENCES table 344.

The person profile information includes the user's first name 1201 and last name 1202, address 1203, street 1204, city 1205, state 1206, country 1207, and postal code 1208, and the phone 1209, mobile phone 1210, and pager 1211 numbers.

The user preferences include the default workspace 1212, the default navigator lab 1213, and the default language 1214. The user can further choose whether or not to receive email alerts and/or email messages by selecting/deselecting the email alerts option 1215 and email messages option 1216.

Future logons by the user will bypass the licensing agreement and the personal profile setup.

2. Overview Screen

Figure 13:
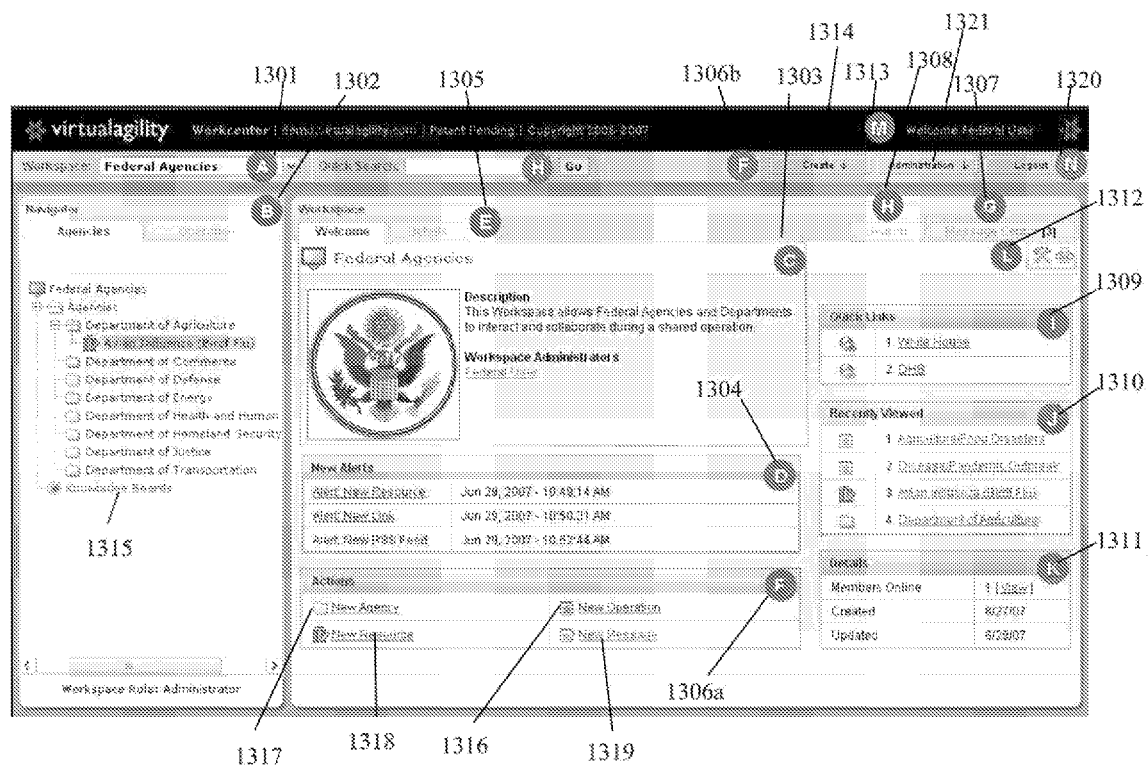
FIG. 13 illustrates an overview screen of a default workspace.

After logging on, the user is displayed the overview screen of the default workspace, an example of which is illustrated in FIG. 13. The overview screen is divided into areas that provide the tools to interact with the system and navigate through the system. The areas include: (A) Default workspace 1301 and a pull down selection to navigate to other workspaces (if applicable); (B) Navigator screen 1302, which is divided into two tables for agencies (domains) and operations (initiatives); (C) overview workspace screen 1303, which includes (he logo, a description of the displayed workspace, and a list of administrators; (D) List of new alerts 1304; (E) Detail view 1305 (hidden) which shows the agency, operation, or resource when selected; (F) List of actions 1306a through which the user can start working in the workspace, which can also be taken through pull down tabs 1306b: (G) Message Center 1307 (hidden), providing the ability to see all alerts and messages and the ability for the user to read, send, forward, or reply to alerts and messages; (H) Search 1308 (hidden), for searching the agency, operation, or resource of the workspace; (I) Quick links 1309, which provide general purpose links to web sites or tools: (J) Recently viewed information 1310 for quick reference to last visited pages; (K) Details 1311, which includes creation date and updated date for the workspace, and a list of workspace members on-line or off-line; (L) Tools and print 1312 for editing the welcome screen, if the user has permission to do so, or to print the page; (M) User name display 1313: and (N) Logout button 1320 to ensure that sessions are terminated.

Figure 14:
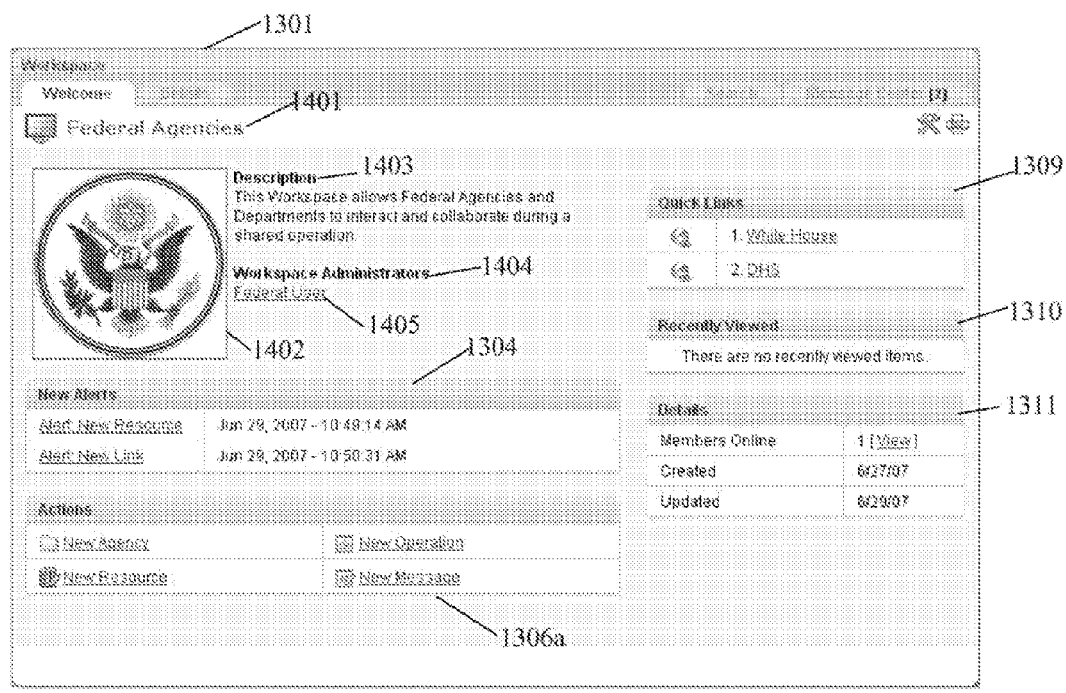
FIG. 14 shows an isolated view of the default workspace screen.

FIG. 14 shows an isolated view of the default workspace screen 1301. The default workspace 1301 includes a title or name of the workspace 1401, a logo or graphic 1402 representing the agency, department or any unique identity for the workspace or its users, a description 1403 that explains the workspace's goal or its purpose, and a list of workspace administrators 1404 and a link 1405 for sending a message to any of the administrators with issues like access, permissions or guidelines. The logo is stored in the T_APPLICATION_LOGO table 303. The name 1401 and description 1402 are stored in the T_WORKSPACE table 346. The list of administrators 1404 is stored in the T_WORKSPACE_MEMBER table 348 as users with a Role_ID field that indicates an administrator role.

The workspace 1301 further includes the list of unread alerts 1304 that are in the user's Message Center, actions 1306a, quick links 1309, recently viewed list 1310, and details 1311. The alerts 1304 are stored in the T_OBJ_DATA_ALERT_USER table 319. Selecting any of the alerts will open the Message Center and the appropriate alert for reference. The Message Center will be further described later in this specification.

The actions 1306a provide direct access to respective Creates dialog where users create new structures or shareable resource element for an agency, operation, resource or message. The create dialogues are shown and described later below. The agency (domain) is stored in the T_OBJ_DOMAIN table 326. The operation (initiative) is stored in the T_OBJ_INITIATIVE table 327. The resource is stored in the T_OBJ_RESOURCE table 329. The agency, operation, and resource are associated with a workspace through the T_OBJ_DATA table 318 as illustrated in FIGS. 4C-4E.

The quick links 1309 provide quick access to general purpose information (or tools) related to the main function of a workspace. The quick links are stored in the T_WORKSPACE_LINK table 350.

The recently viewed list 1310 shows the last screens the user visited. The list is refreshed during logon. Selecting any of the presented entries will open the page in detail view. This enables a user to "jump" to recently visited pages without the need to use the navigator 1302 (FIG. 13).

The details 1311 provide information on the date the workspace was created or modified, stored in the T_WORKSPACE table 346. Depending on the options set up by the administrator for the user, the details 1311 may provide the ability to view other workspace members and whether they are online or offline.

Figure 15A:
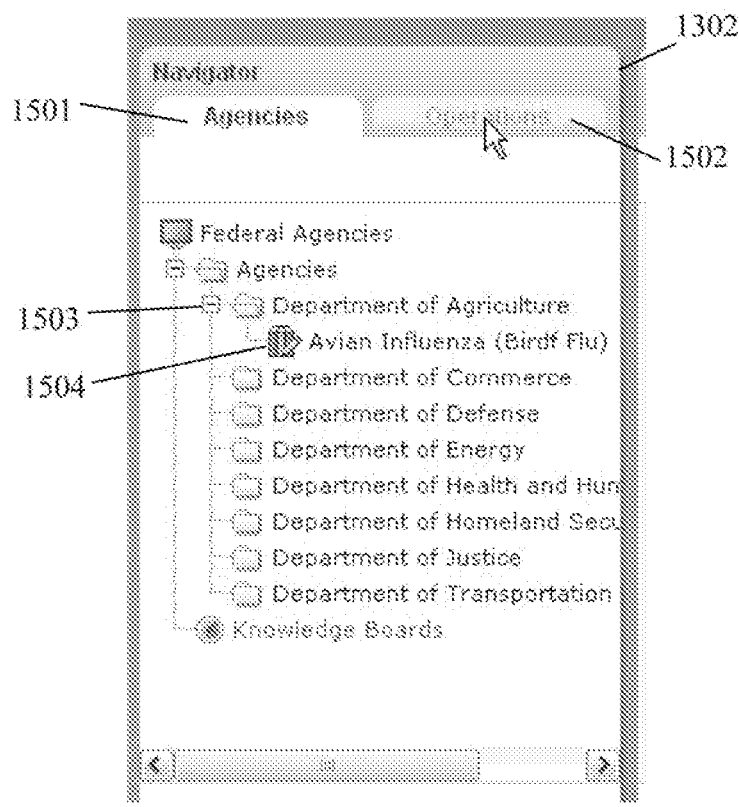
FIGS. 15A-15C show isolated views of the navigator 1302.
Figure 15B:
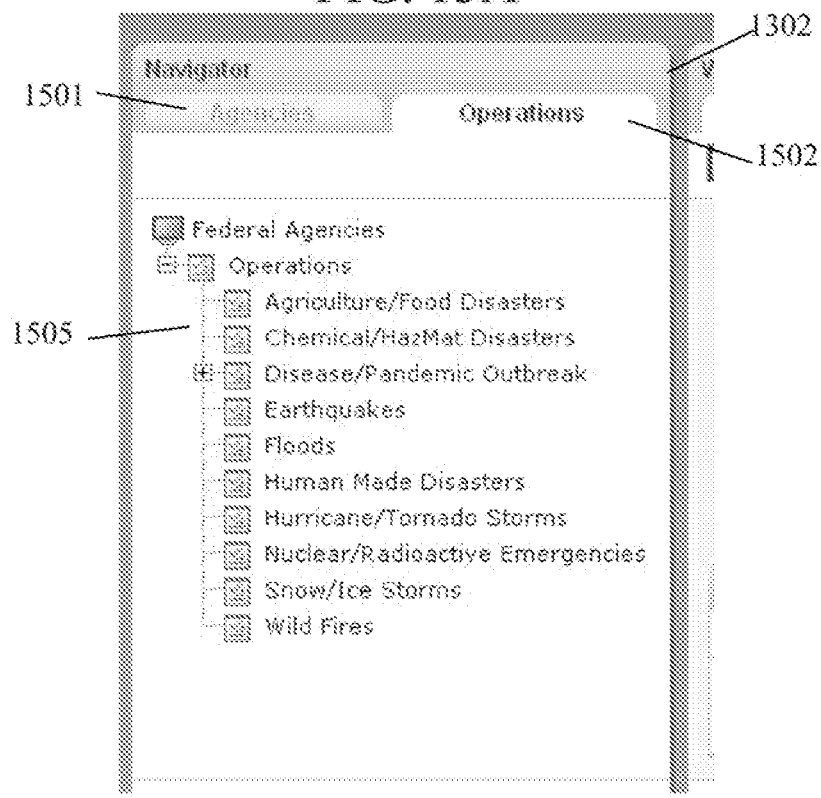

FIGS. 15A-15B show isolated views of the navigator 1302. The navigator 1302 shows the two different views of the resources: the agencies (domains) 1501 and the operations (initiatives) 1502. The two views are selectable through the tabs at the top. Through these views, the entire domain 115 and initiatives 125 hierarchies (FIG. 1) can be accessed. The Agencies 1501 are stored as domains in the T_OBJ_DOMAIN table 326, and the Operations 1502 are stored as initiatives in the T_OBJ_INITIATIVE table 327. These labels can have different names to address the type or function of the organization. Renaming the labels can be done by the administrator.

Figure 15C:
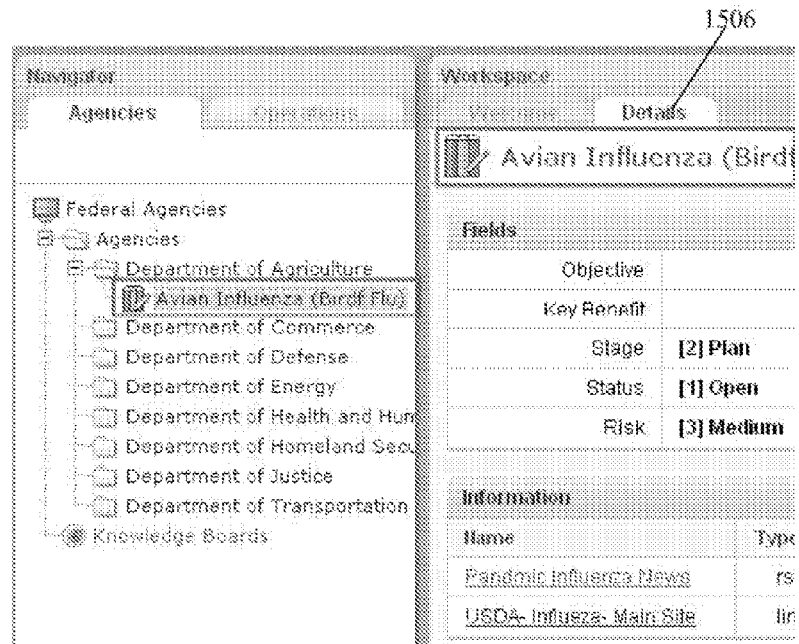

FIG. 15A shows an example agency view 1501 in the navigator 1302. The agencies represent the organizational structure of the groups coming together, whether they are multiple agencies 1503 or departments 1504 within an organization. These structural elements organize the available information and tools, while indicating who is responsible for creating and maintaining the resources gathered within their domain of responsibility. Here, Federal Agencies is the workspace. Under the Federal Agencies workspace are the agencies (domains) hierarchy. The agencies hierarchy includes sub-domains/sub-agencies, including the Department of Agriculture, Department of Commerce, etc. Under the Department of Agriculture sub-agency 1503 is the resource named Avian Influenza 1504. Selecting the resource 1504 displays the resource's objects in the workspace details view 506, as shown in FIG. 15C.

FIG. 15B shows an example operation view 1502 in the navigator 1302. The operations represent one or more process structures or how the groups or teams accomplish the goals of the workspace. The operations process structure enables users to bring together at each step the resources (tools and information) needed to accomplish that task. The resources 1505 are predefined structure modules created from resource templates. Each resource 1506 can contain fields for data entry, attached documents, and presentations, links to web sites and tools, discussion forums and more. The creation of a resource is described further below.

The resources can be renamed by an administrator to better represent their usage. They can be presented as many times as desired both the agency and operation hierarchies without duplication. This allows users to update and add information in a single place and instantly provide these upgrades to all users without replication. Here, Federal Agencies is the workspace. Under the Federal Agencies workspace are the operations (initiatives). The operation hierarchy 1505 includes sub-operations, including the Agriculture/Food Disasters, Chemical/HazMat Disasters, etc. Under the operations are the objects (hidden) associated with the operations. Selecting one of the objects displays the object's details in the workspace details view 1305. During the launching of the application, the navigator 1302 will be displayed and remain continuously on the screen.

3. Agency (Domain) Screens

Figure 16A:
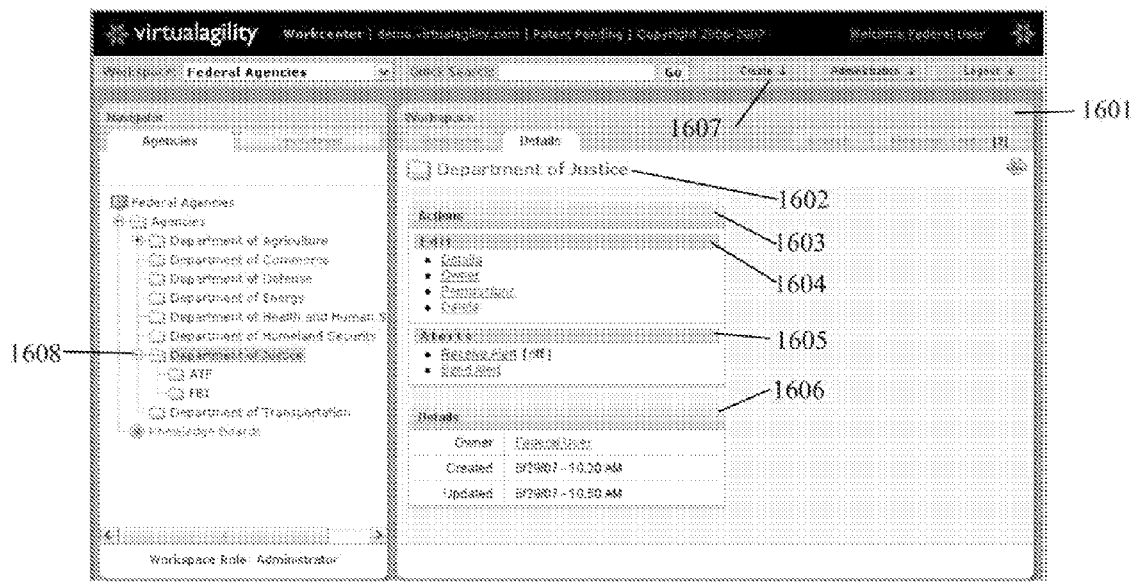
FIGS. 16A-16D show views of the agency information.

Selecting any of the agencies 1503 from the navigator 1302 will display the agency information within the workspace details view. FIGS. 16A-16D show views of the agency information. FIG. 16A shows the agency main screen. The agency main screen 1601 includes the name of the agency 1602, actions 1603, and details 1606. The actions 1603 include edit 1604 and alerts 1605.

Figure 16B:
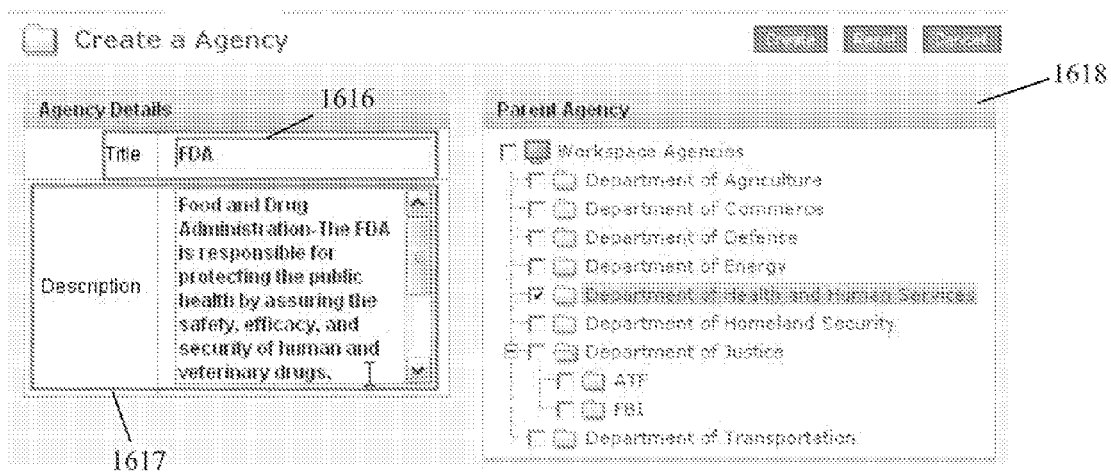

When a user selects the create button 1607 to create a new agency entry, or selects the New Agency option 1317 (FIG. 13) in the overview screen 1301, the screen illustrated in FIG. 16B is shown. The user sets the title 1616 of the agency and the description 1617 of the agency. Both are stored in the T_OBJ_DATA table 318, with the ID of the agency stored in the T_OBJ_DOMAIN table 326 referenced in the Parent_ID field in the T_OBJ_DATA table 318. (See FIG. 4C.) The placement in the parent/daughter domain hierarchy 1618 can also be set, with the parent domain stored in the Parent_ID field of the daughter domain record in the T_OBJ_DATA table 318. The daughter will carry the permissions setup of the parent.

Figure 16C:
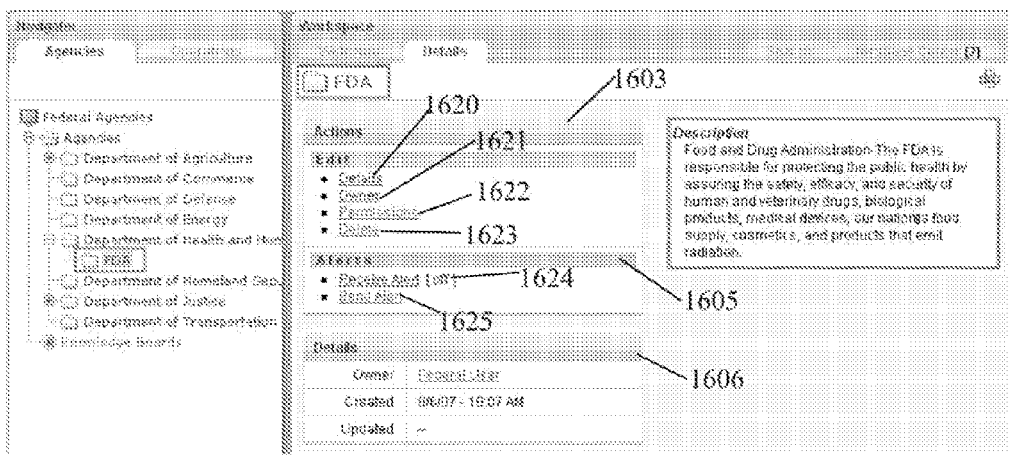
Figure 16D:
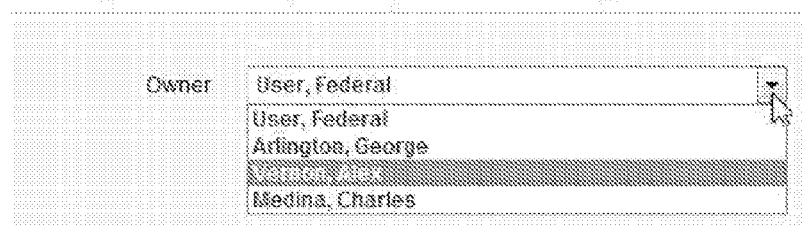

Once created, the new entry is displayed, as illustrated in FIG. 16C. Agency elements can be managed by selection any of the action options; details 1620, owner 1621, permissions 1622, and delete 1623. Selecting details 1620 will open a window similar to the create window shown in FIG. 16B and will allow users to change the title, description, or reposition the agency under another parent agency. Selecting owner 1621 will open a window illustrated in FIG. 16D, which will provide users the option to reassign the responsibility for the agency element to another user. The owner is stored in the Owner_ID field in the T_OBJ_DATA table 318. This feature provides accountability for maintenance of the system's elements because there must always be a user named as the primary owner for each object. Returning to FIG. 16C, selecting permissions 1622 provide users with the option to change the pre-assigned permissions that were granted during the creation of the parent agency. Users can add or remove groups or individual users, or change the permission level for viewer, user, manager, or administrator. These permissions are stored in the T_OBJ_DATA_PERM_GROUP table 320 and the T_OBJ_DATA_PERM_USER table 321. Selecting delete 1623 will archive the agency entry and remove it from view.

Every change to the agency will be marked as an update and will be displayed in the details window 1606.

Users can elect to be or not be alerted of any changes to agency elements by toggling the receive alert option 1624. When toggled "on", an alert entry will be generated within the message center. The message center is described later below. The receive alert option 1624 is transferred to all daughter domains. To send an alert to other users, the send alert option 1625 is selected. This will open a message window where groups and users are selected and a message to accompany the alert can be typed.

4. Resources

The resources are the main working elements of the application. They contain information, tools, links, and data. Resources are created from resource templates as set by the administrator and assigned to specified workspaces. How a resource template is built is described above in the administrative setup section. Each resource is "owned" by a specific user who is responsible for creating and maintaining the contents.

Figure 17A:
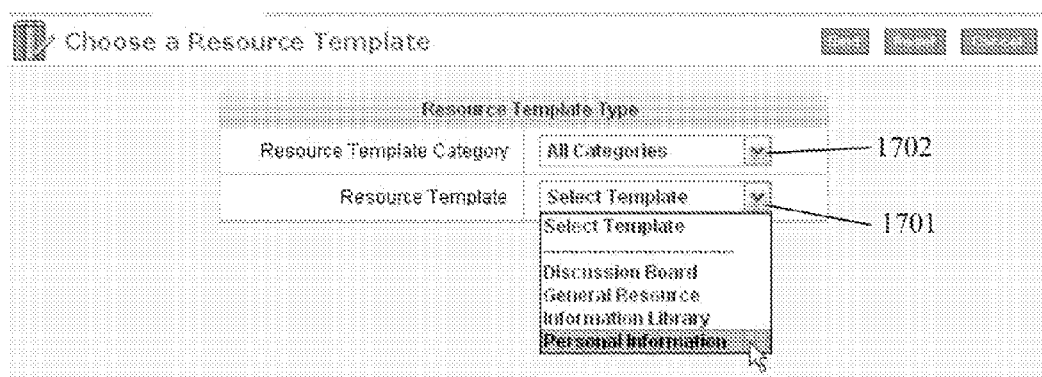
Figure 17B:
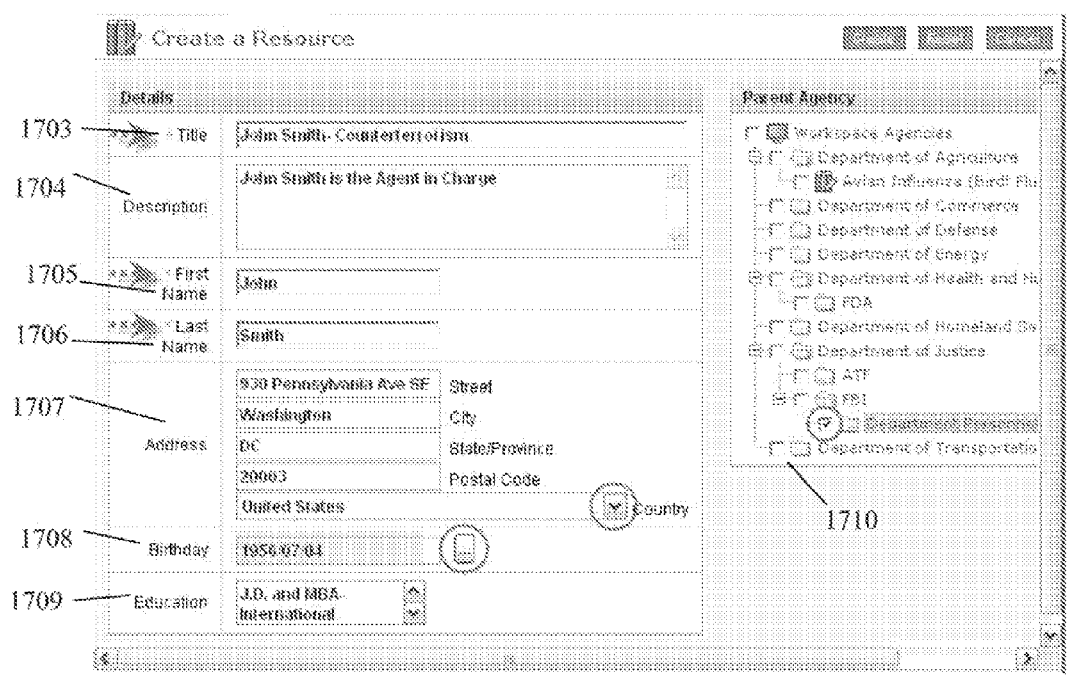
Figure 17C:
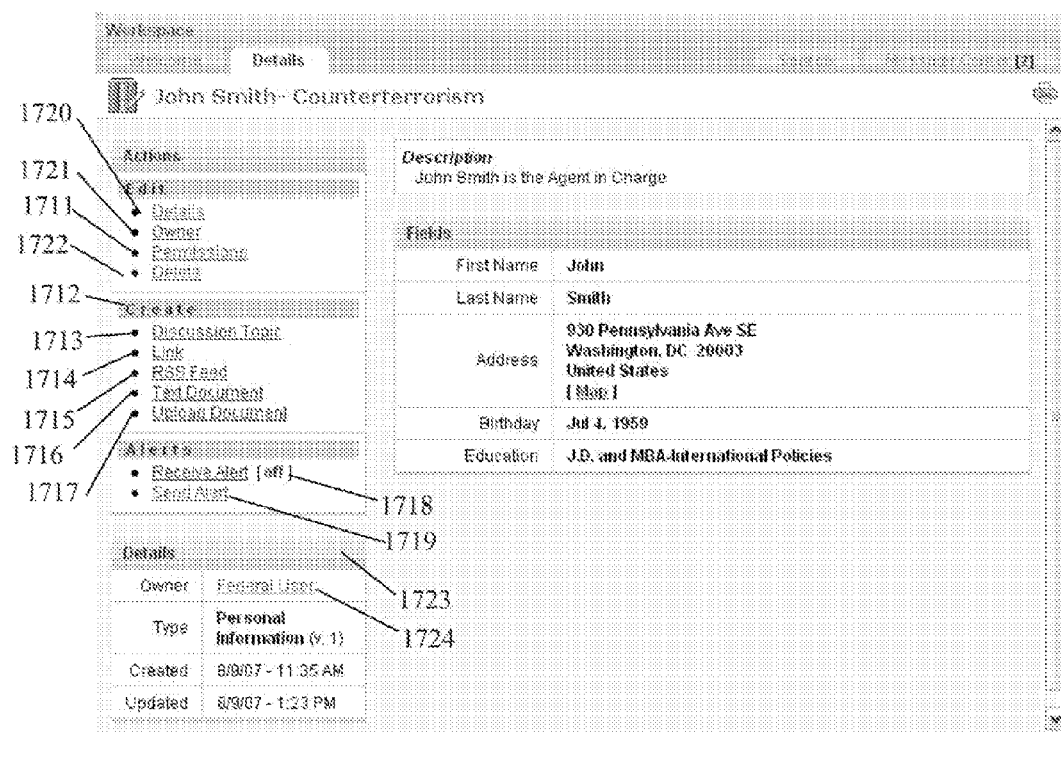

FIGS. 17A-17C show the creation of a resource. To create a resource, the New Resource option 1318 (FIG. 13) on the overview screen 1301 is selected, and a new resource creation dialog is shown to the user, as illustrated in FIG. 17A. The user selects a resource template 1701 to be used for building the resource. An administrator might have defined the template within a category 1702 to help reduce the number of templates presented to the users. The resource templates are stored in the T_RES_TMPLT table 335, and the resource template categories are stored in the T_RES_TMPLT_CATEGORY table 339. A resource template related to a template category through an entry in the T_RES_TMPLT_CATEGORY_MAP table 340.

Once the resource template is selected, a blank resource template screen is opened, as illustrated in FIG. 17B. The user enters the title 1703 and description 1704, as well as the name 1705-1706, address 1707, birthday 1708, and education 1709 of the owner of the resource. The user further sets the default placement of the resource in the navigator tree by selecting the parent resource 1710. These pieces of information are stored as records in the T_OBJ_DATA table 318. A completed resource view is shown in FIG. 17C.

Access to the resource is based on permissions. The permissions are automatically set when a resource is created and, during the creation process only, are inherited from the original parent domain/agency or resource in which it is created. At any time, users can confirm the permissions set up or make changes to users and groups by selecting the permissions option 1711. These permissions are stored in the T_OBJ_DATA_PERM_GROUP table 320 and the T_OBJ_DATA_PERM_USER table 321 and were set by the system administrator.

Once a resource is created, content can be added to the resource through the create options 1712. The create options include discussion topic 1713, link 1714, RSS feed 1715, text document 1716, and upload document 1717. These options are optional and are selected to be included with the resource template by the system administrator.

a. Discussion Topics

FIGS. 18A-18D show the set up of discussion topics for a resource. Discussions are asynchronous chat boards that provide users with a place to exchange questions, opinions, and remarks in relation to the resource topic. Being asynchronous, it provides the ability to exchange information even when members are offline.

Figure 18A:
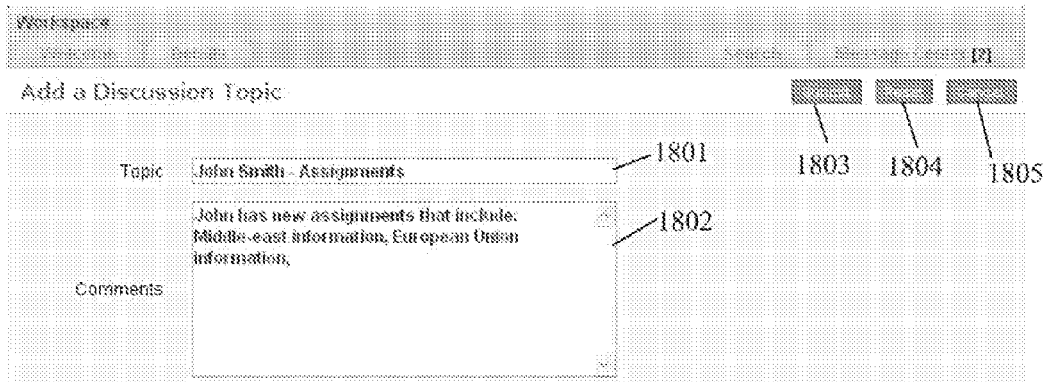
FIGS. 18A-18D show the set up of discussion topics for a resource.

By selecting the discussion topic option 1713 (FIG. 17C), an add a discussion topic dialog is opened, as illustrated in FIG. 18A. The user enters a topic name 1801 and enters text into the comments field 1802. The user selects the submit button 1803 to upload the discussion, the reset button 1804 to start over, and the cancel button 1805 to close and return to the previous screen. Once submitted, the discussion topic is stored in the T_DISCUSSION_TOPIC table 307 and linked to the resource by storing the resource's ID in the Resource_ID field.

Figure 18B:
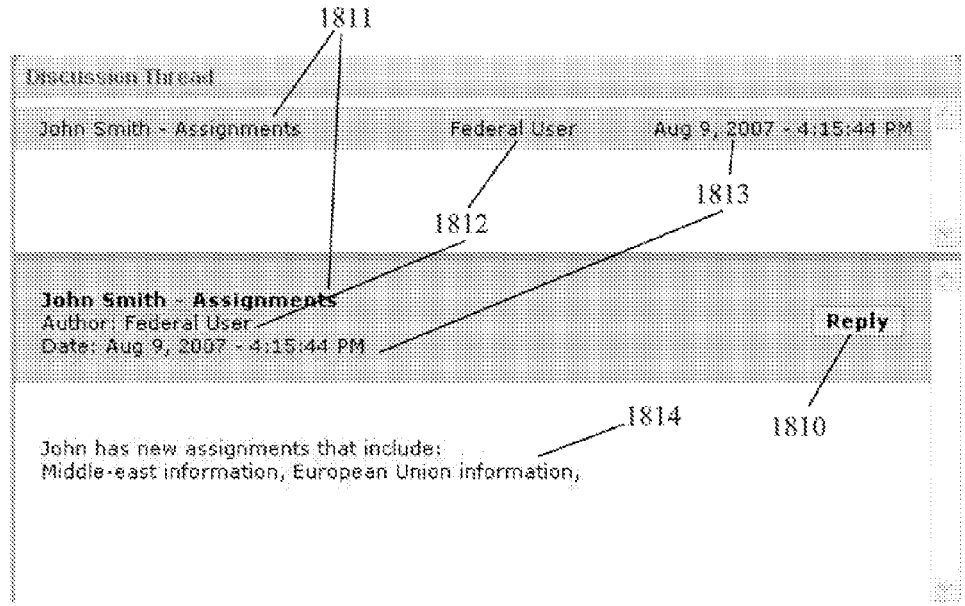
Figure 18C:
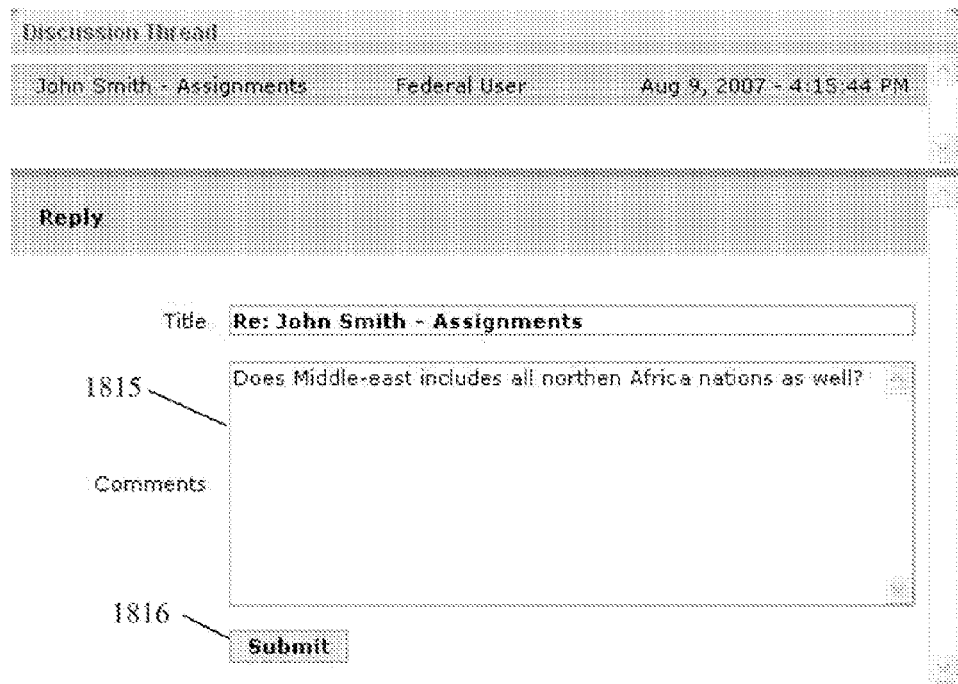

FIG. 18B shows an example discussion topic new. The view includes the topic name 1811, the author 1812, the date and time of the posting 1814. A user with the proper permissions can read the topic and reply by selecting the reply button 1810. A reply dialog is then displayed, as illustrated in FIG. 18C, in which the user can type his reply in the comments field 1815. When the submit button 1816 is selected, the reply is stored in the T_DISCUSSION_REPLY table 308.

Figure 18D:
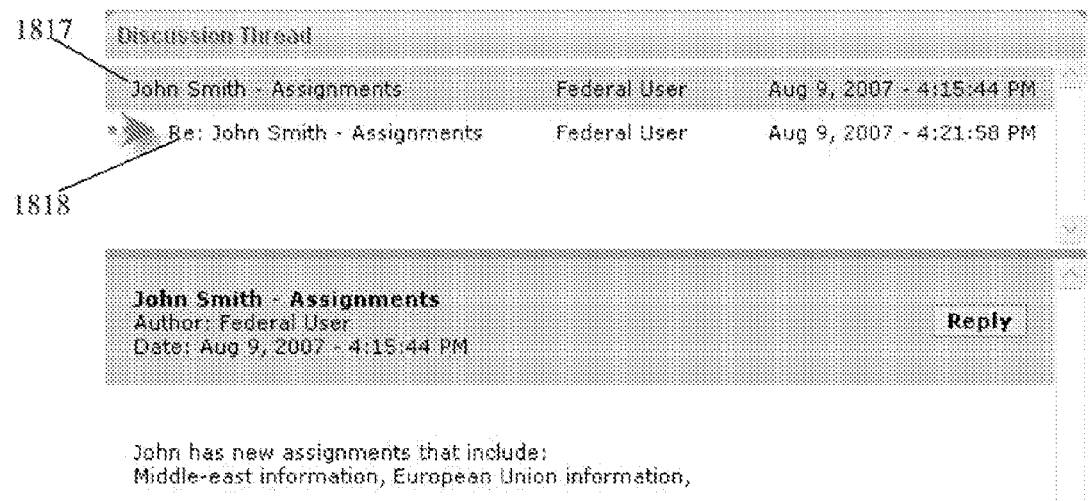

The discussion topic is then shown with the original discussion 1817 and its replies 1818, as illustrated in FIG. 18D. Discussions are organized as threaded discussions, and the replies are indented to present a visual hierarchy of replies.

b. Links

FIGS. 19A-19I show the set up of links for a resource. Links provides quick access to information or tools through providing a network path, like a URL (Uniform Resource Locator). Other types of links can point to or documents on a shared file server. Links are also provided for connecting various resources or knowledge boards within the application so people can access them within the resource topic they are currently utilizing.

Figures 19A, 19B:

To create a link, the link option 1714 (FIG. 17C) is selected. An add a link dialog is displayed, as illustrated in FIG. 19A. The user enters a title 1901 and a description 1902 of the link. The link type 1903 of either external or internal is selected. External link type is for links to external web sites or other systems. Internal link type is for links to resources or knowledge boards within the application. The URL for the link 1904 is entered. The user selects the submit button 1905 to upload the link, the reset button 1906 to start over, and the cancel button 1907 to close and return to the previous screen. Once submitted, the link is stored in the T_OBJ_RESOURCE_INFORMATION table 330 and the T_OBJ_RESOURCE_LINK table 332. The link is then shown in the resource workspace, as shown in FIG. 19B, which includes the title 1950, type 1951, version 1952, date updated 1953, and a details option 1954.

Figures 19C, 19D:
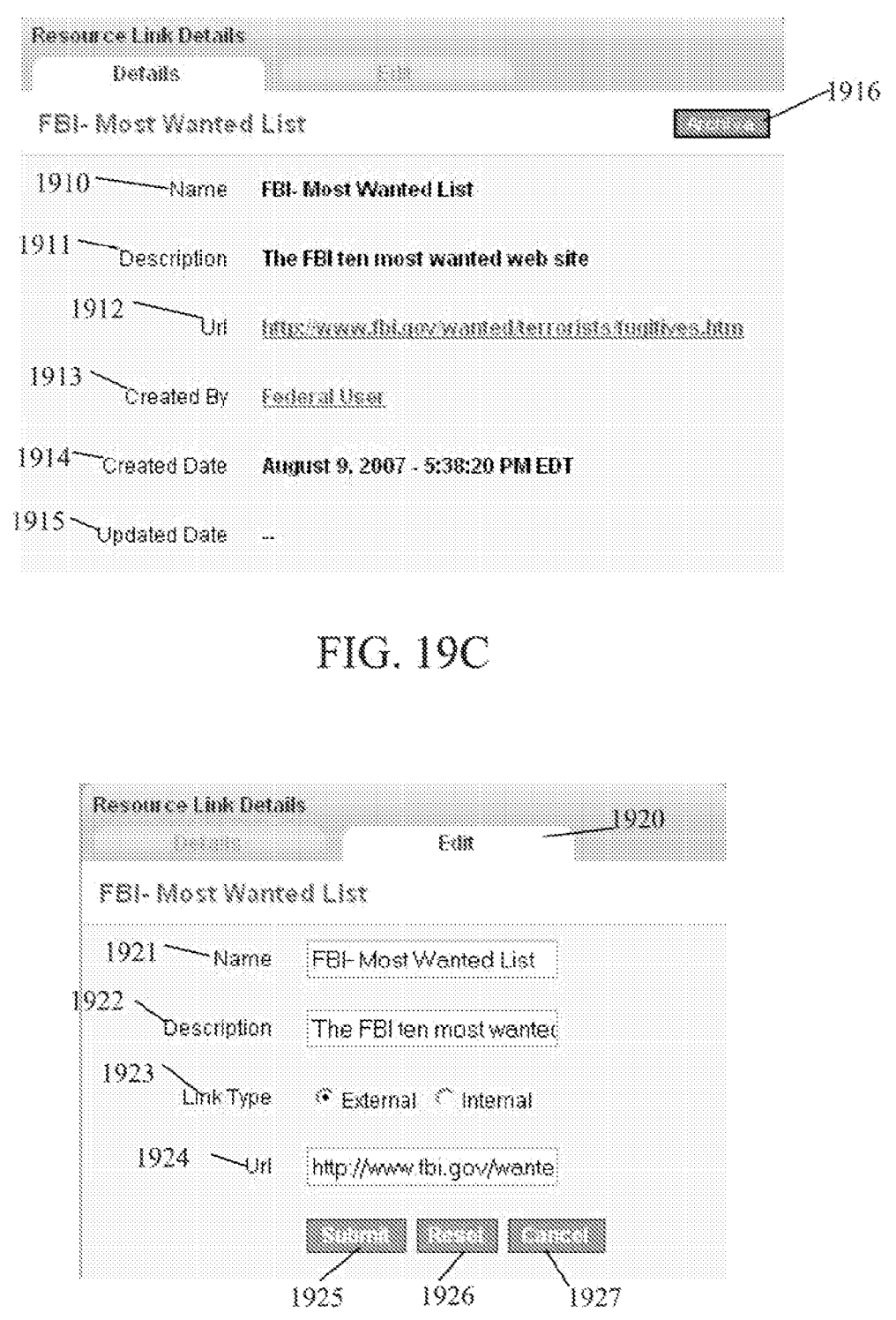

Selection of the title 1950 opens a new window in the web browser to display the contents of the listed URL file or tools, or to launch the appropriate software application. To view details of the link, the details option 1954 is selected, and a link details dialog is displayed, as illustrated in FIG. 19C. The dialog displays the title 1910, description 1911, URL 1912, name of the creator 1913, date created 1914, and date updated 1915. To archive the link and remove it from view, the archive button 1916 is selected.

To change any of the link parameters, the edit tab 1920 is selected, as illustrated in FIG. 19D. The user can modify or update a name 1921, description 1922, link type 1923, and/or URL 1924. The user selects the submit button 1925 to upload the changes, the reset button 1926 to start over, and the cancel button 1927 to close and return to the previous screen.

Figure 19E:
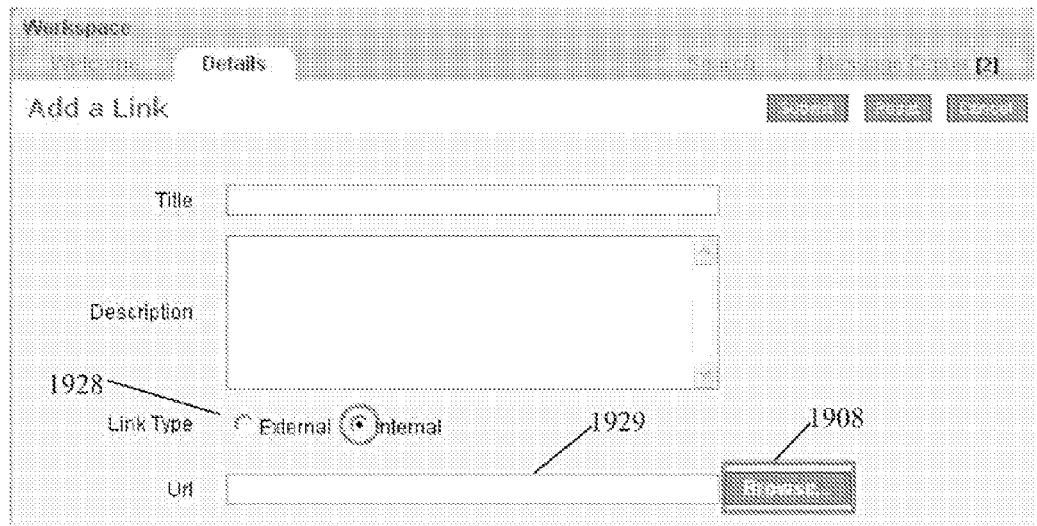
Figure 19F:
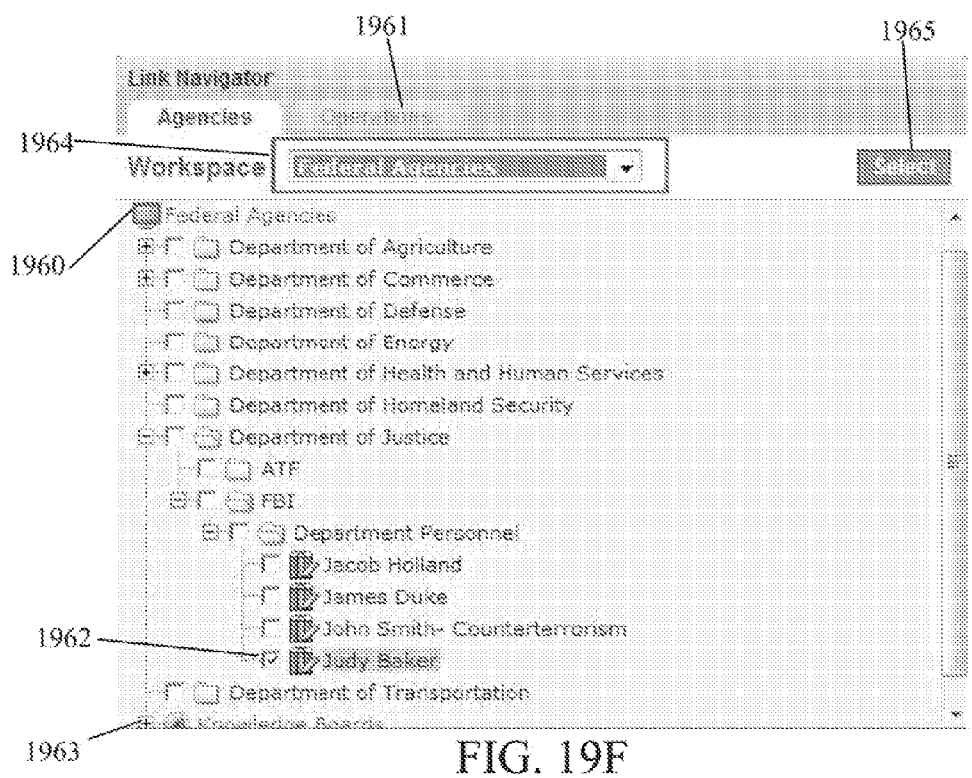

Some resource topics can benefit from an internal link connecting to another element in the workspace. A user with permission to access multiple workspaces can also link the resources across workspaces. FIG. 19E shows the creation of an internal link. The internal link provides a link internally to another agency, resource, operation or knowledge board. On the link dialog, the internal link option 1928 is selected. The browse button 1908 is selected to display, as illustrated in FIG. 19F, a list of agencies 1960, operations 1961 (hidden), resources 1962, and knowledge boards 1963, under various workspaces 1964. One of these objects is selected by selecting the select button 1965. A link to the object is automatically entered in the field 1929 in FIG. 19E. Once the internal link is uploaded, it is displayed in the resource workspace, as shown in FIG. 19G, including the title 1970, type 1971, version 1972, date updated 1973, and a details option 1974.

Selection of the details option 1974 displays the link details in a new window, as illustrated in FIG. 19H. The internal link details presents all the information related to the link, including name 1930, description 1931, link 1932, name of the creator 1933, date created 1934, and date updated 1935. To archive the link and remove it from view, the archive button 1936 is selected.

Figures 19I, 20A:
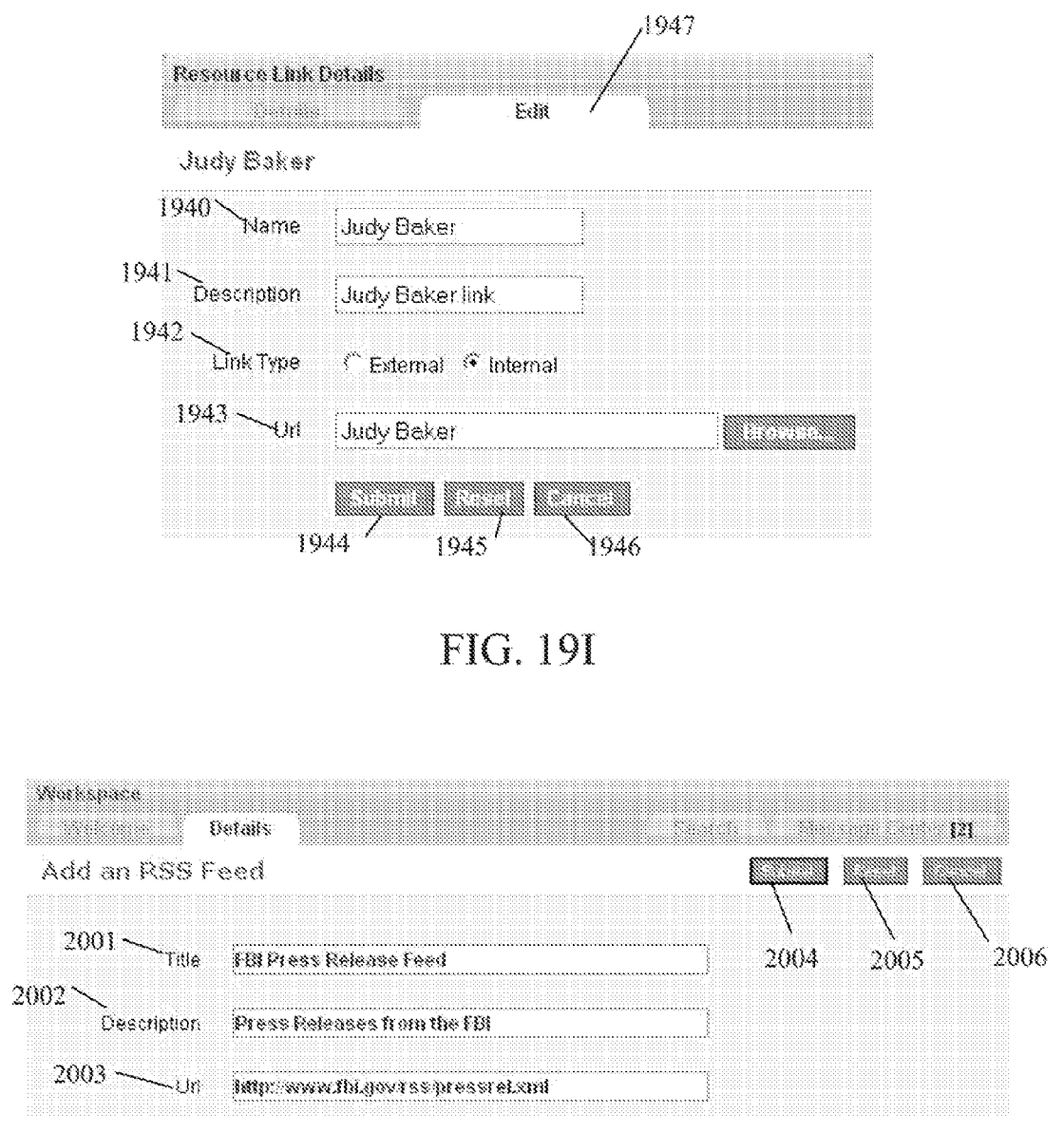

To change any of the link parameters, the edit tab 1947 is selected, as illustrated in FIG. 19I. The user can modify or update a name 1940, description 1941, link type 1942, and/or URL 1943. The user selects the submit button 1944 to upload the changes, the reset button 1945 to start over, and the cancel button 1946 to close and return to the previous screen.

c. RSS Feeds

Some resources can benefit from regular and automatic information updates provided through RSS feeds. An RSS feed is a web feed format used to publish frequently updated content from Internet websites. RSS content is read in a special web browser window called an RSS reader. To link to an RSS feed, the user needs to define the link/address of the feed. Many news providers provide RSS feed links on their web sites.

Figure 20D:

FIGS. 20A-20F show the set up of RSS feeds for a resource. The user first locates a site providing the RSS feed and captures the URL. To add an RSS feed to the workspace, the RSS Feed option 1715 (FIG. 17C) is selected. An add a RSS feed dialog is displayed, as illustrated in FIG. 20A. The user enters a title 2001, a description 2002 of the RSS feed, and the URL 2003 for the RSS feed. The user selects the submit button 2004 to upload the RSS feed, the reset button 2005 to start over, and the cancel button 2006 to close and return to the previous screen. Once submitted, the RSS feed is stored in the T_OBJ_RESOURCE_INFORMATION table 330 and the T_OBJ_RESOURCE_RSS table 333. The RSS feed is then shown in the resource workspace as shown in FIG. 20B, including the title 2030, type 2031, version 2032, dale updated 2033, and a details option 2034.

Selection of the RSS feed title 2030 launches the web site with a full article, as illustrated in FIG. 20C. The user can choose to view the details of the RSS feed by selecting the details option 2024, as illustrated in FIG. 20D. The RSS feed details presents the information related to the RSS feed, including the name 2010, description 2011, URL 2012, name of the creator 2013, date created 2014, and date updated 2015. To archive the RSS feed and remove it from view, the archive button 2016 is selected.

Figure 20E:
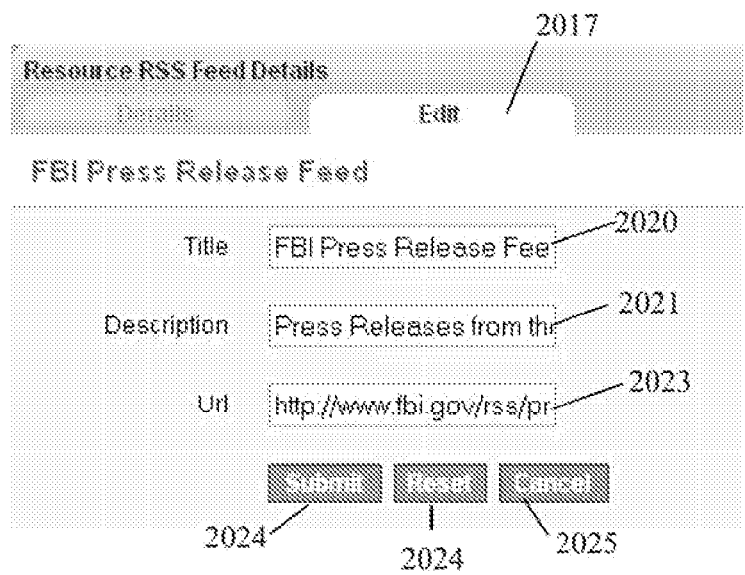

To change any of the RSS feed parameters, the edit tab 2017 is selected, as illustrated in FIG. 20E. The user can modify or update a name 2020, description 2021, and/or URL 2022. The user selects the submit button 2023 to upload the changes, the reset button 2024 to start over, and the cancel button 2025 to close and return to the previous screen.

d. Text Files

The option to create a text file provides users with the ability to create text and add a ".txt" file to the system without using a work processing program. A text file (.txt) can be opened with a standard text editor program provided by all computers. This is a simple and easy way to create and share written documents with other users. It is also an easy way to share and preserve emails by simply copying the email, paste it into an open text document, and storing it in a resource. The email information thereby becomes part of the resource and can be shared.

Figures 21A, 21B:
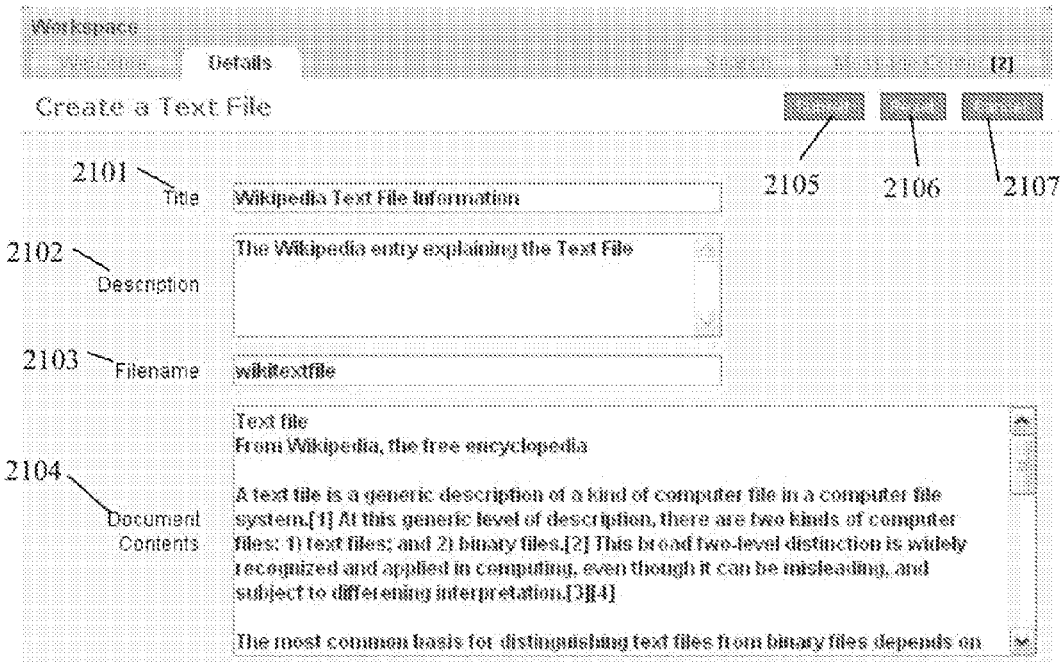
FIGS. 21A-21F show the set up of text documents for a workspace.

FIGS. 21A-21F show the set up of text files for a workspace. To add a text file, the Text Document option 1716 (FIG. 17C) is selected. A create a text file dialog is displayed, as illustrated in FIG. 21A. The user enters a title 2101, a description 2102 of the text file, a file name 2103, and the document contents 2104. The user selects the submit button 2105 to create and save the text file, the reset button 2106 to start over, and the cancel button 2107 to close and return to the previous screen. Once submitted, the text file is stored in the T_OBJ_RESOURCE_INFORMATION table 330 and the T_OBJ_RESOURCE_DOCUMENT table 331. The text file is then shown in the resource workspace as shown in FIG. 21B, including the title 2140, type 2141, version 2142, date updated 2143, and a details option 2144.

Figures 21C, 21D:
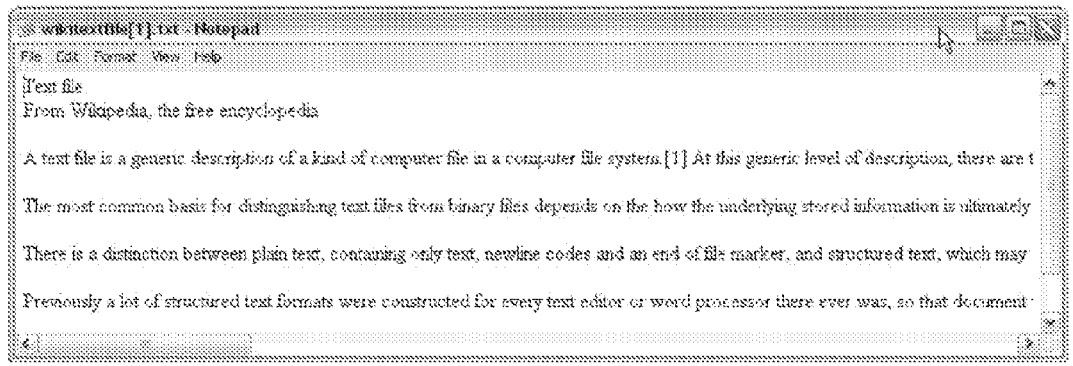

Selection of the text file title 2140 displays the text content in a text editor program, as illustrated in FIG. 21C, where it can be viewed, edited or save to the user's computer under a different file name. The save allows users to add the file to their local computer for future use, re-naming it as necessary.

The user can choose to view details of the information on the text file by selecting the details option 2144, as illustrated in FIG. 21D. The text file details include the file name 2110, description 2111, latest version 2112, file size 2113, name of the creator 2114, date created 2115, whether the file is compressed 2116, whether the file is encrypted 2117, the MD5 checksum 2118 for the file, and the mime type 2119. To archive the text file and remove it from view, the archive button 2120 is selected.

Figures 21E, 21F:
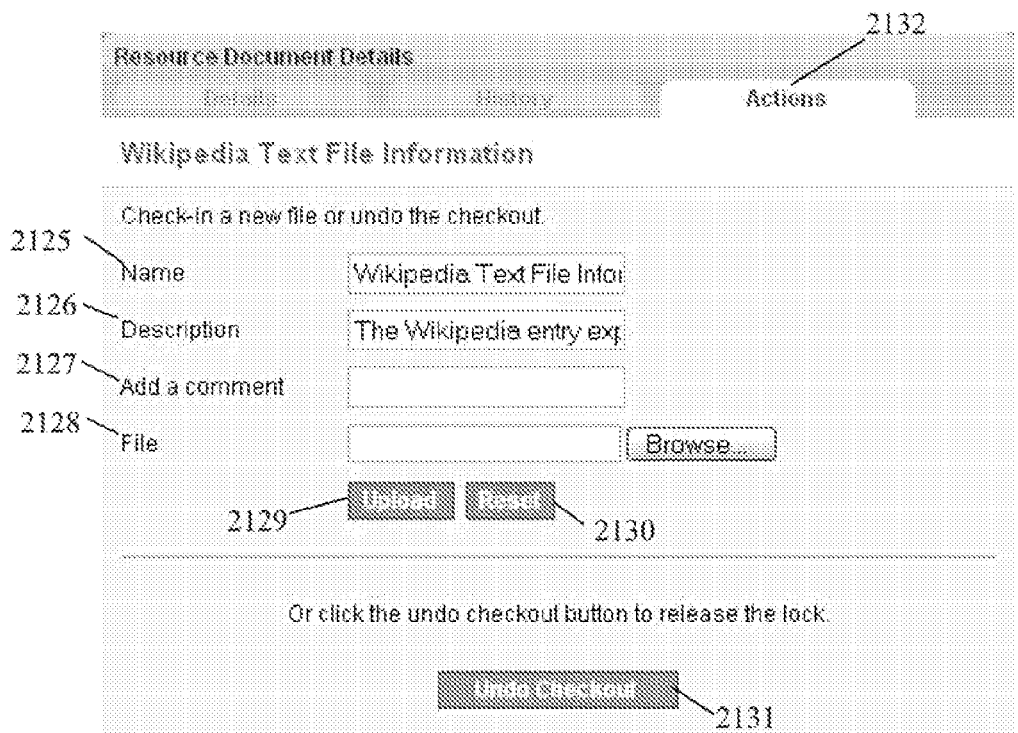

To change any of the text file parameters, the actions tab 2132 is selected, as illustrated in FIG. 21E. The user can modify or update a name 2125 and/or description 2126. The user can add a comment 2127 and/or upload a new version of the file 2128. The user selects the upload button 2129 to upload the changes or the reset button 2130 to start over. In order to upload a new version of the text file, the user must first check the file out of the repository. If no changes were made and the user elects to permit the use of the currently loaded text file, the user selects the undo checkout button 2131.

To view the history of the file and changes made to it, the user selects the history tab 2133, as illustrated in FIG. 21F.

e. Documents

The system enables the loading and storing of document files in any format, such as Microsoft Word™, Excel™, PowerPoint™ files and most other multimedia formats (sound, pictures, graphics, text). For the purpose of simplicity, these file formats are referred to herein as "documents". To share documents with other users will require those users to have the appropriate-software application on their computer to launch and open the specific file format.

The adding of a document here differs from the adding of a text file above in that the documents are not in a *.txt format. The documents also exist locally to a user prior to being added to the workspace.

FIGS. 22A-22F show the adding of a document to the workspace. To upload a document, the Upload Document option 1717 is selected (FIG. 17C). An add a document dialog is displayed, as illustrated in FIG. 22A. The user enters a title 2201, a description 2202, and the file to upload 2203. The user selects the submit button 2204 to upload the document, the reset button 2205 to start over, and the cancel button 2206 to close and return to the previous screen. Once submitted, the document is stored in the T_OBJ_RESOURCE_INFORMATION table 330 and the T_OBJ_RESOURCE_DOCUMENT table 331. The document is then shown in the resource workspace as shown in FIG. 22B, including the name 2250, type 2251, version 2252, dale updated 2253, and a details option 2254.

Selection of the document name 2250 launches the application with which the document is associated and displays the document contents in the application. The user can choose to view details of the document by selecting the details option 2254, as illustrated in FIG. 22C. The document details include the file name 2210, description 2211, latest version 2212, file size 2213, name of the creator 2214, date created 2215, whether the document is compressed 2216, whether the document is encrypted 2217, the MD5 checksum 2218 for the document, and the mime type 2219. To archive the text document and remove it from view, the archive button 2220 is selected.

To change any of the document parameters, the action tab 2221 is selected, as illustrated in FIG. 22D. The user can modify or update a name 2225 and/or description 2226. The user can add a comment 2227 and/or select a new version of the document to upload 2228. The user selects the upload button 2229 to upload the changes or the reset button 2230 to start over. In order to upload a new version of the document, the user must first check the document out of the repository, as shown in FIG. 22E. If no changes were made and the user elects to permit the use of the currently loaded document, the user selects the undo checkout button 2231 (FIG. 22D).

To view the history of the file and changes made to it, the user selects the history table 222, as illustrated in FIG. 22F.

f. Updating a Resource

FIGS. 22G-22I show the updating of a resource. A resource can be updated by selecting the details option 1720 (FIG. 17C). An update a resource dialog is displayed, as illustrated in FIG. 22G. The user can modify or update the title 2231, description 2232, owner's name 2233, address 2234, birthday 2235, education 2236, assignment 2237, and/or the parent agency 2238. The user selects the update button 2239 to submit the changes, the reset button 2240 to start over, or the cancel button 2241 to terminate the operation and return to the previous screen. Discussions, links, RSS feeds, text documents, and/or loaded documents are not affected and will not be changed, moved, or deleted.

The owner is the original creator of a resource. When there is a need to assign a resource to a different owner due to personnel changes, new responsibilities, or any other reason, a user can select the owner option 1721 (FIG. 17C). A change ownership dialog is displayed, as illustrated in FIG. 22H. A new owner can then be selected from the pull down menu.

A resource can be deleted by selecting the delete option 1722 (FIG. 17C). A delete confirmation dialog is displayed, as illustrated in FIG. 22I. The user selects the confirm button 2242 to complete the process and the cancel button 2243 to terminate and return to the previous screen. Deleted resources are removed from the users' view and archived in the system archive storage. No information is permanently deleted. Administrators can un-archive "deleted" resources as required.

g. Alerts

Users can receive an alert message for any change made to each resource listed. FIG. 23A shows the set up of alerts for a workspace. When the user selects the Receive Alert option 1718 (FIG. 17C), an alert entry is generated within the message center. The message center is described further below. Selection of the Receive Alert option 1718 toggles the option on and off. To send an alert to other users, the Send Alert option 1719 is selected. This will open a message window, as illustrated in FIG. 23A, where groups or users are selected and a message to accompany the alert can be typed. The alerts and the users to which the alerts are sent are stored in the T_OBJ_DATA_ALERT_USER table 319.

h. Resource Details

The resource details 1723 (FIG. 17C) provide users with information on the owner who originally created the resource, or the owner who has the resource re-assigned to them. Users can communicate with the owner of the resource by selecting the owner's highlighted name 1724. A new message dialog will then open, as described further below in the context of the message center. The resource details further display the name of the resource template and the version used to create the resource, the date the resource was created, and the last modified date.

i. Importing Resources

The system allows users to import information from an application, such as an Excel worksheet, and automatically create multiple resources. These resources will be created within a selected organization/domain and will automatically be assigned the permission of the parent organization in which they are created.

Users can import any Excel file that contains information organized in columns and rows where the first row defines the field names and the following rows are the records of information. Each row will be imported as a single resource. The system attempts to match column names with the resource template fields. Users can manually match columns and fields as well.

The administrators who create the resource templates have the option to export an Excel file that exactly matches the fields and columns and provide it to users as a guide. This Excel template will guide users to create a data source that can be easily and directly imported into specific resources in the system. An Excel file exported directly from the resource template will have the fields of the template already posted in the first row and represent all the fields as columns. Users will fill out the Excel file with the required information in a formal organized as rows of data for each resource. This will simplify the import of data from an Excel file to a resource.

FIGS. 23B-23C show the importing of resources for a workspace. To import an Excel sheet, the user selects the Import Resources option (not shown) from the create pull down menu 1314 (FIG. 13). An import resources dialog is displayed, as illustrated in FIG. 23B. The user selects the resource template 2301 that the user wants to use as the format for the imported data, the source data file 2302 to import, and the parent domain 2303 where the new resource will reside, line user selects the continue button 2304 to import the resource, the reset button 2305 to start over, and the cancel button 2306 to terminate and return to the previous screen.

When importing, the system attempts to match the field names in the resource template with the column headers, and displays the matched fields as shown in FIG. 23C. If the system cannot match fields, it will leave those fields blank. The user can manually select the column headers and match them to the selected fields, as shown in FIG. 23I). Once the matching process is completed, the data is imported and the new resource is created.

5. Knowledge Boards

Knowledge boards enable users to create a report based on the information fields contained resource templates, and hence in the resources. Users can customize this to display specific selected columns and filter information according to specific keywords or values. The resulting display in a table in the format of columns (fields) and rows (resources) which dynamically displays a real-time data from across the workspace.

Figure 24B:
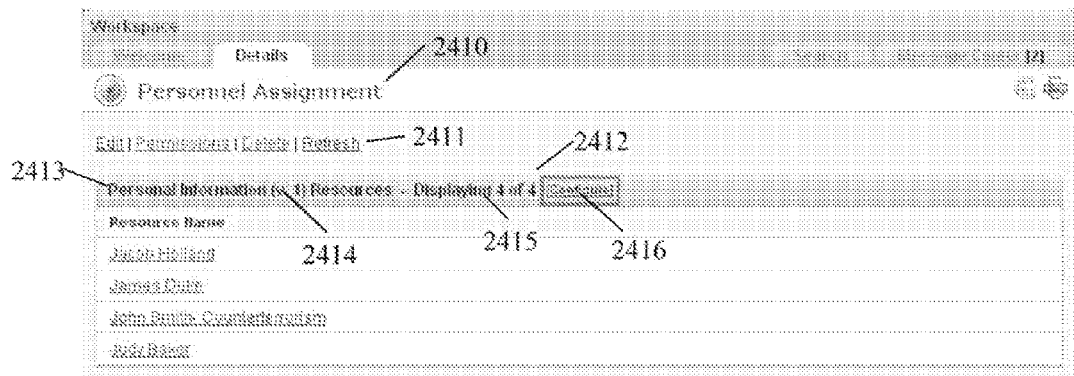

FIGS. 24A-24E show the set up of knowledge boards. When the user selects the knowledge board option (hidden) under the create button 1314 (FIG. 13), a knowledge board dialog is displayed, as shown in FIG. 24A. The user can enter a title 2401, description 2402, and which resource templates 2403 to include in the knowledge board. The user selects the create button 2404 to create the knowledge board, the reset button 2405 to start over, and the cancel button 2406 to close and return to the previous screen. Once created, a new knowledge board entry 1315 (FIG. 13) will be added to the navigator screen 1301. The knowledge board is stored in the T_OBJ_DASHBOARD 322, T_OBJ_DASHBOARD_RES_TMPLT 323, T_OBJ_DASHBOARD_FIELD_DEFAULT 324, and T_OBJ_DASHBOARD_FIELD_TMPLT 325 tables.

When the knowledge board is selected, a knowledge board window is displayed, as shown in FIG. 24B, which includes the title 2410 of the knowledge board, editing buttons 2411, and the selected resource display screen 2412. The title bar of the resource display screen includes the resource template name 2413, version number 2414, and total number of resources 2415 the user has permission to view. This information on the resources and the resource templates are stored in the T_OBJ_RESOURCE 329 and T_RES_TMPLT 335 tables. The link of a resource to a resource template is stored in the Resource_Kit_ID field in the entries of the T_OBJ_RESOURCE table 329. Once filtering is added, the numbers will show the number of resources displayed out of the total available resources.

Figure 24C:
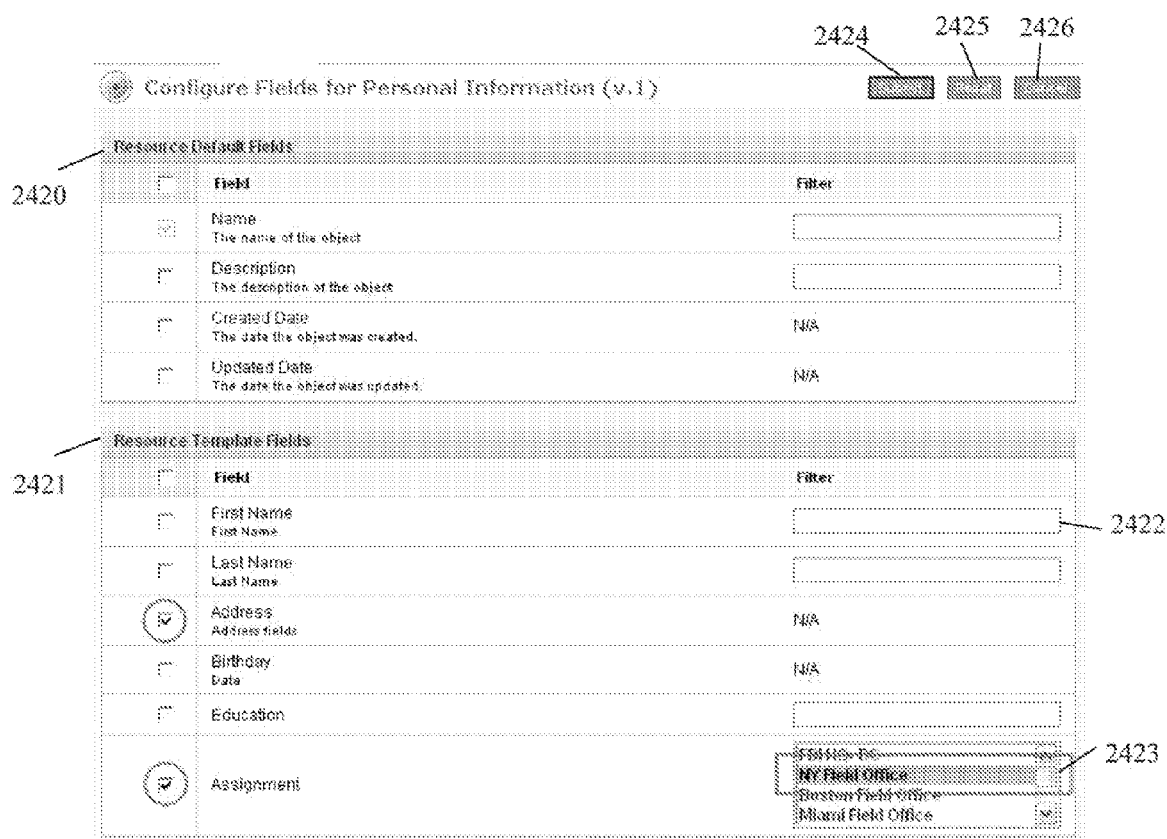

To customize the report, the configure button 2416 is selected, and a configure dialog is displayed, as shown in FIG. 24C. The configure dialog is divided into two parts. The first part 2420 contains the resource default fields, and the second part 2421 contains the resource template fields. Customization of the selected fields to be displayed as columns is completed by a check mark. The title name of the resource is displayed by default. Checking the top box in each group will select/deselect all fields in the list. To filter each field by a specific keyword, the word is typed into the field 2422 on the right or selected from a list 2423. The user selects the submit button 2424 to upload the updated knowledge board, the reset button 2415 to start over, and the cancel button 2426 to close and return to the previous screen. Here, the Name field in the resources, and the Address and Assignment fields in the resource templates, are selected to be in the report, with the Assignment field filtered to show only those in the NY Field office.

Figure 24D:
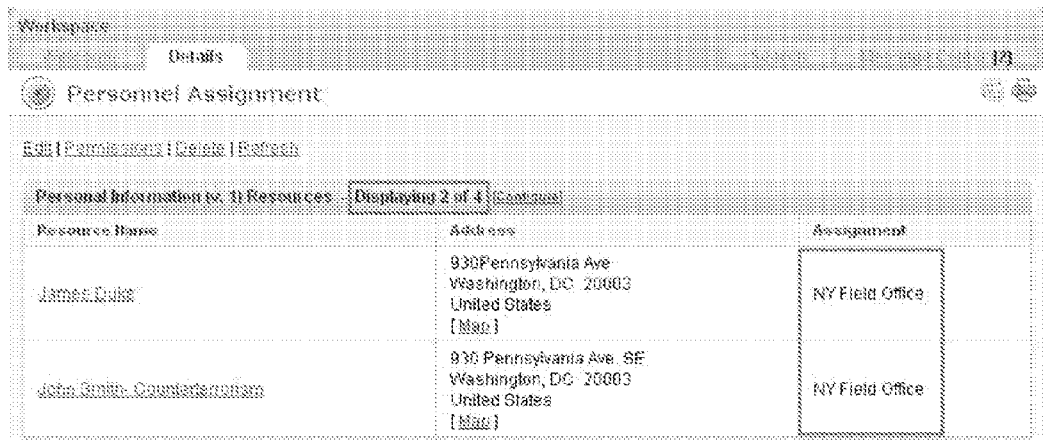
Figure 24E:
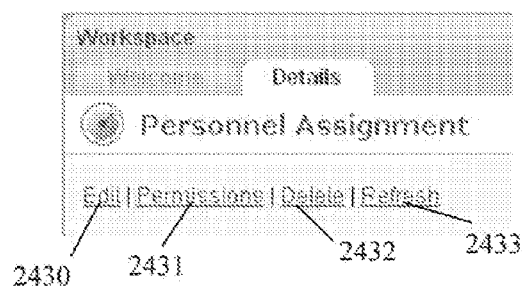

Once submitted, the knowledge board with the newly added fields is displayed, as shown in FIG. 24D, according to the configured filter. The knowledge board shows the resource's name, address, and assignment fields for assignments in the NY field office. As illustrated in FIG. 24E, the knowledge board can be managed by selecting the edit option 2430, the permissions option 2431, the delete option 2432, or the refresh option 2433. Selecting the edit option 2430 reopens the create dialog (FIG. 24A) and allows the user to modify the title 2401, description 2402, and select/deselect/add resources 2403. Selecting the permissions option 2431 allows the user to share the knowledge board with other groups and/or individual users. Selecting the delete option 2432 removes the knowledge board from view and archives it in storage. The knowledge board is automatically refreshed every time it is opened. Some changes may happen while the knowledge board is displayed. To ensure the data is fully updated, the user can select the refresh button 2433 at any time while viewing it. The knowledge board report can be exported to an Excel spreadsheet. Change to data in this Excel export document will not affect, change, or update data stored in the system.

6. Operations (Initiatives)

The operations process structure enables users to bring to others at each step in the process those resources (tools and information) needed to accomplish that task. In the operations view, users can build the various structures that will provide the framework for working with the information and tools stored in the system. The operations structure enables the use of resources (shared from the agencies that created and maintained them) within one or multiple procedures to accomplish a task.

The operations structure might be a timeline listing hours or days with the information presented in steps, reports and requests for assistance. Or, additional "views" might be step-by-step plans for responding to different types of emergencies, Concept of Operations plans, a National or Regional Response Plan, a mutual aid procedure, or any other formats that may be relevant to operations of this organization or group of organizations.

The main benefit of the operations view is that the information created and maintained in the agencies view can be shared with one or multiple operations and re-used as many times as required (different operational plans) without the need to duplicate the information and struggle to keep it current. Operations enable multiple viewing, usage and organization of the same data/information by different users for different activities.

With resources and knowledge board reports being shared in the operations view, any changes, updates or additions will be immediately distributed and shared within all the processes and windows where these resources are being used, thereby eliminating the need to alert users via telecommunication or electronic mail.

Figure 25A:
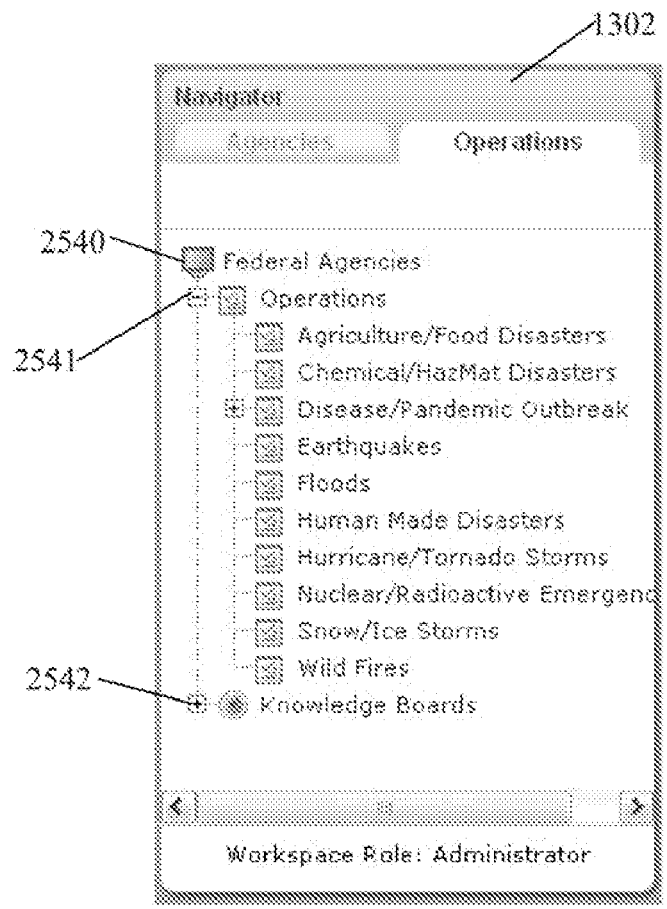
Figure 25B:

FIGS. 25A-25F show the set up of an operation. The operations structure is displayed in the navigator 1302 (FIG. 13) as shown in FIG. 25A. Federal Agencies 2540 is the workspace. Under the workspace is the operation hierarchy 2541. Also part of the workspace, but not in the operation hierarchy, are the knowledge boards 2542. To create a new operation entry, the user selects the New Operation option 1316 in the Actions section 1306a of the overview screen 1301 (FIG. 13). A create an operation dialog is displayed, as shown in FIG. 25B. The user enters the title of the operation entry 2501 and a description 2502, which are stored in the T_OBJ_DATA table 318 and the T_OBJ_INITIATIVE table 327.

Figure 25C:
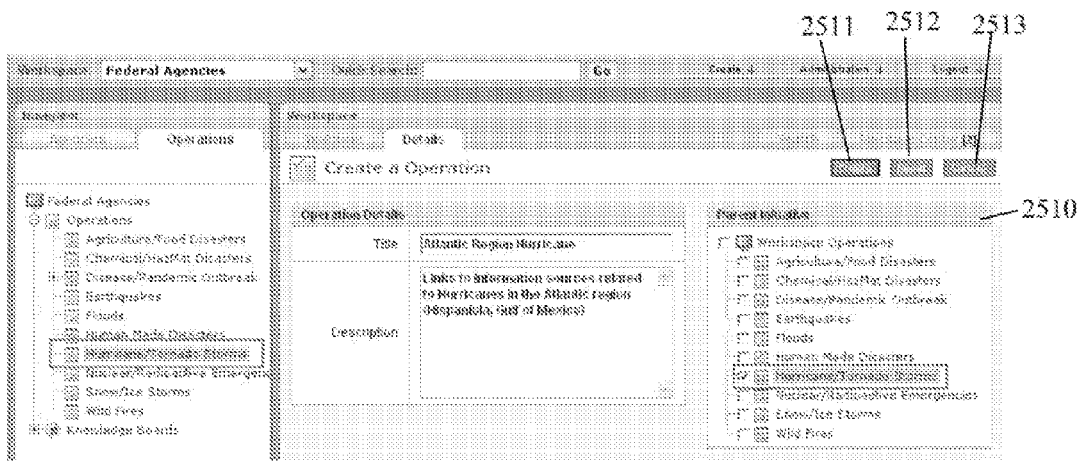

When creating a new operation entry, the system will automatically set the default placement in a parent/daughter hierarchy, as shown in FIG. 25C. The system displays the structure of the navigator's operation layout and places the new entry as a daughter to the operation where the user is when selecting the create option. At any time, the user can elect to reposition the new entry by selecting any of the check boxes 2510. The new sub-element (daughter) will carry the permissions set up of the parent.

Once the user completes the entry of the title and description of the parent, the may choose the create button 2511 to finish and create the new entry, the reset button 2512 to clean the fields and start again, or the cancel button 2513 to terminate the operation and return to the previous screen.

Figure 25D:
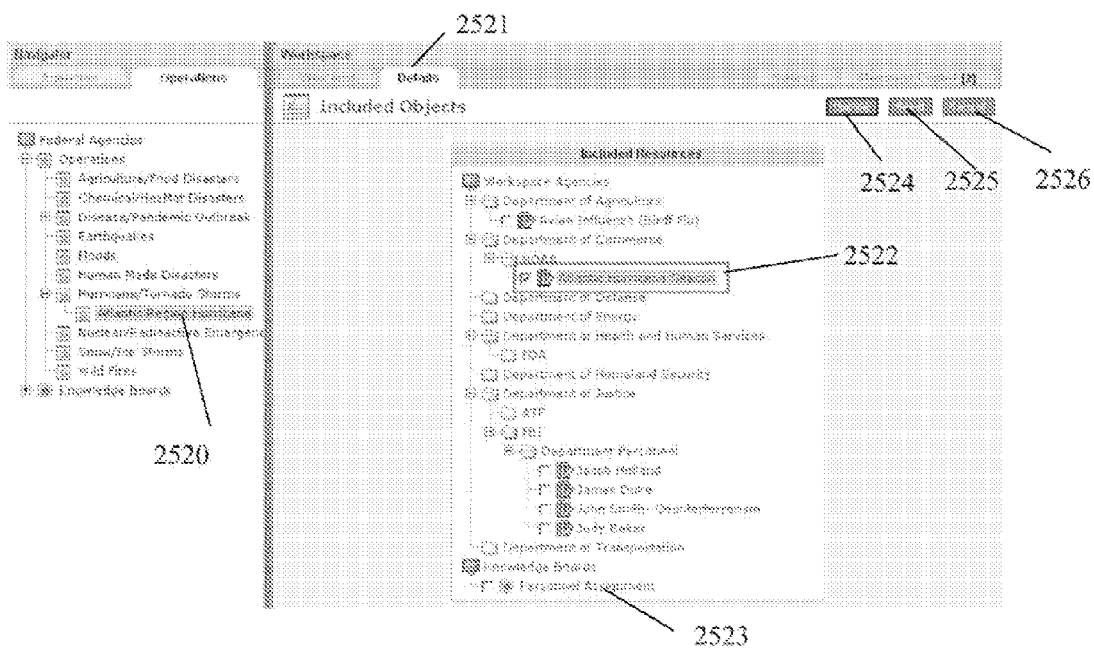

As shown in FIG. 25D, after selecting the create button 2511, the system will create the new operation entry 2520 in the navigator and provide an opportunity to include objects in the operation, i.e. associating resources and knowledge boards available from various agencies. An include objects dialog is displayed on the right side in FIG. 25D. The included objects details tab 2521 displays a full list of all resources/objects the user has permission to access. The user selects the resources 2522 and knowledge boards 2523 to be assigned as objects (available from various agencies) to this operation element. The user selects the update button 2524 to finish and add objects to the new entry, the reset button 2525 to clean the fields and start again, and the cancel button 2526 to terminate the operation and return to the previous screen. Each object related to the operation is stored in an entry in the T_OB- J_INITIATIVE_DATA_OBJECT table 328, which references the operation in the Initiative_ID field and the object in the Data_Object_ID field.

Figure 25E:
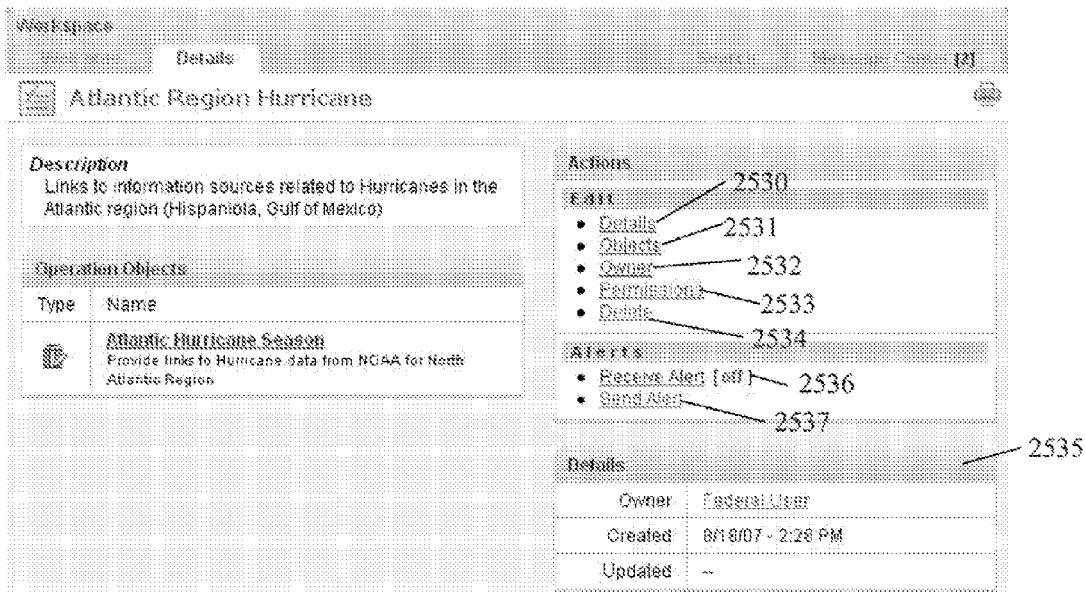
Figure 25F:
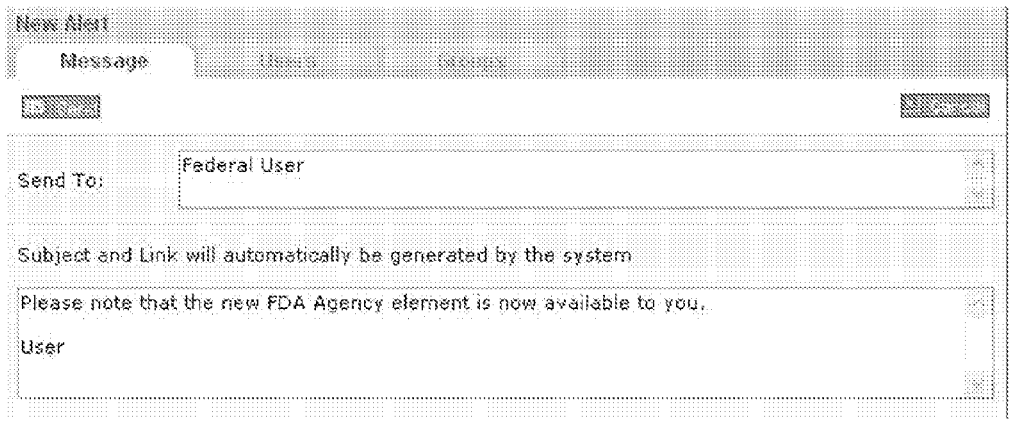

Once created, the operation is displayed as shown in FIG. 25E. Here, an example operation, Atlantic Region Hurricane, is shown with one object, the resource, Atlantic Hurricane Season. All operation elements can be managed by selecting any of the following options: details 2530, objects 2531, owner 2532, permissions 2533, or delete 2534. Selecting the details option 2530 opens a window similar to the create window shown in FIG. 25B, which allows users to change the title, description, or reposition the operation under another parent. Selecting the objects option 2531 opens an include object window shown in FIG. 25D, which allows the user to switch, add, or remove resources or knowledge boards from the navigator screen by selecting or deselecting checkboxes. Selecting the owner option 253 provides users the option to reassign the ownership responsibility for the operation object to another user. This feature provides accountability for maintenance of the system's elements by ensuring there is always a specific user associated with each entry. Selecting the permissions option 2533 provides users with the option to change the pre-assigned permissions that were granted during the object's creation and inherited from the parent operation. Users can add or remove groups or individual users, or change the permission level for viewer, user, manager, or administrator roles. Selecting the delete option 2534 archives the operation entry and removes it from view. Each change to the operation is marked as an update and is displayed in the details window 2535

Users can select to be alerted of any changes to the operation objects. Selecting the receive alerts option 2536 toggles the option on and off. When toggled to on, an alert entry is generated within the message center. To send an alert to other users, the send alert option 2537 is selected. This opens a message window, shown in FIG. 25F, where groups or users are selected and a message to accompany the alert can be typed.

7. Search

A quick search function provides users with the ability to enter a keyword to be searched upon at any time. All the data and information entered into the fields in the workspace are searchable, including titles, description, data fields, and names and descriptions of uploaded files. FIG. 26 shows a search results screen. The search results screen provides the following information: the search keyword 2601; the total number of entries found 2602; and the list of the entries found during the search 2603. Selecting any of the highlighted titles of the entries opens the element in a details window 2604 (hidden). The user can refine the search by modifying the query term, select to limit the search 2605 for a specific entry like resources or document, and select the number of entries 2606 to be displayed in each screen.

8. Message Center

The message center displays alerts generated by the system, and messages from other groups and/or user of the system. The message center displays alerts and messages to a specific user, generated from all workspaces. This provides each user with an awareness of activities within other workspaces to which they have access.

FIG. 27A shows how a user enters the message center. A user may enter the message center by selecting any of the alerts 2701 presented in the overview screen or by selecting the message center tab 2702 from the menu bar. The message center tab displays the number of new messages 2703. The message center is updated frequently by the system, and the number of new unread messages will reflect the changes. The messages are stored in the T_MESSAGE 314, T_MESSAGE USER 315, T_MESSAGE GROUP 316, and T_MESSAGE RECIPIENT 317 tables. As illustrated in FIG. 27B, a user can select a refresh button 2704 while working in the message center to check for new alerts and messages that have very recently arrived.

a. Alerts

FIG. 28 shows the set up of alerts. Alerts are the messages generated within the system regarding changes for which the user have requested alerts, or initiated by other users wanting to alert the user of changes made in specific objects, including agencies, operations, resources, or knowledge boards. The alert message entry contains an identification 2801 if the message is new, the message originator (system or user) 2802, the subject of the message 2803, workspace 2804 where the message was generated from, and the date and lime 2805.

Selecting an alert will display the message. The message includes a brief description of the nature of the alert and a link to the element. Selecting the link opens the element in the workspace window. If an alert was sent by another user, the message will contain the name of the sender and message the user typed. Each alert is stored in an entry in the T_OBJ_DATA_ALERT_USER table 319, which references the object in the Object_ID field and the user in the User_ID field.

b. Messages

Figures 29B, 29C:
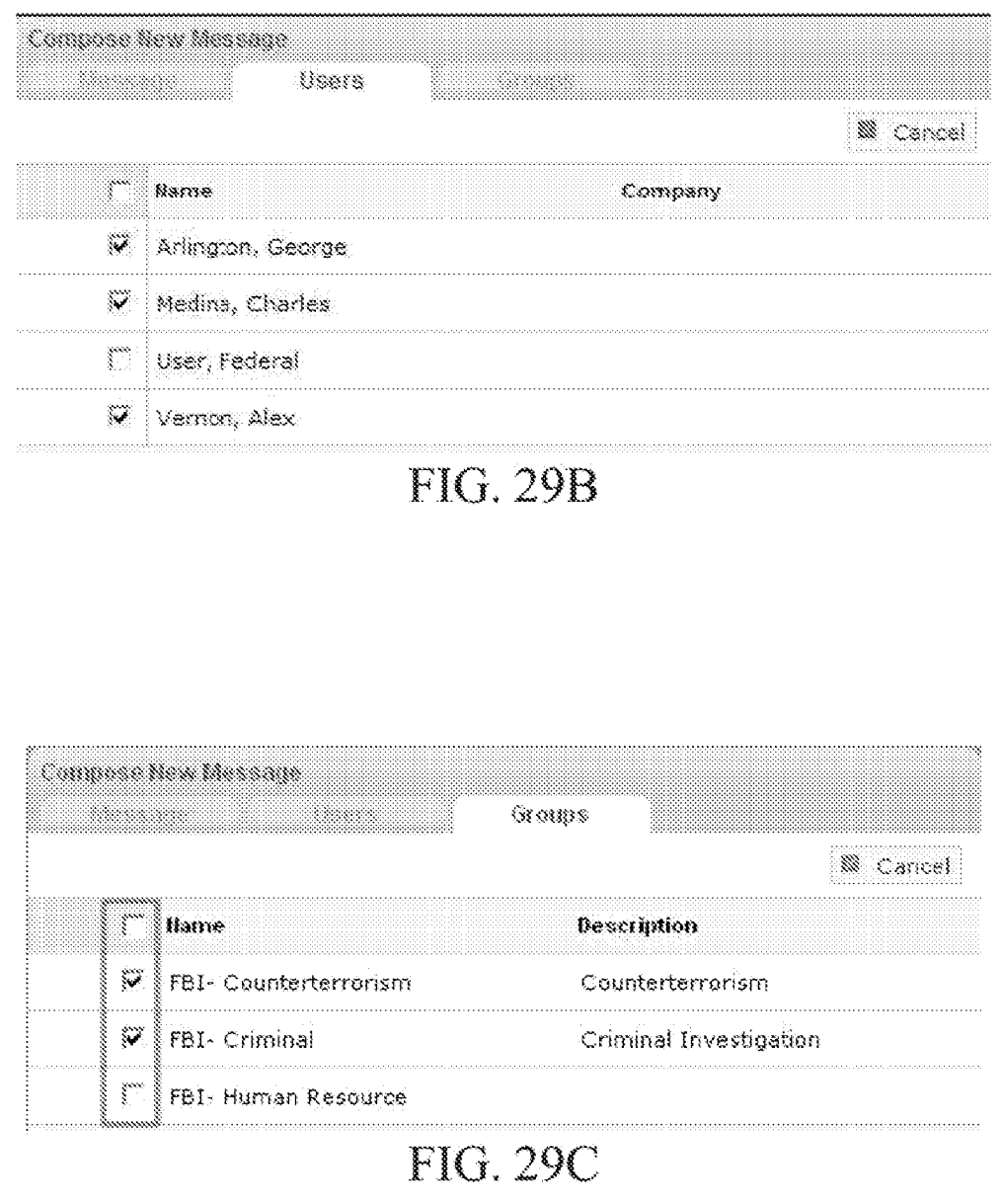
Figures 29D, 29E:
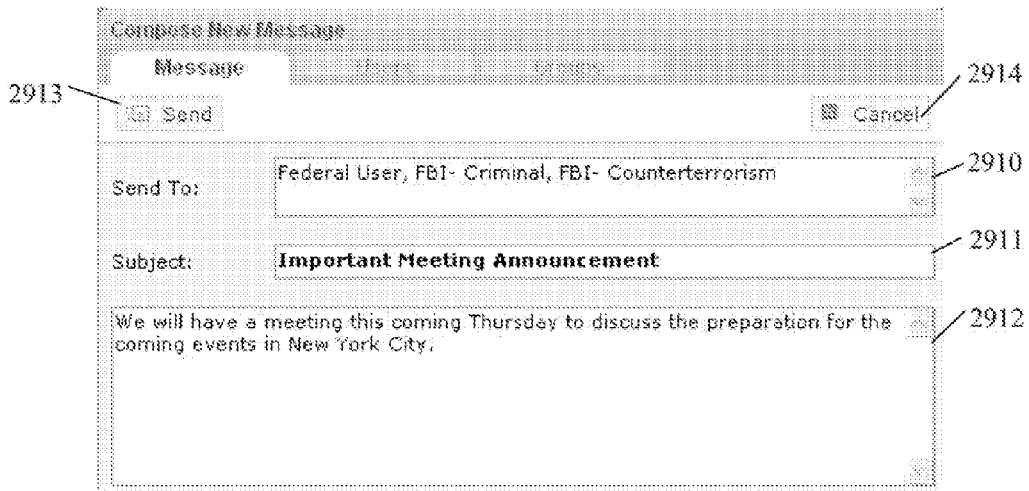

FIGS. 29A-29F show the set up of messages. Messages can be exchanged between users or groups of users utilizing the message center email-like option. To send a message, the new message icon 2806 (FIG. 28) in the message center screen is selected, and a compose new message dialog is displayed, shown in FIG. 29A. The messages are stored in the T_MESSAGE table 314, which references the workspace in the Workspace_ID field. The users tab 2901 can be selected to select individual users as recipients, as shown in FIG. 29B. Here, the users George Arlinton, Charles Medina, and Alex Vernon are selected as recipients. Each user is stored in an entry in the T_MESSAGE_USER table 315, which references the message in the Message_ID field and the user in the User_ID field. The groups tab 2902 can be selected to select groups of users, as shown in FIG. 29C. Each group is stored in an entry in the T_MESSAGE_GROUP table 316, which references the message in the Message_ID field and the group in the Group_IF field. Each individual user and each user in a group are also stored as an entry in the T_MESSAGE_RECIPIENT table 317. When a user reads the message, this is marked in this table. The users and groups names are then displayed in the send to field 2910, as shown in FIG. 29D. The subject 2911 and message 2912 are then typed in. The send button 2913 is selected to send the message, or the cancel button 2914 is selected to terminate and return to the message center screen.

As shown in FIG. 29E, messages can be replied to the sender by selecting the reply icon 2920, replied to all addresses by selecting the reply all icon 2921, or forwarded to other users and/or groups by selecting the forward icon 2922. A compose new message window is then displayed, shown in FIG. 29F, with the previous message displayed and with space to type a new message. When forwarding, users and groups need to be selected as recipients. The message center is not an external email program and cannot be used to send anything outside the system.

9. Permissions

User access to information in the system is based upon roles and responsibilities that are setup within the permissions. For each workspace, a user can be set up as a viewer, a user, a manager, or an administrator. These set ups are performed by a system or users' administrator. Users might be set up differently in different workspaces, and therefore will have different roles in each workspace. This set up of roles in workspaces supersedes any set up in permissions.

With the Viewer role, a user has view-only permission to see selected objects as assigned. The user cannot perform any functions, such as create, details, or delete. With the User role, a user can create new objects like agencies, operations, resources, and knowledge boards within objects as assigned. The user cannot change roles or permissions, and will not see objects created by other users that are not shared. With the Manager role, the user can see all the permissions and can assign permissions only to objects for which they have permission to change. With the Administrator role, the user can see all the permissions and can assign permissions to anyone at any level. Users who create an object are automatically granted full permission to that object. They can grant any of their permission levels to other users or groups they share.

If users can access the permission setup, by definition they have permission to assign rights to any of the groups of users or individual users that are visible to them. Permissions are assigned per object and will be automatically transferred to all sub-objects that are created later. The system docs not adjust permissions when objects are repositioned to/from other parent objects. After re-positioning an object, users must view and update the permissions and attributes for the moved object(s). Available permissions include read, create, update, and delete. Read permission allows a user to view object elements, including agencies, resources, operations, and knowledge boards (data fields, documents, links, or discussions in resources) only but does not allow the user to make changes. Create permission allows a user to create domains, resources, initiatives, and knowledge boards. The user cannot change details documents or links details. Update permission allows a user to modify the objects (agency, operation, resource), as well as change details, documents, links, and owners. Delete permission allows a user to delete/archive the object, to reposition the object, and grant permissions to other users or groups.

FIG. 30 shows the set up of permissions. A user selects the groups tab 3001 or users tab 3002 to set up permissions for groups of users or individual users, respectively. The permission level for each group or user is then selected. The permissions are stored in the T_OBJ_DATA_PERM_GROUP 320 and T_OBJ_DATA_PERM_USER 321 tables.

10. Personal Setup

FIGS. 31A-31C illustrate the set up of user's personal preferences and password. The preferences are stored in the T_USER_PROFILE table 341 and the T_USER_PREFERENCES table 344. The set up the personal preferences, the user selects Personal Preferences 3101 from the Administration pull down menu 1321 (FIG. 13), as illustrated in FIG. 31A. A personal preferences dialog is displayed, as shown in FIG. 31B. The user sets the default workspace 3103 (if they belong to more than one), default navigator tab 3104 (operation or agency), the default language 3105, whether to forward alerts to their registered email account 3106, and whether to forward message to their registered email account 3107. The user can then select an update button (not shown) to submit the changes, or a reset button (not shown) to start over.

Users can elect to change the password for their account by selecting the Change Password 3102 (FIG. 31A) from the Administrator pull down menu 1321. A change password dialog is displayed, as shown in FIG. 31C. The user enters the current password 3110, the new password 3111, and a confirmation of the new password 3112. The user then selects an update button (not shown) to submit the changes, or a reset button (not shown) to start over.

11. Logout

To ensure that the session has terminated on the user's workstation and no other users can access the user's account, the user selects the Logout button 1320 (FIG. 13). The system will terminate the session. The administrator also sets a timeout period for the system. If there is no activity on an open session for the timeout period defined by the administrator, the system will automatically log out the user and terminate the session.

12. Map Feature

When utilizing the predefined address field in resources, the system provides the option to display a map based on the address information, as shown in FIG. 32. The default map option is set by the administrator, and can be a mapping application provided on the Internet or a proprietary mapping application.

E. System Management

In addition to the management of the system, as described above, a system administrator can set up a number of parameters for supporting applications, including: document management, email management, encryptions management, mapping management, search management, and security management. These functions are designed to provide enhanced services to users and administration of the system. An administrator accesses these functions through the system managers screen, shown in FIG. 33A.

1. Document Manager

The document manager provides a record of each document. As each document is uploaded into the system, the system records the time it was uploaded, the originator (person who uploads) of the document, and the time. As the system is designed to provide a flail accountability and compliance with regards to the information stored within the system, the system maintains any previous version/re vision of a document loaded into it as well as all archived documents. The document management provides the tools to view, archive, replace, and revive all types of documents loaded in the system. FIG. 33B shows the set up of the document manager. The administrator selects the location of the files depository 3301, virus protection software 3302, and type of repository architecture 3303.

2. Security Manager

The security manager is designed to set up the network's environment. As the server is part of a private or public network, and all users have to access it through a network, it is critical that the server cold be configured to limit the access of unauthorized users to the server. These are done by identifying the type of connections used by authorized users and limit the access of all other types of data (including random packets used by hackers) from reaching the server. This is done by opening the appropriate ports for the type of protocols used by the application. Also, the system can define if information will be encrypted while it is transferred over the network and what type of encryption to use.

FIG. 33C shows the set up of the security manager. The administrator enters the port number 3310, session timeout duration 3311, alert message 3312 to be displayed, whether SSL encryption is required 3313, the authentication type 3314, the maximum failed login attempts allowed 3315, whether to display the alert message 3316 if the number of maximum failed login attempts has been exceeded, and the alert title 3317.

3. Encryption Manager

One of the key elements of the system is the depository of files (documents, images, etc.). As every system that is networked, there is a danger of malicious penetration and removal of sensitive information. To protect from that, the stored information could be encrypted while it is stored and only be decrypted after delivery to authorized users. The administrator of the system can choose the option to encrypt and what encryption technology to use.

FIG. 33D shows the set up of the encryption manager. The administrator can set up encryption key 3320, the encryption provider 3321, and the encryption algorithm 3322.

4. Mapping Manager

The mapping management allows the administrator to provide a link to their choice of a mapping (GIS) system. The ability to provide a tool to link to a mapping system enables users to define areas or locations by either geographical coordinates or street addresses, and let the system display a map or an aerial photograph that represent the location.

FIG. 33E shows the set up of the mapping manager. The administrator can set up the website URL 3330 for the link to the mapping service, and the website name 3331 of the server that is providing the mapping service.

5. Email Manager

The email manager allows the administrator to set a mail server on the system and define the name and address of the administrator. The role of the mail server is to provide users with the option to send alerts and messages from the system to their preferred mail client on their PC, PDA, or cell phone. These options allow users to get updated alerts without the need to be logged into the application. Mobile users can be alerted to changes in information or operation procedures critical to their operation while they are away from their primary computer system.

FIG. 33F shows the set up of the email manager. The administrator can set up for the mail server the password 3140, default sender's name 3341, username 3342, default sender's email 3343, email server hostname 3344, email server port 3345, and the send mail interval 3346.

6. Search Manager

The search engine of the system indexed the entries within the system as keywords. This provides users the ability to locate any type of information by inquiring the database. The inquiry results are displayed to the searching users and provide links for to the presented results. This helps users to allocate requested information without an extensive knowledge of the structure which is critical in many environments where the users may have limited training or no previous knowledge of parts of the system.

FIG. 33G shows the set up of the search manager. The administrator sets up the re-index timeout 3350, the re-index time 3351 (frequency of re-indexing), and the search index direction 3352. The administrator can choose to manually execute a reindexing of the search database by selecting the execute button 3353.

For all of the foregoing reasons, the Detailed Description is to be regarded as being in all respects exemplary and not restrictive, and the breadth of the invention disclosed herein is to be determined not from the Detailed Description, but rather from the claims as interpreted with the full breadth permitted by the patent laws.

The invention claimed is:

1. A system for supporting collaboration among users in performing an arbitrary activity, the system comprising:
 a processor which has access to
  a representation of a model of the arbitrary activity, the model comprising one or more workspaces, each workspace including a plurality of workspace objects, the workspace objects including structural objects which structure the collaboration, resource objects which make resources available for the collaboration, and a resource template that defines a class of resource objects, the resource template defining types of information associated with the resource objects belonging to the class defined by the resource template by defining a number and types of elements associated with the resource template, and the workspace objects further comprising a knowledge board for providing the users access to the elements of one or more resource objects selected from the elements specified in the resource template and
  a representation of access permissions which specifies each user's access permissions for each workspace; and
 an interface to the system for the users, the interface being provided by the processor and the interface permitting each user to view and modify the workspace objects in a workspace as determined by the user's access permissions to the workspace.

2. The system of claim 1, wherein each user can have different access permissions in different workspaces.

3. The system of claim 1, wherein the workspace objects comprise:
 a domain hierarchy representing the organizational structure of the users using the system; and
 an initiatives hierarchy representing the process structures for accomplishing goals.

4. The system of claim 3, wherein each resource object is associated with one or more domains in the domain hierarchy, wherein the resource object is further associated with one or more initiatives in the initiatives hierarchy without a need to duplicate the resource object in the initiatives hierarchy.

5. The system of claim 4, wherein the domain hierarchy and the initiatives hierarchy provide the users two views of the resource objects without a need to duplicate the resource objects in the initiatives hierarchy.

6. The system of claim 1, wherein each resource object further comprises a collection of elements defined by the users that give the users associated with the workspace access to information sources.

7. The system of claim 6, wherein the information sources comprise at least one of the following:
 a document local to a user to be uploaded into the system;
 a text file created by the user using a text editor of the system;
 links to access information or tools;
 RSS (Really Simple Syndication) fees; and
 discussion topics.

8. The system of claim 7, wherein each link can be an external link to an information source outside of the system or an internal link to a resource that is within the system but is not a workspace object of a current workspace.

9. The system of claim 7, wherein the discussion topics comprise asynchronous chat boards where the users can exchange comments.

10. The system of claim 1, wherein the resource objects are organized into a resource hierarchy.

11. The system of claim 1, wherein a user creates a resource object by beginning with the resource template and providing values for the elements.

12. The system of claim 1, wherein the resource template is a global object defined by a system administrator.

13. The system of claim 1, wherein the resource template is used to locate resource objects belonging to the class defined by the resource template.

14. The system of claim 1, wherein a user selects the elements in the resource template for the knowledge board.

15. The system of claim 1, wherein the user further specifies filters for one or more of the selected elements.

16. The system of claim 1, wherein the model further comprises resource template categories for the resource templates.

17. A non-transitory computer storage medium characterized in that the computer storage medium contains a program which, when executed, implements the system set forth in claim 1.

* * * * *